US012065379B2

(12) United States Patent
Benck et al.

(10) Patent No.: US 12,065,379 B2
(45) Date of Patent: *Aug. 20, 2024

(54) DECARBONIZED CEMENT BLENDS

(71) Applicant: Sublime Systems, Inc., Somerville, MA (US)

(72) Inventors: Jesse D. Benck, Wakefield, MA (US); Yet-Ming Chiang, Weston, MA (US); Kyle Dominguez, Boston, MA (US); Leah D. Ellis, Somerville, MA (US); Khashayar Jafari, Melrose, MA (US); Mariya Layurova, Cambridge, MA (US); Ada MacLeod, Sherborn, MA (US)

(73) Assignee: Sublime Systems, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,399

(22) Filed: Nov. 21, 2023

(65) Prior Publication Data

US 2024/0083819 A1 Mar. 14, 2024

Related U.S. Application Data

(63) Continuation of application No. 18/131,236, filed on Apr. 5, 2023, which is a continuation of application No. PCT/US2022/021204, filed on Mar. 21, 2022.
(Continued)

(51) Int. Cl.
*C04B 28/00* (2006.01)
*C04B 7/12* (2006.01)
(Continued)

(52) U.S. Cl.
CPC .............. *C04B 28/188* (2013.01); *C04B 7/12* (2013.01); *C04B 2111/00637* (2013.01)

(58) Field of Classification Search
CPC C04B 28/188; C04B 7/12; C04B 2111/00637
See application file for complete search history.

(56) References Cited

U.S. PATENT DOCUMENTS 2,669,542 A 2/1954 Dooley
3,074,860 A 1/1963 Shinzoh
(Continued)

FOREIGN PATENT DOCUMENTS

CA 2754293 C * 2/2018 ............. C04B 28/04
CN 1137575 A 12/1996
(Continued)

OTHER PUBLICATIONS

[No Author Listed], Lime Prices in the United States, by Type. IndexMundi. Accessed Oct. 15, 2021 as available Sep. 8, 2017 from https://web.archive.org/web/20170908194700/https://www.indexmundi.com/en/commodities/minerals/lime/lime_t5.html. 1 page.
(Continued)

*Primary Examiner* — James E McDonough
(74) *Attorney, Agent, or Firm* — Morrison & Foerster LLP

(57) ABSTRACT

Various embodiments include cementitious compositions with low levels of embodied greenhouse gas emissions, in particular carbon dioxide, as a result of its production and/or use compared to conventional cementitious materials, such as portland cement. Various embodiments include any cementitious material or materials with low embodied carbon, as well as any material produced using this cement.

18 Claims, 5 Drawing Sheets

Related U.S. Application Data

(60) Provisional application No. 63/291,170, filed on Dec. 17, 2021, provisional application No. 63/274,378, filed on Nov. 1, 2021, provisional application No. 63/164,395, filed on Mar. 22, 2021.

(51) Int. Cl.
*C04B 28/18* (2006.01)
*C04B 111/00* (2006.01)

(56) References Cited

U.S. PATENT DOCUMENTS

| | | |
|---|---|---|
| 3,861,928 A | 1/1975 | Slater |
| 4,110,399 A | 8/1978 | Gaudernack |
| 4,196,068 A | 4/1980 | Scoville |
| 4,367,215 A | 1/1983 | Gjelsvik |
| 4,654,135 A | 3/1987 | Yamamoto et al. |
| 4,749,453 A | 6/1988 | Harris |
| 5,572,938 A | 11/1996 | Leger |
| 5,853,685 A | 12/1998 | Erickson |
| 6,284,207 B1 | 9/2001 | Mccauley |
| 7,534,411 B2 | 5/2009 | Shapira et al. |
| 7,993,500 B2 | 8/2011 | Gilliam et al. |
| 8,357,270 B2 | 1/2013 | Gilliam et al. |
| 9,200,375 B2 | 12/2015 | Gilliam et al. |
| 9,297,082 B2 | 3/2016 | Licht |
| 9,718,731 B2 | 8/2017 | Bullerjahn et al. |
| 11,718,558 B2 | 8/2023 | Finke |
| 2008/0124269 A1 | 5/2008 | Daudey et al. |
| 2008/0245660 A1 | 10/2008 | Little et al. |
| 2010/0101955 A1 | 4/2010 | Nocera et al. |
| 2010/0154593 A1 | 6/2010 | Ratchev et al. |
| 2011/0044882 A1 | 2/2011 | Buckley et al. |
| 2011/0182786 A1 | 7/2011 | Burba, III |
| 2011/0233055 A1 | 9/2011 | Cerezo |
| 2012/0121491 A1 | 5/2012 | Rau |
| 2014/0010743 A1 | 1/2014 | Kosmoski et al. |
| 2015/0343373 A1 | 12/2015 | Balfe et al. |
| 2016/0137551 A1 | 5/2016 | Le Gouil et al. |
| 2017/0022110 A1* | 1/2017 | Ulrike .................. C04B 28/10 |
| 2019/0040347 A1 | 2/2019 | Kim et al. |
| 2019/0078170 A1 | 3/2019 | Fukui et al. |
| 2021/0179492 A1 | 6/2021 | Hoffmann |
| 2022/0064063 A1 | 3/2022 | Chiang et al. |
| 2022/0145477 A1 | 5/2022 | Chiang et al. |
| 2023/0036470 A1 | 2/2023 | Finke et al. |
| 2023/0174396 A1 | 6/2023 | Chiang et al. |
| 2023/0295046 A1 | 9/2023 | Benck et al. |
| 2023/0313386 A1 | 10/2023 | Ellis et al. |
| 2023/0330724 A1 | 10/2023 | Chiang |

FOREIGN PATENT DOCUMENTS

| | | | |
|---|---|---|---|
| CN | 1210153 A | | 3/1999 |
| CN | 1805196 A | | 7/2006 |
| CN | 101624181 A | | 1/2010 |
| CN | 101981744 A | | 2/2011 |
| CN | 102016123 A | | 4/2011 |
| CN | 102149852 A | | 8/2011 |
| CN | 102149854 A | | 8/2011 |
| CN | 102730734 A | | 10/2012 |
| CN | 103882468 A | | 6/2014 |
| CN | 104261449 A | | 1/2015 |
| CN | 105126599 A | | 12/2015 |
| CN | 105263872 A | | 1/2016 |
| CN | 109970373 A | * | 7/2019 |
| EP | 2816140 A1 | | 12/2014 |
| FR | 2748755 A1 | | 11/1997 |
| GB | 1008196 A | | 10/1965 |
| GB | 1488339 A | | 10/1977 |
| JP | 2001-58170 A | | 3/2001 |
| JP | 2010-055951 A | | 3/2010 |
| JP | 5201454 B2 | * | 6/2013 |
| JP | 3192728 U | | 8/2014 |
| JP | 2015-074575 A | | 4/2015 |
| JP | 2016-20296 A | | 2/2016 |
| KR | 10-2017-0077777 A | | 7/2017 |
| WO | 02/090605 A1 | | 11/2002 |
| WO | 2007/074360 A2 | | 7/2007 |
| WO | 2008/124538 A1 | | 10/2008 |
| WO | 2012/142547 A1 | | 10/2012 |
| WO | 2013/153692 A1 | | 10/2013 |
| WO | 2014/092667 A1 | | 6/2014 |
| WO | WO-2015082585 A1 * | 6/2015 | ............ C04B 14/06 |
| WO | 2018/87697 A1 | | 5/2018 |
| WO | 2019/133702 A1 | | 7/2019 |
| WO | 2020/150449 A1 | | 7/2020 |
| WO | 2020/186178 A1 | | 9/2020 |
| WO | 2021/030529 A1 | | 2/2021 |
| WO | 2021/222585 A2 | | 11/2021 |
| WO | 2022/020470 A1 | | 1/2022 |
| WO | 2022/020572 A1 | | 1/2022 |
| WO | 2022/204059 A1 | | 9/2022 |
| WO | 2022/216741 A1 | | 10/2022 |
| WO | 2022/221334 A1 | | 10/2022 |
| WO | 2023/108054 A1 | | 6/2023 |
| WO | 2023/150796 A1 | | 8/2023 |

OTHER PUBLICATIONS

[No Author Listed], LumiShield Chemistry. LumiShield Technologies, Inc. Pittsburgh, PA. Accessed Oct. 15, 2021 as available Jan. 31, 2019 from https://web.archive.org/web/20190131025944/http://lumishieldtech.com/chemistry.html. 1 page.

[No Author Listed], Mini Chlor Alkali Plant. SkidPlant. Chenai, India. Accessed Oct. 15, 2021 as available Jan. 10, 2019 from https://web.archive.org/web/20190110233048/http://www.skidplant.com/mini-chlor-alkali-plant 3 pages.

[No Author Listed], Table 31. Average Sales Price of Coal by State and Coal Rank, 2017. U.S. Energy Information Administration Annual Coal Report 2017. Accessed Oct. 15, 2021 as available Jan. 8, 2019 from https://web.archive.org/web/20190108234119/https://www.eia.gov/coal/annual/pdf/table31.pdf . 1 page.

[No Author Listed], U.S. Labor-Energy Input Survey. Portland Cement Association. Skoki, IL. Accessed Oct. 15, 2021 as available Sep. 23, 2019 from https://web.archive.org/web/20190923015840/https://www.cement.org/docs/default-source/market-economics-pdfs/more-reports/labor-energy-sample-2.pdf?sfvrsn=6&sfvrsn=6. 36 pages.

Abdykirova et al., Production of Electrolytic Manganese Dioxide from Purified Solutions after the Leaching of Manganese-Bearing Slurry. Steel Transl. Aug. 25, 2016;46(5):319-321.

Ahman et al., Global climate policy and deep decarbonization of energy-intensive industries. Climate Policy. Jun. 13, 2016;17(5):634-49. doi: 10.1080/14693062.2016.1167009.

Chaubey, A. (2020). Practical Concrete Mix Design (1st ed.). CRC Press.

Chen et al. (2014). Geochemical Prospecting, Geological Publishing House, p. 26.

Decision on Rejection dated Mar. 8, 2023, directed to CN Application No. 202080028904.9; 32 pages.

Ellis et al. (2019). "Toward electrochemical synthesis of cement—An electrolyzer-based process for decarbonating CaCO3 while producing useful gas streams," Proceedings of the National Academy of Sciences 117 (23); 8 pages.

Geels et al., Sociotechnical transitions for deep decarbonization. Science. Sep. 22, 2017;357(6357): 1242-1244.

Gray, H.B., Powering the planet with solar fuel. Nature Chemistry. Mar. 19, 2009;1:7; 2 pages.

Haruta et al., Catalytic Combustion of Hydrogen I—Its Role in Hydrogen Utilization System and Screening of Catalyst Materials. Int. J. Hydrogen Energy. 1981;6(6):601-8.

Hasanbeigi et al., Emerging energy-efficiency and CO2 emission-reduction technologies for cement and concrete production: A technical review. Renewable and Sustainable Energy Reviews. Aug. 30, 2012;16(8):6220-6238.

(56) References Cited

OTHER PUBLICATIONS

Higher Education Press. (2000). Inorganic Chemistry. Chemistry TextbookCompilation Group for Higher Vocational Colleges, pp. 298-300.

Imbabi et al., Trends and developments in green cement and concrete technology. International Journal of Sustainable Built Environment. 2012;1:194-216. doi: 10.1016/i.iisbe.2013.05.001.

International Preliminary Report on Patentability for International Patent Application No. PCT/US2020/013837, mailed Jul. 29, 2021; 7 pages.

International Preliminary Report on Patentability for International Patent Application No. PCT/US2020/022672, mailed Sep. 23, 2021; 7 pages.

International Report on Patentability dated Jan. 24, 2023, directed to International Application No. PCT/US2021/042746; 8 pages.

International Search Report and Written Opinion dated Jul. 1, 2022, directed to International Application No. PCT/US2022/021204; 12 pages.

International Search Report and Written Opinion dated May 25, 2020, directed International Application No. PCT/US2020/013837; 9 pages.

International Search Report and Written Opinion dated Nov. 10, 2021, directed to PCT Application No. PCT/US2021/042746; 11 pages.

International Search Report and Written Opinion dated Oct. 29, 2021, directed to International Application No. PCT/US2021/042573; 7 pages.

International Search Report and Written Opinion for International Patent Application No. PCT/US2020/022672, mailed Aug. 17, 2020; 11 pages.

International Search Report and Written Opinion for International Patent Application No. PCT/US2021/029918, mailed Sep. 24, 2021; 16 pages.

International Search Report and Written Opinion mailed Jul. 23, 2020 in International Patent Application No. PCT/US2020/013837; 9 pages.

Invitation to Pay Additional Fees for International Patent Application No. PCT/US2021/029918, mailed Aug. 3, 2021; 8 pages.

Mitlitsky et al. (1998). "Regenerative Fuel Cell Systems," Energy & Fuels 12:56-71.

Notification of the First Office Action dated Feb. 23, 2022, directed to CN Application No. 202080009144.7; 24 pages.

Notification of the First Office Action dated Mar. 30, 2022, directed to CN Application No. 202080028904.9; 20 pages.

Office Action dated Apr. 23, 2023, directed to CN Application No. 202080009144.7; 32 pages.

Office Action dated Feb. 21, 2023, directed to EP Application No. 20716365.0; 4 pages.

Office Action dated Feb. 22, 2023, directed to EP Application No. 20706886.7; 4 pages.

Office Action dated May 15, 2023, directed to IN Application No. 202117046712; 6 pages.

Office Action dated Oct. 27, 2022, directed to EA Application No. 202191980; 11 pages.

Office Action dated Sep. 19, 2022, directed to EA Application No. 202192509; 7 pages.

Rau (2009). "Electrochemical CO2 capture and storage with hydrogen generation," Energy Procedia, vol. 1, No. 1, pp. 823-828.

Shanghai People's Publishing House. (1965). Chemistry vol. 2. Chemistry Writing Group of the Editorial Committee of the Mathematics, Physics and Chemistry Self-study Series, pp. 235-237.

Second Office Action dated Oct. 8, 2022, directed to CN Application No. 202080009144.7; 17 pages.

Second Office Action dated Sep. 16, 2022, directed to CN Application No. 202080028904.9; 16 pages.

Zheng et al., Phase evolution, characterisation, and performance of cement prepared in an oxy-fuel atmosphere. Faraday Discuss. 2016;192:113-24.

[No Author Listed], Around 2.5 billion more people will be living in cities by 2050, projects new UN report. United Nations. May 16, 2018. Accessed Oct. 6, 2021 from https://www.un.org/development/desa/en/news/population/2018-world-urbanization-prospects.html. 4 pages.

[No Author Listed], Breaking down the factors behind scrap glass prices. Recycling Product News. Dec. 7, 2017. Accessed Oct. 6, 2021 from https://www.recyclingproductnews.com/article/27 08 8/breaking-down-the-factors-behind-scrap- glass-prices. 5 pages.

[No Author Listed], Cement prices in the United States from 2010 to 2020 (in U.S. Dollars per metric ton). Statista. Hamburg, Germany. Feb. 2021:8 pages.

[No Author Listed], Climate Change 2014: Mitigation of Climate Change: Working Group III Contribution to the Fifth Assessment Report of the Intergovernmental Panel on Climate Change. Edenhofer et al., Eds. Cambridge University Press. New York, NY. 2014. 1354 pages.

[No Author Listed], Concrete CO2 Fact Sheet. National Ready Mixed Concrete Association. Silver, Spring, MD. Feb. 2012. 13 pages.

[No Author Listed], Development of State of the Art-Techniques in Cement Manufacturing: Trying to Look Ahead, Revision 2017. European Cement Research Academy. Dusseldorf, Geneva. Mar. 20, 2017. 190 pages.

[No Author Listed], Geochemistry in mineral exploration. Eds. Chen et al. Geological Publishing House. Mar. 2014; p. 26.

[No Author Listed], Mineral Commodity Summaries. U.S. Department of the Interior, U.S. Geological Survey. Jan. 2018. 204 pages.

[No Author Listed], Recycling Markets—Gambling or Good Business. Northeast Resource Recovery Association. Epsom, NH. Apr. 2014. 137 pages.

[No Author Listed], Technology Roadmap; Low-Carbon Transition in the Cement Industry. International Energy Agency, Paris, France. World Council for Sustainable Development, Geneva, Switzerland. 2018. 66 pages.

Abergel et al., Global Status Report 2017. International Energy Agency. Paris, France. 2017. 48 pages.

Ali et al., A review on emission analysis in cement industries. Renewable and Sustainable Energy Reviews. 2011;15(5):2252-61. Epub Mar. 17, 2011.

Allanore A., Contribution of Electricity to Materials Processing: Historical and Current Perspectives. JOM. 2012;65(2): 130-135. doi: 10.1007/sl 1837-012-0538-3. Author manuscript provided. 20 pages.

Allegrini et al., Quantification of the resource recovery potential of municipal solid waste incineration bottom ashes. Waste Manag. Sep. 2014;34(9):1627-36. doi: 10.1016/j.wasman.2014.05.003. Epub Jun. 2, 2014.

Aromaa, J., Aqueous Processing of Metals. In: Encyclopedia of Electrochemistry. 2007. A.J. Bard et al., Eds. Wiley-Yeh. Chapter 4.1:161-223.

Barker et al., CO2 Capture in the Cement Industry. IEA Greenhouse Gas R&D Programme. Cheltenham, Glos., UK. 2008; I-221.

Belevi et al., Factors Determining the Element Behavior in Municipal Solid Waste Incinerators. 1. Field Studies. Environ. Sci. Technol. May 12, 2000;34(12):2501-2506.

Benson et al., Advancing Enhanced Oil Recovery as a Sequestration Asset. Joule. Aug. 15, 2018;2(8):1386-9.

Bjerge et al., CO2 Capture in the Cement Industry, Norcem CO2 Capture Project (Norway). Energy Procedia. 2014;63:6455-63.

Blunt et al., Carbon Dioxide in Enhanced Oil Recovery. Energy Convers. Mgmt. 1993;34(9-11):1197-1204.

Carrasco-Maldonado et al., Oxy-fuel combustion technology for cement production—State of the art research and technology development. International Journal of Greenhouse Gas Control. 2016;45:189-99. Epub Jan. 4, 2016.

Chen et al., Environmental impact of cement production: detail of the different processes and cement plant variability evaluation. Journal of Cleaner Production. 2010;18(5):478-485. Epub Jan. 4, 2010.

Davis et al., Net-zero emissions energy systems. Science. Jun. 29, 2018; 360(6396) 9 pages. Supplementary Material included. 27 pages total.

Delgado et al., CO2 Balance in a Compression and Purification Unit (CPU). Energy Procedia. 2014; 63:322-31.

(56) References Cited

OTHER PUBLICATIONS

Dowling et al., Lime in the limelight. Journal of Cleaner Production. 2015;92:13-22. Epub Dec. 20, 2014.

Dubois et al., Study of the post-combustion CO2 capture applied to conventional and partial oxy-fuel cement plants. Energy Procedia. 2017; 114:6181-96.

Ellis et al. (2020) "Toward Electrochemical Synthesis of Cement—An Electrolyzer-Based Process for Decarbonating CaCO3 While Producing Useful Gas Streams," PNAS 117: 23 (12584-12591).

First Office Action dated Oct. 13, 2023, directed to CN Application 202180039803.6; 18 pages.

Free, M.L., Hydrometallurgy—Fundamentals and Applications. 2013. John Wiley & Sons, Inc. 451 pages.

Funari et al., Solid residues from Italian municipal solid waste incinerators: A source for ""critical"" raw materials. Waste Manag. Nov. 2015; 45:206-16. Epub Dec. 12, 2014. Pre-publication version provided. 11 pages.

Gardarsdottir et al., Comparison of Technologies for CO2 Capture from Cement Production—Part 2: Cost Analysis. Energies. Feb. 10, 2019;12(3):1-20.

Janssen, G.J.M., Modelling study of CO2 poisoning on PEMFC anodes. Journal of Power Sources. Jul. 3, 2004;136:45-54.

Joseph et al., The Use of Municipal Solid Waste Incineration Ash in Various Building Materials: A Belgian Point of View. Materials. Jan. 16, 2018; 11(141): 1-30.

Keith et al., A Process for Capturing CO2 from the Atmosphere. Joule. Aug. 15, 2018;2(8): 1573-94.

Kelly et al., Historical Statistics for Mineral and Material Commodities in the United States, US Geological Survey. Reston, VA. Accessed Jan. 7, 2009 as updated Apr. 17, 2008 from http://minerals.usga.gov/ds/2005/140/ 8 pages.

Korner, A., Technology Roadmap Hydrogen and Fuel Cells: Technical Annex. International Energy Agency. Jun. 29, 2015. 30 pages.

Lammel et al., Greenhouse Effect of NOx. Environ. Sci. & Pollut. Res. 1995;2(1):40-45.

Larscheid et al., Potential of new business models for grid integrated water electrolysis. Renewable Energy. Feb. 23, 2018; 125:599-608.

Lassagne et al., Techno-economic study of CO2 capture for aluminum primary production for different electrolytic cell ventilation rates. Chemical Engineering Journal. Jun. 26, 2013;230:338-50.

Lau et al., "Optimization and Characterization of the Solar Thermal Electrochemical Conversion of Calcium Carbonate into Calcium Oxide for STEP Cement," Abstract from the 227th Meeting of the Electrochemical Society, 2015.

Lawal et al., Dynamic modelling and analysis of post-combustion CO2 chemical absorption process for coal-fired power plants. Fuel. Jun. 2, 2010;89(10):2791-2801.

Lehne et al., Making Concrete Change; Innovation in Low-carbon Cement and Concrete. Chatham House, London, UK. Jun. 2018. 138 pages.

Li et al., Greenhouse Gas Emissions, Energy Efficiency, and Cost of Synthetic Fuel Production Using Electrochemical CO2 Conversion and the Fischer-Tropsch Process. Energy Fuels. Jun. 1, 2016 ;30(7):5980-9.

Li et al., Impacts of exhaust gas recirculation (EGR) on the natural gas combined cycle integrated with chemical absorption CO2 capture technology. Energy Procedia. 2011;4:1411-8.

Licht et al., STEP Cement: Solar Thermal Electrochemical Production of CaO without CO2 emission. Chem. Commun. 2012;48:6019-6021. doi: 10.1039/c2cc31341c.

Licht, "Co-Production of Cement and Carbon Nanotubes with a Carbon Negative Footprint," Journal of CO2 Utilization, Aug. 2016. Accessed online at on Jan. 14, 2019.

Liu et al., Experimental study on improving cement quality with oxygen enriched combustion technology. IOP Conf. Series: Materials Science and Engineering. 2015;103:1-7.

Madrid et al., Synthesis and morphological examination of high-purity Ca(OH)2 nanoparticles suitable to consolidate porous surfaces. Applied Surface Science. 2017;424:2-8. Epub Mar. 27, 2017.

Majumdar et al., Research Opportunities for CO2 Utilization and Negative Emissions at the Gigatonne Scale. Joule. May 16, 2018;2(5):805-809.

Marin et al., Simulating the Impact of Oxygen Enrichment in a Cement Rotary Kiln Using Advanced Computational Methods. Combust. Sci. and Tech. 2001;164:193-207.

Mascolo et al., Influence of Polymorphism and Stabilizing Ions on the Strength of Alite. Journal of the American Ceramic Society—Discussion and Notes. Apr. 1973;56(4):222-3.

Morf et al., Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33(6):1573.

Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.

No Author Listed], Renewable Power Generation Costs in 2017. International Renewable Energy Agency (IRENA), Abu Dhabi. 2018. 160 pages.

Odler et al., Polymorphism and Hydration of Tricalcium Silicate Doped With ZnO. Journal of the American Ceramic Society. Jan. 1983;66(1):I-4.

Office Action dated Oct. 30, 2023, directed to BR Application No. 112021013144-2; 6 pages.

Office Action dated Oct. 9, 2023, directed to IN Application No. 202117028021; 7 pages.

Orella et al., Emerging opportunities for electrochemical processing to enable sustainable chemical manufacturing. Current Opinion in Chemical Engineering. Jun. 2018;20:159-167.

Paidar et al., Membrane electrolysis—History, current status and perspective. Electrochimica Acta. 2016;209:737-756. Epub Jun. 2, 2016.

Pierpont et al., Flexibility: The path to low-carbon, low cost electricity grids. Climate Policy Initiative. Apr. 2017. 74 pages.

Rau et al., Enhanced carbonate dissolution: a means of sequestering waste CO2 as ocean bicarbonate. Energy Conversion & Management. 1999;40:1803-1813.

Rau et al., The global potential for converting renewable electricity to negative-CO2-emissions hydrogen. Nature Climate Change. Jul. 2018;8(7):621-5. Methods included. 6 pages total.

Rau, "Electrochemical Splitting of Calcium Carbonate to Increase Solution Alkalinity: Implications for Mitigation of Carbon Dioxide and Ocean Acidity," Environ. Sci. Technol.; vol. 42; 2008; pp. 8935-8940.

Rau, CO2 Mitigation via Capture and Chemical Conversion in Seawater. Environ. Sci. Technol. 2011 ;45(3):1088-1092.

Schmidt et al., Future cost and performance of water electrolysis: An expert elicitation study. International Journal of Hydrogen Energy. Nov. 22, 2017;42(52):30470-92.

Shah et al., Near Zero Emissions Oxy-Combustion CO2 Purification Technology. Energy Procedia. 2011 ;4:988-95.

Snellings, Assessing, Understanding and Unlocking Supplementary Cementitious Materials. RILEM Technical Letters. Aug. 16, 2016;1:50-55.

Stevula et al., Hydration of Polymorphic Modification C3S. Cement and Concrete Research. 1981 ;11(2): 183-190.

Syc et al., Metal recovery from incineration bottom ash: State-of-the-art and recent developments. J Hazard Mater. Jul. 5, 2020;393:1-17. Epub Feb. 29, 2020.

Taylor, Cement chemistry, 2nd edition. 1997. Thomas Telford Publishing. London, UK. 470 pages.

Topham et al., Carbon Dioxide. Ullmann's Encyclopedia of Industrial Chemistry. Wiley-VCH. May 2014:1-43.

Traynor et al., Dissolution of olivines from steel and copper slags in basic solution. Cement and Concrete Research. Jul. 2020;133: 106065. Author manuscript provided. 33 pages.

Vogt et al., The renaissance of the Sabatier reaction and its applications on Earth and in space. Nature Catalysis. Mar. 2019;2(3):188-97.

Voldsund et al., Comparison of Technologies for CO2 Capture from Cement Production—Part 1: Technical Evaluation. Energies. Feb. 12, 2019;12:559. 33 pages.

(56) References Cited

OTHER PUBLICATIONS

Wei et al., Electrodepositing Pt by Modulated Pulse Current on a Nafion-Bonded Carbon Substrate as an Electrode for PEMFC. J. Phys. Chem. Oct. 2, 2007;111(42): 15456-15463.

Worrell et al., Energy Efficiency Improvement and Cost Saving Opportunities for Cement Making; An ENERGY STAR® Guide for Energy and Plant Managers. Energy Analysis Department, Environmental Energy Technologies Division, Ernest Orlando Lawrence Berkeley National Laboratory. University of California. Berkeley, CA. Mar. 2008. 75 pages.

Yan et al., Degradation of proton exchange membrane fuel cells due to CO and CO2 poisoning. Journal of Power Sources. 2009;188:141-7.

Yao et al., Mobility of heavy metals and rare earth elements in incineration bottom ash through particle size reduction. Chemical Engineering Science. Oct. 18, 2014;18:214-220.

Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.

Zeman, Oxygen combustion in cement production. Energy Procedia. 2009;1:187-94.

Zhang et al., Extraction of metals from municipal solid waste incinerator fly ash by hydrothermal process. J Hazard Mater. Aug. 25, 2006;136(3):663-70. doi: 10.1016/j.ihazmat.2005.12.052. Epub Mar. 6, 2006.

Alonso et al., (2001). "Alkaline activation of metakaolin and calcium hydroxide mixtures: influence of temperature, activator concentration and solids ratio," Materials Letters 47: 55-62.

Azo Materials, (2024). Silica-Silicon Dioxide (SiO2) retrieved from the internet on Mar. 6, 2024 from <https://www.azom.com/article.aspx? ArticleID=1114>; 5 pages.

Bioworld, (2016). "Safety Data Sheet, Calcium Chloride Dihydrate," retrieved from the internet on Mar. 6, 2024 from <https://www.bioworld.com/site/accounts/masterfiles/MSDS/MS-40300016.pdf>; 8 pages.

Chen et al., (2009). "Incorporation of waste materials into portland cement clinker synthesized from natural raw materials ," J Mater Sci 44: 2617-2627.

Chiang et al., U.S. Office Action dated Mar. 12, 2024, directed to U.S. Appl. No. 18/395,376; 19 pages.

Chiang et al., U.S. Office Action dated Mar. 12, 2024, directed to U.S. Appl. No. 18/395,402; 28 pages.

Design and Control of Concrete Mixtures EB001, (2010). Retrieved from internet at Mar. 7, 2024 from <URL:http://www.ce.memphis.edu/1101/ notes/concrete/PCA_manual/Chap03.pdf andwaybackURL:https://web.archive.org/web/20100629003343/http://www.ce.memphis.edu/1101/notes/concrete/PCA_manual/Chap03.pdf>; 16 pages.

Encyclopedia Britannica, (2016). "Sedimentary rock," retrieved from the internet on Mar. 7, 2024 from <https://www.britannica.com/science/sedimentary-rock/ Limestones-and-dolomites and wayback https://web.archive.org/web/20160420201820/https://www.britannica.com/science/sedimentary-rock/Limestones-and-dolomites>; 1 page.

Ibrahim et al., (2018). "Metakaolin as an Active Pozzolan for Cement That Improves Its Properties and Reduces Its Pollution Hazard," Journal of Minerals and Materials Characterization and Engineering 6: 86-104.

Irabien et al., (1990). "Thermal Dehydration of Calcium Hydroxide. 1. Kinetic Model and Parameters," Ind. Eng. Chem. Res. 29(8): 1599-1606.

Mirghiasi et al., (2014). "Preparation and characterization of Cao nanoparticles from Ca(OH)2 by direct thermal decomposition method," Journal of Industrial and Engineering Chemistry 20: 113-117.

Office Action dated Apr. 15, 2024, directed to JP Application No. 2021-554694; 9 pages.

Office Action dated Feb. 29, 2024, directed to JP Application No. 2021-540832; 13 pages.

Office Action dated May 6, 2024, directed to BR Application No. 112021017931; 6 pages.

Sutkovic, (2014). "Ionic Chemical Equations," retrieved from the internet on Mar. 6, 2024 from <https://www.ius.edu.ba/common/2014SpringChemistryProblemSample1.pdf>; 3 pages.

\* cited by examiner

DECARBONIZED CEMENT BLENDS

CROSS-REFERENCE TO RELATED APPLICATIONS

This application is a continuation of U.S. application Ser. No. 18/131,236, filed Apr. 5, 2023, which is a continuation of International Application No. PCT/US2022/021204, filed Mar. 21, 2022, which claims the benefit of priority to U.S. Provisional Application No. 63/164,395 filed Mar. 22, 2021, U.S. Provisional Application No. 63/274,378 filed Nov. 1, 2021, and U.S. Provisional Application No. 63/291,170 filed Dec. 17, 2021, each of which is hereby incorporated by reference in its entirety.

GOVERNMENT SUPPORT CLAUSE

This invention was made with government support under Award No. DE-AR0001494 awarded by the Advanced Research Projects Agency-Energy (ARPA-E) of the U.S. Department of Energy to Sublime Systems, Inc. The government has certain rights in the invention.

BACKGROUND

Greenhouse gas emissions, in particular carbon dioxide ($CO_2$), as a result of its production and/or use of conventional cementitious materials contribute to climate change. Currently, portland cement is one of the most widely used manmade materials in the world. Conventional methods for manufacturing portland cement account for around eight percent of all global $CO_2$ emissions, approximately half of which arise from fossil fuel combustion and half of which arise from "chemical" emissions from limestone decomposition. Human civilization requires the use of cement, but reducing $CO_2$ emissions in the production and/or use of cementitious materials may be beneficial to reduce the $CO_2$ emissions contributing to climate change.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Various embodiments include cementitious compositions with low levels of embodied greenhouse gas emissions, in particular carbon dioxide, as a result of its production and/or use compared to conventional cementitious materials, such as portland cement. Various embodiments include any cementitious material or materials with low embodied carbon, as well as any material produced using this cement (including concrete/mortar and applications thereof such as buildings, roads, etc.). The various embodiments also include methods for making and using said materials. Compositions according to the various embodiments include pozzolanic cement blends comprising decarbonized lime, one or more pozzolans, and optionally additional components. Said decarbonized lime may be produced using a process wherein the combined $CO_2$ emissions to the atmosphere from chemically bound sources in the raw material and from the combustion of fuels is less than 1 kg $CO_2$ per kg lime.

A cementitious binder comprising precipitated lime and at least one pozzolan.

A cementitious binder comprising lime and at least one pozzolan.

A cementitious binder comprising lime, at least one pozzolan, and at least one additional material selected from the group including tricalcium silicate, calcium aluminate cement, calcium sulfoaluminate cement, and ye'elemite.

A method of forming a cementitious binder, comprising: creating a calcium hydroxide through a precipitation reaction; selecting at least one pozzolan; optionally, selecting one or more additional components from the group including portland cement, portland cement clinker, tricalcium silicate, ye'elemite, calcium aluminate cement, calcium sulfoaluminate cement, calcium carbonate, water reducing admixture, set accelerating admixture, defoaming admixture, air entraining admixture, and/or calcium sulfate; and blending the calcium hydroxide, the selected at least one pozzolan, and any selected components to create a mixture, such as a powder mixture, a uniform powder mixture, a dry powder mixture, a uniform dry powder mixture, etc.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

Figure 1:
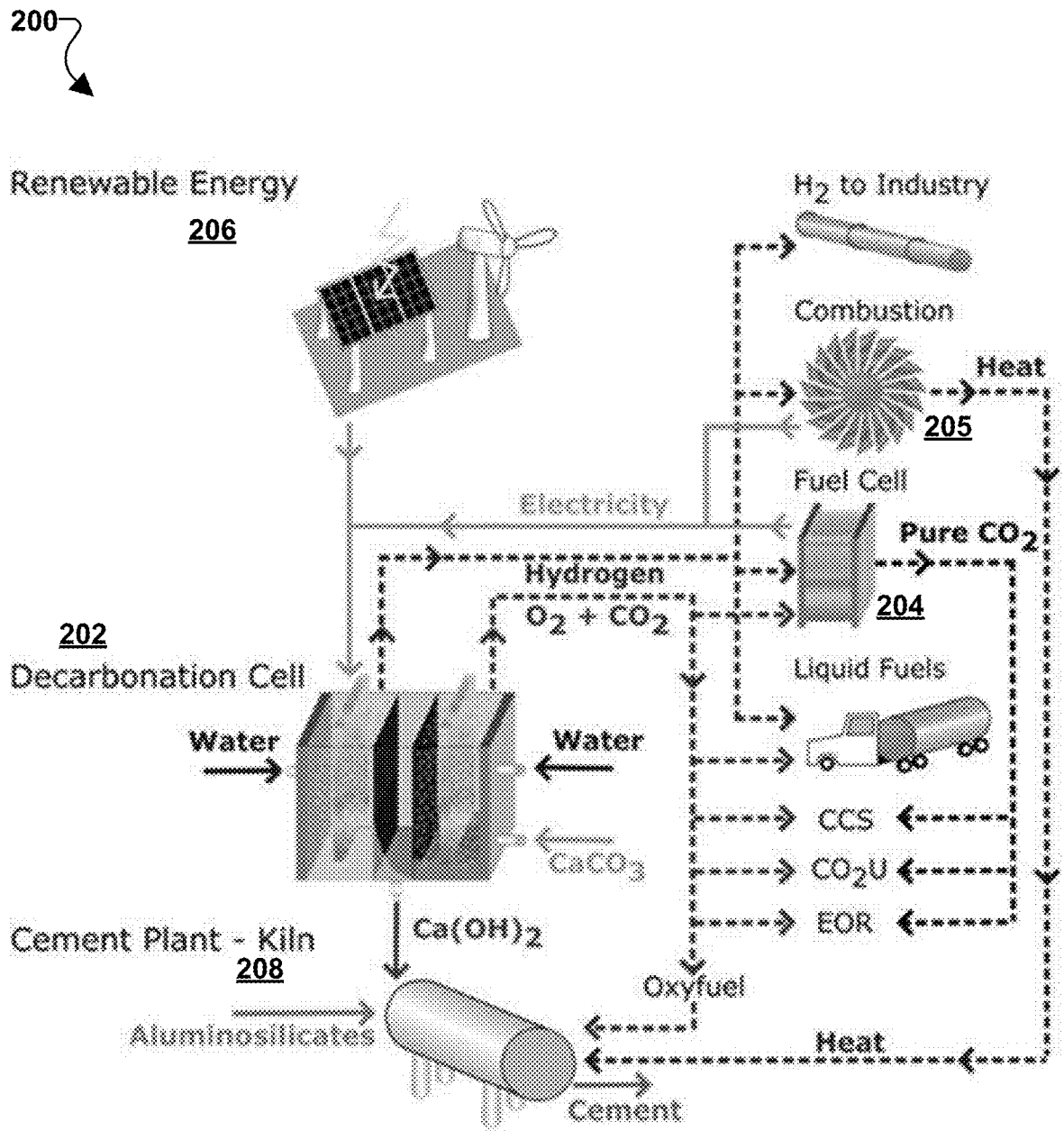
FIG. 1 illustrates a specific example system in accordance with various embodiments.

The accompanying drawings, which are incorporated herein and constitute part of this specification, illustrate example embodiments of the claims, and together with the general description given above and the detailed description given below, serve to explain the features of the claims.

DETAILED DESCRIPTION

References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, "precipitated" may mean formed in a precipitation reaction.

As used herein, "precipitation reaction" may mean a chemical reaction wherein two solutions containing dissolved ionic species are combined and the ions react to form a solid.

As used herein, "lime" may be a material comprising quicklime (calcium oxide, CaO), hydrated lime (calcium hydroxide, $Ca(OH)_2$), or a mixture of the two.

As used herein, "pozzolan" may be a silicate or aluminosilicate mineral, either naturally occurring or synthesized (man-made). It may be any silicate-bearing material that is capable of reacting with lime to set and harden, with or without the presence of water, to form a cement or concrete.

As used herein, "electrochemical calcium hydroxide" may be calcium hydroxide created using a component or reagent such as an acid or a base produced in an electrochemical reactor.

As used herein, "low-temperature calcium hydroxide" may be calcium hydroxide synthesized in a process with a maximum temperature below about 100 degrees Celsius (° C.).

As used herein, "decarbonized calcium hydroxide" may be calcium hydroxide synthesized in a process that emits to the atmosphere less than about 0.50 kilograms (kg) $CO_2$ per kg $Ca(OH)_2$.

As used herein, "Brunauer-Emmett-Teller (BET) technique" or "BET technique" may refer to a method of measuring the specific surface area (surface area per unit mass expressed in square meter per gram ($m^2/g$)) of a solid material via the adsorption of gas molecules on the surface of the solid.

As used herein, "Barrett, Joyner, and Halenda pore volume" or "BJH pore volume" may refer to the volume of mesopores per unit mass expressed in milliliters per gram (mL/g) of a solid material measured via adsorption and/or condensation of gas molecules inside mesopores of the solid.

To prepare a sample for gas adsorption analysis, the sample is first weighed in a clean glass sample tube. The mass of sample analyzed should be between about 400 mg and 600 mg. Then the sample is degassed to remove any volatile compounds from the sample. This ensures the surface of the sample material is clean and that no gasses other than the adsorption gas will evolve from the sample during analysis. For samples that do not degrade or decompose during degassing such as most pozzolans, the degassing is typically performed by bringing the sample to a temperature of 300° C. and a pressure of 1 atm for at least 3 hours. If there is a risk that the sample will degrade or decompose during this degassing procedure, as may occur with some calcium hydroxide materials, the sample may be degassed at a lower temperature such as 150° C. for a longer period of time such as 12 hours. Once the sample is degassed, it is transferred to a surface analyzer instrument such as a Micromeritics 3Flex Adsorption Analyzer. An appropriate adsorbate gas that is inert to the sample is selected to ensure that the only interaction between the gas and sample is the physical adsorption of the gas onto the surface, and that there are no other chemical reactions. Typically, $N_2$ is chosen as the adsorption gas for cement, pozzolan, and lime materials. The sample is then immersed in liquid nitrogen until the sample temperature is equal to the liquid nitrogen temperature. The surface analyzer then brings the sample chamber to vacuum, begins dosing known quantities of nitrogen, and allows the system to equilibrate after each does. Once the system reaches equilibrium, the pressure and gas volume that has been dosed are recorded and another quantity of gas is dosed. Once the pressure reaches saturation pressure, $P_0$, the process is reversed, and gas is pumped out of the chamber. This allows for both adsorption and desorption of the analysis gas on the sample surface. The resulting isotherm can be displayed as a graph, with one axis displaying pressure divided by saturation pressure, $P/P_0$, and the other axis displaying the quantity of adsorbed gas, in mol $N_2$ normalized by weight of sample. As pressure increases, the quantity of gas adsorbed on the sample increases. Once the isotherm is collected, the data may be analyzed by applying the BET (Brunauer, Emmet, and Teller) theory of multilayer gas adsorption to determine the sample's specific surface area, and the BJH (Barrett, Joyner, and Halenda) theory of multilayer pore adsorption to determine the volume of pores with diameters between 1 nm and 150 nm, and the relative distribution of pore sizes within the solid sample.

BET theory relates the formation of adsorption layers at low pressure to the volume of gas absorbed, allowing for determination of the specific surface are of the sample. The theory is applied at low values of equilibrium pressure ($P/P_0<0.4$) to avoid the formation of too many adsorption layers. Because the theory depends on the atomic radius of the gas, the cross-section area, the sample surface roughness, and the condensation temperature, the measured surface area can vary depending on the analysis gas. The values specified herein refer to $N_2$ gas adsorption measurements. At least three data points at values of $P/P_0$ between 0.025 and 0.30 are used to calculate the specific surface area using the BET equation.

While BET theory uses the lower range of $P/P_0$ to determine the specific surface area, BJH theory uses the upper range of $P/P_0$ to determine the micropore volume of the sample. At $P/P_0$ values about around 0.5, the sample surface may be completely covered with adsorbed gas molecules, and the adsorption of multilayers of gas molecules layers may begin. As the adsorbed gas layers increase in thickness, some pores may completely fill with gas. Because the number of layers of adsorbed gas is limited, BJH theory may only be able to determine the volume of pores with diameters between about 1 nm and 150 nm. Due to pore geometry and adsorption kinetics effects, the adsorption branch of the isotherm may produce a different measured pore volume than the desorption branch. Herein, BHJ pore volumes refer to values measured using the desorption branch of the isotherm, which may give a more accurate measure of pore volume and pore size distribution.

As used herein, "Blaine fineness" may mean air-permeability specific surface area.

As used herein, "water demand" may mean the amount of water that must be added to a particulate solid to produce a paste with the same consistency as a portland cement paste made with 0.4 parts water per 1.0 parts cement by mass.

As used herein, "paste consistency water demand" may refer to the water demand as determined by comparing the consistency of a paste made from a particulate solid sample mixed distilled water to the consistency of a reference paste. The reference paste is prepared by mixing 100 grams (g) of portland cement with 40 g of water (water/binder mass ratio of 0.40). The paste is mixed well by hand using a spatula for at least one minute. The sample paste is prepared by mixing 100 g of the particulate solid sample material with a known quantity of distilled water. The quantity of water added may be adjusted based on the desired water/binder mass ratio (for example, for a water/binder mass ratio of 0.30, 30 g of water would be added to 100 g of the particulate solid). The paste is mixed well by hand using a spatula for at least one minute, at which point the consistency of the sample paste is compared with the consistency of the reference paste. If the consistency of the sample paste is thicker than the consistency of the reference paste, an additional 5 g water may be added to the sample paste and mixed again for one minute. This process may be repeated until the sample paste has the same consistency as the reference solution paste. The final water demand of the sample is determined by dividing the total amount of water added to the paste by the starting amount of the dry particulate solid sample material. This entire process must be completed within 10 minutes (min) to ensure the reference paste viscosity does not change significantly during the measurement.

As used herein, "mini-slump cone water demand" may refer to the water demand as measured by paste spread from a mini-slump cone. A mini-slump cone with 19 millimeters (mm) top diameter, 38 mm bottom diameter, and 57 mm height is placed on a flat paper marked with a set of concentric circles with different diameters from 30 mm to 200 mm. 100 g of the particulate solid to be measured is combined with a known quantity of distilled water. The quantity of water added may be adjusted based on the desired water/binder mass ratio (for example, for a water/binder mass ratio of 0.40, 40 g of water would be added to 100 g of the particulate solid). The particulate solid and water are mixed using a shear mixer for 30 s, then mixed with a spatula for 15 seconds (s), and finally mixed again for another 30 s with the shear mixer. The homogeneously mixed paste is immediately poured into the mini slump-cone, and then the cone is lifted slowly. After 30 s, a digital photograph is taken directly above the spread paste. This photograph is then digitally analyzed to determine the spread area and calculate the equivalent diameter of the spread. Each paste is tested in triplicate, using three separately mixed batches of paste. The water demand is defined as the amount of water that must be added to a particulate solid to produce a suspension with the same spread flow diameter as a portland cement paste made with 0.4 parts water per 1.0 parts cement by mass.

As used herein, "calcium hydroxide reactivity" may mean the percentage of calcium hydroxide that reacts with a high reactivity metakaolin pozzolan to form a calcium aluminum silicate hydrate, consuming the calcium hydroxide. To measure the calcium hydroxide reactivity, 20 g of calcium hydroxide is mixed with 40 g high reactivity metakaolin and 54 g of 0.5 molar potassium hydroxide solution in deionized water. The paste is mixed at 1600±50 revolutions per minute (rpm) using a high-shear mixer to achieve a homogeneous paste consistency. Approximately 50 g of the paste is poured into a small plastic container, sealed, and cured at 40±2° C. until the test day. The paste sample is unsealed and demolded after 28 days. Within 6 hours of demolding, approximately 100 mg of the paste sample is placed into a crucible and heated inside a thermogravimetric analysis (TGA) instrument to a temperature of 900° C. at a rate of 10° C./min. The amount of calcium hydroxide remaining in the sample is determined based on the thermal decomposition of calcium hydroxide to calcium oxide, which occurs at a temperature of around 400-500° C. The thermal decomposition leads to a mass loss in the sample, which may be used to calculate the amount of calcium hydroxide in the original sample. The reactivity of the calcium hydroxide is determined as the percentage of the original 20 g calcium hydroxide that reacted in the cured paste sample. For example, if 1 gram of calcium hydroxide remains unreacted, then 20 g−1 g=19 g of calcium hydroxide reacted, for a reactivity of 19 g/20 g=95%.

As used herein, "aspect ratio" may mean the ratio of a particle's major diameter to its minor diameter.

As used herein, "raw or calcined natural pozzolan or clay" may refer to a raw or calcined naturally occurring material that behaves as a pozzolan in accordance with the definition of the term "natural pozzolan" provided in ASTM C125-20, "Standard Terminology Relating to Concrete and Concrete Aggregates." Examples of raw or calcined natural pozzolan or clay may include without limitation volcanic ash, tuff, pumicite, opaline chert, opaline shale, metakaolin, diatomaceous earth, rhyolite, and perlite.

As used herein, "cement mortar compressive strength" may refer to the compressive strength as determined using the procedures of the test method described in ASTM C109.

As used herein, "initial setting time" may refer to the time of setting as determined using the procedures of the test method described in ASTM C191.

Various embodiments include cementitious compositions with low levels of embodied greenhouse gas emissions, in particular carbon dioxide, as a result of its production and/or use compared to conventional cementitious materials, such as portland cement. Broadly, the various embodiments include any cementitious material or materials with low embodied carbon, as well as any material produced using this cement (including concrete/mortar and applications thereof such as buildings, roads, etc.). The various embodiments also include methods for making and using said materials. Compositions according to the various embodiments include pozzolanic cement blends comprising decarbonized lime, one or more pozzolans, and optionally additional components. Said decarbonized lime may be produced using a process wherein the combined $CO_2$ emissions to the atmosphere from chemically bound sources in the raw material and from the combustion of fuels is less than 1 kg $CO_2$ per kg lime. In some embodiments, the material is a pozzolanic cement blend composition comprising decarbonized lime, at least one pozzolan, and optionally additional components. Said lime may comprise quicklime (calcium oxide, CaO), hydrated lime (calcium hydroxide, $Ca(OH)_2$), or a mixture of the two. The cement may react with water to set and harden, which enables it to be used as a component of concrete, mortar, and other similar building materials. This cement blend may replace the use of portland cement in many applications. Since the manufacture of portland cement results in 8% of all global $CO_2$ emissions, and the cement blends of the various embodiments will result in significantly lower $CO_2$ emissions. In various embodiments, substitution or replacement of portland cement with decarbonized pozzolanic cement in accordance with various embodiments may be used as a method to significantly reduce atmospheric $CO_2$ emissions.

Various embodiments provide a cementitious material that has low embodied carbon, meaning less $CO_2$ emitted to the atmosphere as a result of its production, compared to conventional cementitious materials, such as portland cement. Broadly, various embodiments may provide cementitious materials that have low embodied carbon. Various embodiments also include materials, structures, and/or objects made entirely or partially from said cementitious materials that have low embodied carbon, including concrete, mortar, grout, stucco, plaster, fillers, aggregate, whitewashes, bricks, boards, pre-cast forms, shotcrete/gunite, housing foundations, sidewalks, roads, bridges, dams, etc. Various embodiments also include methods used for producing the low-embodied carbon cementitious material or any methods for using the low-embodied carbon cementitious material to produce other products.

Various embodiments may include a low-embodied-carbon cement blend composition comprising lime, at least one pozzolan, and optionally additional components. In some embodiments, the cement may be made using lime and/or pozzolan(s) that are produced using a process with substantially reduced $CO_2$ emissions to the atmosphere due to the consumption of fossil fuels. In some embodiments, the cement is made from lime and/or pozzolan(s) that are produced using a process with substantially reduced "chemical" $CO_2$ emissions to the atmosphere, meaning $CO_2$ emissions originating from chemical reactions involved in synthesizing the material, including, but not limited to, the conversion of limestone to lime. Various embodiments also include methods of manufacturing said cements.

Various embodiments may include methods to manufacture the cements described herein. Various embodiments may include cement compositions as described herein. Various embodiments may include cement with certain properties or performance characteristics as described herein.

In various embodiments, the cement may include lime. In various embodiments, the lime may comprise quicklime (calcium oxide, CaO), hydrated lime (calcium hydroxide, $Ca(OH)_2$), or a mixture of the two. Most typically the lime of the various embodiments may be hydrated lime. The lime may contain impurities of elements other than calcium, oxygen, and hydrogen. In some cases, the lime may contain as much as 50% by mass magnesium oxide or magnesium hydroxide. The lime may also contain other trace impurities, such as compounds of aluminum, silicon, iron, sodium, potassium, chlorine, nitrogen, sulfur, or other elements. These impurities may include chloride ions, sulfate ions, or nitrate ions. The lime may be in the form of solid particles with major diameters between 1 nanometer (nm) and 1 mm. The most typical lime particle major diameter range may be 500 nm-30 microns in various embodiments. The lime may be a dry, free flowing powder. The lime may also contain some moisture as adsorbed or liquid water. The lime may be a suspension of particles in water or an aqueous solution, such as a sodium hydroxide solution. According to some embodiments, the low-embodied-carbon cement blend will contain at least 1% by mass of the lime. Most typically the cement blend will contain 10-50% by mass of lime in various embodiments.

In various embodiments, the lime may have one or more of the following attributes, including combinations and variations of the following attributes.

In various embodiments, the lime have a specific surface area of at least 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using a Brunauer-Emmett-Teller (BET) technique. In various embodiments, the lime have a specific surface area of about 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, 1000 $m^2/g$, or 0.01-1000 $m^2$ g as measured using a Brunauer-Emmett-Teller (BET) technique In various embodiments, the lime may have a specific surface area of less than 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using a Brunauer-Emmett-Teller (BET) technique.

In various embodiments, the lime may have a micropore volume and/or a Barrett, Joyner and Halenda (BJH) pore volume of at least 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g. In various embodiments, the lime may have a micropore volume and/or a Barrett, Joyner and Halenda (BJH) pore volume of about 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, 50 mL/g, or 0.01-50 mL/g.

In various embodiments, the lime may have a micropore volume and/or a Barrett, Joyner and Halenda (BJH) pore volume of less than 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g.

In various embodiments, the lime may have a Blaine fineness (air-permeability specific surface area) of at least 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using the method and apparatus described in ASTM C204: Test Methods for Fineness of Hydraulic Cement by Air-Permeability Apparatus. In various embodiments, the lime may have a Blaine fineness (air-permeability specific surface area) of at least 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, 1000 $m^2/g$, or 0.01-1000 $m^2/g$ as measured using the method and apparatus described in ASTM C204: Test Methods for Fineness of Hydraulic Cement by Air-Permeability Apparatus.

In various embodiments, the lime may have a Blaine fineness (air-permeability specific surface area) of less than 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using the method and apparatus described in ASTM C204: Test Methods for Fineness of Hydraulic Cement by Air-Permeability Apparatus.

In various embodiments, the lime may have a hexagonal prism and/or hexagonal antiprism morphology.

In various embodiments, the lime may have an average roughness factor of less than 1.1, 1.2, 1.3, 1.5, 1.75, 2, 2.5, 3, 4, 5, 6, 7, 8, 9, 10, 15, 20, 25, 30, 40, 50, 60, 70, 80, 90, or 100, where roughness factor is defined as the quotient of a particle's actual surface area to volume ratio to the surface area to volume ratio expected for a sphere having the same volume as the actual particle.

In various embodiments, the lime may have a water demand of a lime paste less than 0.2, 0.25, 0.3, 0.35, 0.4, 0.45, 0.5, 0.55, 0.6, 0.65, 0.7, 0.75, 0.8, 0.85, 0.9 on a weight basis to obtain a sufficiently flowable colloidal suspension. The water demand may be determined from the rheology of a colloidal suspension of lime and water compared to a reference solution. According to one method, the reference solution is ordinary portland cement as defined by ASTM C150: Specification for Portland Cement, and water as defined by ASTM C1682: Specification for Mixing Water Used in the Production of Hydraulic Cement Concrete, in a mass ratio of 0.4:1 parts water to cement. For example, the amounts used may be 100 g of ordinary portland cement and 40 g of water. The reference suspension may be used for calibration, preferably by one skilled in the art of cement testing. The test colloidal suspension may be prepared by adding 100 g of dry powdered lime to a mixing container, and adding 10 g of water. This mixture may be mixed well by hand for at least a minute, at which point the viscosity of the colloidal suspension is compared to the reference described above. If the viscosity is deemed higher than the reference solution, water may be added in 5 g increments and mixed again for one minute. This process may be repeated until the sample solution has the same viscosity as the reference solution prepared. The final water demand may be determined by dividing the total amount of water added to the colloidal suspension by the starting amount of dry powdered lime used.

In various embodiments, the lime may have a flow table spread of a lime mortar of at least 20%, 30%, 40%, 50%, 60%, 70%, 80%, or 90% as measured using the method and apparatus described in ASTM C1437: Standard Test Method for Flow of Hydraulic Cement Mortar, using a mortar with a ratio of 1:2.75 lime to Graded Test sand as defined by ASTM C109. In various embodiments, the lime may have a flow table spread of a lime mortar of about 20%, 30%, 40%, 50%, 60%, 70%, 80%, 90%, or 20-90% as measured using the method and apparatus described in ASTM C1437: Standard Test Method for Flow of Hydraulic Cement Mortar, using a mortar with a ratio of 1:2.75 lime to Graded Test sand as defined by ASTM C109. The mortar may be prepared using a water to dry powdered lime ratio of 0.485:1 following the ratio outlined in ASTM C109, where said water is defined by ASTM C1682: Specification for Mixing Water Used in the Production of Hydraulic Cement Concrete. The mortar may be mixed in accordance with the mixing procedure included in ASTM C109: Test Method for Compressive Strength of Hydraulic Cement Mortars (using 2-in. Or [50-mm] Cube Specimens).

In various embodiments, the lime may have a water demand of a lime mortar less than 0.2, 0.25, 0.3, 0.35, 0.4, 0.45, 0.5, 0.55, 0.6, 0.65, 0.7, 0.75, 0.8, 0.85, 0.9 on a weight basis while obtaining a flowable colloidal suspension. The water demand of a lime mortar may be determined by preparing a mortar mix consisting of dry powdered lime and Graded Test Sand as defined by ASTM C109: Test Method for Compressive Strength of Hydraulic Cement Mortars (using 2-in. Or [50-mm] Cube Specimens), in a 1:2.75 mass ratio. This mass ratio may be determined by ASTM C109, a standard ratio of cementitious material to sand. The actual amount of dry powdered lime used may be 250 g and the actual amount of sand used may be 687.5 g. Water as defined by ASTM C1682: Specification for Mixing Water Used in the Production of Hydraulic Cement Concrete, may be added initially at a weight fraction of 0.1, or 25 g, and the mixing procedure specified in ASTM C109 may be used to prepare the mortar. The mortar may be evaluated for flow using the method and apparatus found in ASTM C1437: Standard Test Method for Flow of Hydraulic Cement Mortar. If the mortar flow is less than 30%, a weight fraction of 0.05, or 12.5 g, may be added to the mortar. The mixing procedure specified in ASTM C109 may be conducted again, following which the flow determination procedure found in ASTM C1437 may be conducted. This process may be repeated until the sample suspension has a mortar flow greater than 30%. The final water demand is determined by dividing the total amount of water added to the colloidal suspension by the starting amount of dry powdered lime used. The sand is not included in the weight determination.

In various embodiments, the lime may have an average primary particle diameter of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In various embodiments, the lime may have an average primary particle diameter of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In various embodiments, the lime may have an average primary particle diameter of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In various embodiments, the lime may have a narrow particle size distribution, as defined by having at least 50%, 60%, 70%, 80%, 90%, 95%, or 99% of particles by count or by mass within a diameter range having a width of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In various embodiments, the lime may have a wide particle size distribution, as defined by having at least 50%, 60%, 70%, 80%, 90%, 95%, or 99% of particles by count or by mass within a diameter range having a width of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In various embodiments, the lime may have a wide particle size distribution, as defined by having at least 50%, 60%, 70%, 80%, 90%, 95%, or 99% of particles by count or by mass within a diameter range having a width of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In various embodiments, the lime may have a primary crystal morphology with hexagonal cross-section, including the morphology of a hexagonal prism.

In various embodiments, the lime may have a minimum aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In various embodiments, the lime may have a minimum aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, 50, or 1-50.

In various embodiments, the lime may have an average aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In various embodiments, the lime may have an average aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, 50, or 1-50.

In various embodiments, the lime may have a minimum aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In various embodiments, the lime may have an average aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In various embodiments, the lime may have an amorphous content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9% or 99.99%, by mass or volume. In various embodiments, the lime may have an amorphous content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9%, 99.99%, or 0.01-99.99%, by mass or volume In various embodiments, the lime may have an amorphous content of less than 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9% or 99.99%, by mass or volume.

In various embodiments, the lime may have a specific surface area to major diameter ratio of at least 0.1 $(m^2/g)/$micron, 0.2 $(m^2/g)/$micron, 0.3 $(m^2/g)/$micron, 0.5 $(m^2/g)/$micron, 0.7 $(m^2/g)/$micron, 1 $(m^2/g)/$micron, 3 $(m^2/g)/$micron, 5 $(m^2/g)/$micron, 7 $(m^2/g)/$micron, 10 $(m^2/g)/$micron, 20 $(m^2/g)/$micron, 30 $(m^2/g)/$micron, 40 $(m^2/g)/$micron, 50 $(m^2/g)/$micron, 70 $(m^2/g)/$micron, or 100 $(m^2/g)/$micron. In various embodiments, the lime may have a specific surface area to major diameter ratio of about 0.1 $(m^2/g)/$micron, 0.2 $(m^2/g)/$micron, 0.3 $(m^2/g)/$micron, 0.5 $(m^2/g)/$micron, 0.7 $(m^2/g)/$micron, 1 $(m^2/g)/$micron, 3 $(m^2/g)/$micron, 5 $(m^2/g)/$micron, 7 $(m^2/g)/$micron, 10 $(m^2/g)/$micron, 20 $(m^2/g)/$micron, 30 $(m^2/g)/$micron, 40 $(m^2/g)/$micron, 50 $(m^2/g)/$micron, 70 $(m^2/g)/$micron, 100 $(m^2/g)/$micron, or 0.1-100 $(m^2/g)/$micron.

In various embodiments, the lime may have a specific surface area to major diameter ratio of less than 0.1 $(m^2/g)/$micron, 0.2 $(m^2/g)/$micron, 0.3 $(m^2/g)/$micron, 0.5 $(m^2/g)/$micron, 0.7 $(m^2/g)/$micron, 1 $(m^2/g)/$micron, 3 $(m^2/g)/$micron, 5 $(m^2/g)/$micron, 7 $(m^2/g)/$micron, 10 $(m^2/g)/$micron, 20 $(m^2/g)/$micron, 30 $(m^2/g)/$micron, 40 $(m^2/g)/$micron, 50 $(m^2/g)/$micron, 70 $(m^2/g)/$micron, or 100 $(m^2/g)/$micron.

In various embodiments, the lime may have a purity of at least 80%, 82%, 84%, 86%, 88%, 90%, 92%, 94%, 95%, 96%, 97%, 98%, 99%, 99.5%, 99.9% or 99.99% by mass calcium hydroxide. In various embodiments, the lime may have a purity of about 80%, 82%, 84%, 86%, 88%, 90%, 92%, 94%, 95%, 96%, 97%, 98%, 99%, 99.5%, 99.9%, 99.99%, or 80-99.99% by mass calcium hydroxide.

In various embodiments, the lime may have a purity of less than 80%, 82%, 84%, 86%, 88%, 90%, 92%, 94%, 95%, 96%, 97%, 98%, 99%, 99.5%, 99.9% or 99.99% by mass calcium hydroxide.

In various embodiments, the lime may have silica content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have silica content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.01-50% by mass.

In various embodiments, the lime may have silica content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have calcium carbonate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have calcium carbonate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have calcium carbonate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the lime may have a magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a magnesium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a magnesium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the lime may have magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a magnesium hydroxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a magnesium hydroxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the lime may have magnesium hydroxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a calcium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a calcium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In various embodiments, the lime may have a calcium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a chloride content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a chloride content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In various embodiments, the lime may have a chloride content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a nitrate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a nitrate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass In various embodiments, the lime may have a nitrate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a nitrite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a nitrite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In various embodiments, the lime may have a nitrite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a sulfate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a sulfate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the lime may have a sulfate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a sulfite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a sulfite content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In various embodiments, the lime may have a sulfite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the lime may have a phosphate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the lime may have a phosphate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In various embodiments, the lime may have a phosphate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

Without being limited by any particular theory, some of these properties of the lime may improve its performance in cement. In particular, lime with a large primary particle diameter, small specific surface area, and/or small micropore volume may correlate with low water demand. That is to say, these properties may mean less water must be added to cement containing such lime in order to achieve sufficiently high flow, large slump, or low viscosity. This may be because particles with large primary particle diameter, small specific surface area, and/or small micropore volume adsorb or absorb smaller amounts of water, have smaller surface friction, have smaller viscous forces in suspension, or for other related reasons. Cements and/or concretes with lower water demand may perform better because they can have sufficient flow, slump, or viscosity to be cast, pumped, or poured as needed to meet the requirements of a particular application, while having less water added to the blend. Adding less water to the blend may result in higher compressive strength and/or shorter setting times. This may be because adding less water leads to lower pore volume in the hydrated, set, and/or hardened cement, mortar, or concrete, and reduced pore volume is correlated with increased compressive strength. In addition, particles with certain diameters or diameter distributions may enable higher packing efficiency or filling in of gaps or voids between particles or aggregates in cement or concrete, resulting in a denser material with higher compressive strength. Cements, mortars, or concretes made with lower water to binder ratios may also have lower permeability due to lower porosity and a less interconnected pore structure (more closed and isolated pores), and therefore may resist penetration by chlorides, sulfates, or other ionic or molecular species that could lead to degradation of building materials or structures.

In some embodiments, the lime may be produced using a method that reduces or eliminates entirely the emission of $CO_2$ into the atmosphere due to the consumption of fossil fuels during the production of the lime. Conventional quicklime (calcium oxide) may be produced by calcining limestone at high temperatures by burning fossil fuels, such as coal. According to the various embodiments, the lime may be produced by alternate means that reduce or eliminate the emission of $CO_2$ from the consumption of fossil fuels.

In some embodiments, the lime may be "electrochemical" lime, meaning that the production of the lime comprises the use of an electrochemical process or an electrochemical device. In some embodiments, the lime may be "electrolytic" lime, meaning the lime is produced in a process that uses an electrolyzer. In some embodiments, the lime may be "precipitated" lime, meaning it is produced via a precipitation reaction. In some embodiments the lime will be "decarbonized" lime or "carbon-neutral" lime, meaning it is produced via a process with reduced or zero carbon dioxide emissions. In some embodiments, the embodied carbon dioxide of the lime will be at least 50%, at least 60%, at least 70%, at least 80%, at least 90%, at least 95%, at least 98%, at least 99%, or 100% lower than lime manufactured using incumbent carbon-intensive technologies. Such technologies may include the production of lime from carbonates such as limestone and in which the $CO_2$ emissions are not captured and sequestered or utilized, or where process emissions are incurred by heating said lime or its precursors by the combustion of fossil fuels.

In some embodiments, the lime may be produced using electrochemical methods, including but not limited to those described in International Patent Application Publication No. WO 2020/186178, International Patent Application Publication No. WO 2020/150449, and International Patent Application Publication No. WO 2022/020572, there entire contents of all three of which are hereby incorporated by reference for all purposes. The term "electrochemical methods" may be here understood to mean any process wherein electricity is used to power a device with a positive electrode, a negative electrode, and an electrolyte, wherein said electrolyte or a product of the electrochemical reaction of the electrolyte is used to carry out a chemical or electrochemical reaction with a source of calcium. In some embodiments, said electricity may be produced at least in part using a non-fossil-fuel source of energy. In one such electrochemical process, an electrochemical reactor may be used to produce acid and/or base from an aqueous electrolyte. The electrolyzer may be powered by renewable, non-fossil-fuel sources of electricity such as solar or wind energy. The electrolyzer may produce an acid that may be used to leach calcium ions from a calcium-bearing mineral input (e.g., limestone, waste concrete/cement, fly ash, bottom ash, incinerator ash, steel slag, iron slag, wollastonite, basalt or other similar sources). In some embodiments, calcium hydroxide is precipitated from the resulting solution of $Ca^{2+}$ ions upon mixing said solution with a base. In some embodiments, the base may also be produced by an electrolyzer. In other embodiments, said acid may be obtained from a non-electrolytic source, and said base may be obtained from an electrolytic source, or vice versa.

Figure 2:
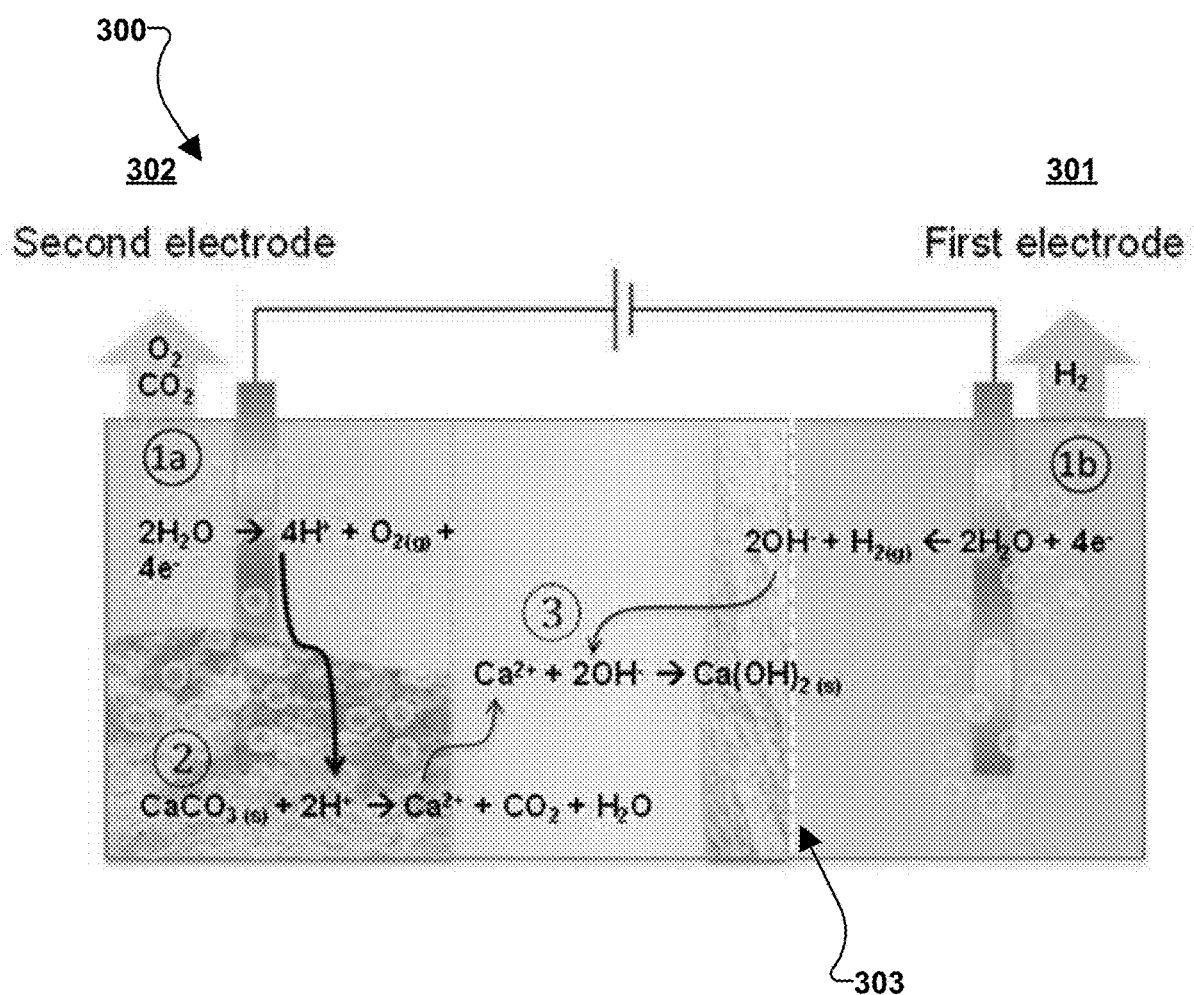
FIG. 2 illustrates a specific example reactor in accordance with various embodiments comprising a first electrode and a second electrode.

As one specific example, the lime may be produced using renewable energy as illustrated in FIG. 1 in which a specific example system 200 is shown for generating cement. For example, a reactor may be a neutral-water electrolyzer 202 and the power source may be a renewable energy power source 206 (e.g., providing electricity from wind energy, solar energy, etc.). As a specific example, the neutral-water electrolyzer 202 may be an electrochemical reactor 300 as illustrated in FIG. 2. As illustrated in FIG. 1, the electrochemical decarbonation reactor (decarbonation cell 202) powered by renewable electricity from renewable energy source 206 converts $CaCO_3$ to $Ca(OH)_2$ for use in cement synthesis by a cement plant kiln 208. The decarbonation cell 202 uses the pH gradient produced by neutral-water electrolysis to dissolve $CaCO_3$ at the acidic anode and precipitate $Ca(OH)_2$ where the pH≥12.5. Simultaneously, $H_2$ is generated at the cathode and $O_2/CO_2$ are generated at the anode. These gas streams can serve several alternative roles in a sustainable production system. $CO_2$ can be directly captured for carbon capture and sequestration (CCS). Electricity or heat can be generated from the $H_2$ and $O_2$ via fuel cells 204 or combustors 205. The $O_2/CO_2$ oxy-fuel can be recirculated to the kiln 208 for cleaner combustion in the cement sintering cycle. $CO_2$ reuse and utilization ($CO_2U$) concepts can be employed, such as use in enhanced oil recovery (EOR) or production of liquid fuels. In some embodiments, the $Ca(OH)_2$ produced in this fashion may be an electrochemical calcium hydroxide, a decarbonized calcium hydroxide, and/or a precipitated calcium hydroxide. In some embodiments, the system comprises a reactor (e.g., an electrochemical reactor or other type reactor). In some embodiments, the reactor comprises the first electrode and the second electrode. For example, in some embodiments, the first electrode is electrochemically coupled to the second electrode in the reactor. FIG. 2 illustrates an example of such a reactor 300 including a first electrode 301 and the second electrode 302. In accordance with some embodiments, the production of the base by the first electrode (e.g., 301) results in an alkaline region (e.g., any alkaline region described herein) near the first electrode (e.g., within the half of the reactor compartment that is closest to the first electrode). For example, in some instances, the fluid adjacent the first electrode (e.g., the alkaline region) has a higher pH than fluid further away from the first electrode. In some embodiments, the second electrode (e.g., 302) is configured to produce an acidic output (e.g., any of the acids described herein). In certain embodiments, the acidic output is produced as a result of an electrochemical reaction in the second electrode. In some embodiments, the first mode of the reactor comprises producing acid near the second electrode (e.g., acid is produced as a result of an electrochemical reaction in the second electrode). In certain embodiments, the first electrode (e.g., cathode (e.g., 301)) is configured to produce hydrogen gas, such that hydrogen gas can be produced near the first electrode (e.g., the hydrogen gas is produced as a result of an electrochemical reaction in the first electrode). In some instances, running the reactor in the first mode comprises producing hydrogen gas (e.g., hydrogen gas and base) near the first electrode (e.g., hydrogen gas is produced as a result of an electrochemical reaction in the first electrode). In some instances, the hydrogen gas and/or base are produced near the first electrode by reduction of water near the first electrode. In certain embodiments, the second electrode (e.g., anode (e.g., 302)) is configured to produce oxygen, such that oxygen gas can be produced near the second electrode (e.g., the oxygen gas is produced as a result of an electrochemical reaction in the second electrode). In certain cases, running the reactor in the first mode comprises producing oxygen gas (e.g., oxygen gas and acid) near the second electrode (e.g., oxygen gas is produced as a result of an electrochemical reaction in the second electrode). In some instances, the oxygen gas and/or acid are produced near the second electrode by oxidation of water near the second electrode.

In some embodiments, the system is configured to allow oxygen gas to diffuse and/or be transported to a location near the first electrode (e.g., 301) (e.g., from a location near the second electrode (e.g., 302)). For example, in some cases, the system is configured to allow oxygen gas to diffuse and/or be transported to fluid near the first electrode (e.g., 301), such that the oxygen gas could be involved in an electrochemical reaction in the first electrode, from fluid near the second electrode, after the oxygen gas was produced as a result of an electrochemical reaction in the second electrode.

According to certain embodiments, the system is configured to allow the oxygen gas to be reduced near the first electrode (e.g., 301) (e.g., the oxygen gas is reduced as a result of an electrochemical reaction in the first electrode). In some embodiments, reducing the oxygen gas near the first electrode comprises production of a base. In certain embodiments, the production of a base is advantageous because it increases the overall amount of base produced at the first electrode.

In some embodiments, the system is configured to allow hydrogen gas to diffuse and/or be transported to a location near the second electrode (e.g., 302) (e.g., from a location near the first electrode (e.g., 301)). For example, in some cases, the system is configured to allow hydrogen gas to diffuse and/or be transported to fluid near the second electrode, such that the hydrogen gas could be involved in an electrochemical reaction in the second electrode, from fluid near the first electrode, after the hydrogen gas was produced as a result of an electrochemical reaction in the first electrode.

According to certain embodiments, the system is configured to allow the hydrogen gas to be oxidized near the second electrode (e.g., 302) (e.g., hydrogen gas is oxidized as a result of an electrochemical reaction in the second electrode). In some embodiments, oxidizing the hydrogen gas near the second electrode comprises production of acid. In certain embodiments, the production of acid is advantageous because it increases the overall amount of acid produced at the second electrode.

In some embodiments, the system comprises a separator (e.g., 303). In certain embodiments, the separator is configured to allow oxygen gas produced at the second electrode (e.g., 302) to diffuse to the first electrode (e.g., 301) and/or to allow hydrogen gas produced at the first electrode to diffuse to the second electrode. For example, in some embodiments, the separator is permeable to oxygen gas and/or hydrogen gas.

In some embodiments, both the acid and the base are provided from a non-electrolytic source. Nonetheless, by using the afore-mentioned dissolution and/or precipitation processes to produce lime, the use of fossil fuels as a source of heat may be reduced or avoided entirely.

In some embodiments, the lime may be produced from a feedstock material comprising calcium carbonate. In some embodiments, said feedstock comprises limestone. In some embodiments, said lime may be produced from limestone using one or more of the aforementioned electrochemical or chemical processes. Furthermore, in some embodiments, the $CO_2$ released upon decomposition of said limestone is captured and used, or sequestered, so the $CO_2$ is not emitted to the atmosphere. Thus, the methods of the various embodiments may also diminish or eliminate the chemical source of $CO_2$ emissions associated with the use of a calcium feedstock comprising calcium carbonate.

In some embodiments, the lime may be produced from a calcium-containing source material that is already substantially decarbonated. This material may comprise construction and demolition waste; recycled or waste concrete, cement, mortar; a calcium-containing naturally occurring mineral such as a basaltic mineral or wollastonite; ash resulting from combustion, including but not limited to coal ash, fly ash, bottom ash, and incinerator ash, or other similar materials. In some embodiments, the lime may be produced from these decarbonized or waste materials using the methods described above. In some embodiments, the dissolution of these feedstock materials substantially or completely avoids the release of $CO_2$ molecules.

In some embodiments, waste materials from the process of manufacturing lime or cement may be used as the source of calcium. These may include lime kiln dust or cement kiln dust. In some embodiments, these materials may be lime in the form of quicklime (CaO), and may be used directly in producing a cement blend. In some embodiments, the lime kiln dust or cement kiln dust may be used as a feedstock material for a process to produce lime, including by the methods described above. In some embodiments, the use of lime kiln dust or cement kiln dust comprises the use of a decarbonized source of lime even if the process originally used to produce said lime uses fossil fuels or emits chemical $CO_2$ from the decomposition of calcium carbonate or limestone, because the use of said waste material displaces the use of a calcium source or process that does release $CO_2$ emissions to the atmosphere. In other embodiments, the lime kiln dust or cement kiln dust may be produced in a process that does not result in $CO_2$ emissions to the atmosphere, due to the use of an electric kiln or calciner and/or by capturing and sequestering $CO_2$ emissions, or beneficially using such $CO_2$ emissions in other products or applications.

In some embodiments, the lime may be produced in the form of quicklime, CaO, by calcining hydrated lime or limestone in an electric kiln powered by renewable electricity sources, and without burning fossil fuels. In some embodiments, the lime may be produced in the form of quicklime, CaO, by calcining the limestone in a kiln which does burn fossil fuels and creates $CO_2$, but where a substantial amount of said $CO_2$ is captured and stored or sequestered or used so it is not emitted to the atmosphere.

In some embodiments, the cement may include pozzolan. A pozzolan is typically a silicate or aluminosilicate mineral, either naturally occurring or synthesized (man-made). It may be any silicate-bearing material that is capable of reacting with lime to set and harden, with or without the presence of water, to form a cement or concrete. According to various embodiments, decarbonized lime as described in any preceding embodiment reacts with said pozzolan and water in a "pozzolanic reaction" that creates calcium silicate hydrate as a hydration product. Optionally, said reaction may also create other hydrated phases including but not limited to calcium aluminosilicate hydrate and/or sodium aluminosilicate hydrate phases.

In various embodiments, one or more types of pozzolan may be used in the cement composition. Specific natural or artificial pozzolans that may be used in this cement composition include: Slag (blast furnace slag, steel slag, basic oxygen furnace slag), coal ash (fly ash Class C and F, bottom ash, economizer ash, ponded ash), municipal solid waste incinerator ash, silica fume, calcined clay, calcined shale, metakaolin, volcanic tuffs, moler, gaize, ground pumice, diatomaceous earths, biomass ash (rice husk ash, sugar cane ash), ground glass, and halloysite. The pozzolan may be in the form of solid particles with major diameters between 1 nm and 1 mm. The most typical pozzolan particle's major diameter range may be 500 nm-30 micron. The pozzolan may comprise a dry powder, or a suspension of pozzolan particles in water or in an aqueous solution such as in a sodium hydroxide solution. The cement blend must contain at least 1% by mass of the pozzolan. Most typically the cement blend may contain 10-80% by mass of pozzolan.

In some embodiments, the pozzolan may be a naturally occurring material that does not incur additional $CO_2$ emissions in creating its chemical form. In some embodiments, the pozzolan may be a byproduct or waste product of an industrial process carried out primarily for a purpose other than the production of cement or concrete. Accordingly, the supply of such byproduct or waste product for use in the compositions and methods of the various embodiments does not result in the emission of substantial additional $CO_2$ to the atmosphere associated with the synthesis of such byproduct or waste product. In some embodiments, the pozzolan may be produced using a process that does not result in substantial $CO_2$ emissions to the atmosphere, such as by calcining clay in an electric calciner or kiln powered by renewable electricity sources.

In various embodiments, the pozzolan may have one or more of the following attributes, including combinations and variations of the following.

In various embodiments, the pozzolan may have a specific surface area of at least 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, or 1000 m²/g as measured using a Brunauer-Emmett-Teller (BET) technique. In various embodiments, the pozzolan may have a specific surface area of about 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, 1000 m²/g, or 0.01-1000 m²/g as measured using a Brunauer-Emmett-Teller (BET) technique.

In various embodiments, the pozzolan may have a specific surface area of less than 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, or 1000 m²/g as measured using a Brunauer-Emmett-Teller (BET) technique.

In various embodiments, the pozzolan may have a micropore volume and/or a Barrett, Joyner and Halenda (BJH) pore volume of at least 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g. In various embodiments, the pozzolan may have a micropore volume and/or a Barrett, Joyner and Halenda (BJH) pore volume of at least 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, 50 mL/g, or 0.01-50 mL/g.

In various embodiments, the pozzolan may have a micropore volume and/or a Barrett, Joyner and Halenda (BJH) pore volume of less than 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g.

In various embodiments, the pozzolan may have a Blaine fineness (air-permeability specific surface area) of at least 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, or 1000 m²/g as measured using the method and apparatus described in ASTM C204: Test Methods for Fineness of Hydraulic Cement by Air-Permeability Apparatus. In various embodiments, the pozzolan may have a Blaine fineness (air-permeability specific surface area) of about 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, 1000 m²/g, or 0.01-1000 m²/g as measured using the method and apparatus described in ASTM C204: Test Methods for Fineness of Hydraulic Cement by Air-Permeability Apparatus.

In various embodiments, the pozzolan may have a Blaine fineness (air-permeability specific surface area) of less than 0.01 m²/g, 0.05 m²/g, 0.1 m²/g, 0.3 m²/g, 0.5 m²/g, 0.7 m²/g, 1 m²/g, 2 m²/g, 3 m²/g, 4 m²/g, 5 m²/g, 6 m²/g, 7 m²/g, 8 m²/g, 9 m²/g, 10 m²/g, 12 m²/g, 15 m²/g, 20 m²/g, 25 m²/g, 30 m²/g, 35 m²/g, 40 m²/g, 45 m²/g, 50 m²/g, 60 m²/g, 70 m²/g, 80 m²/g, 90 m²/g, 100 m²/g, 120 m²/g, 150 m²/g, 200 m²/g, 300 m²/g, 400 m²/g, 500 m²/g, 700 m²/g, or 1000 m²/g as measured using the method and apparatus described in ASTM C204: Test Methods for Fineness of Hydraulic Cement by Air-Permeability Apparatus.

In various embodiments, the pozzolan may have a Water demand of a pozzolan paste less than 0.2, 0.25, 0.3, 0.35, 0.4, 0.45, 0.5, 0.55, 0.6, 0.65, 0.7, 0.75, 0.8, 0.85, 0.9 on a weight basis to obtain a sufficiently flowable colloidal suspension. The water demand is determined from the rheology of a colloidal suspension of pozzolan and water compared to a reference solution. According to one method, the reference solution is ordinary portland cement as defined by ASTM C150: Specification for Portland Cement, and water as defined by ASTM C1682: Specification for Mixing Water Used in the Production of Hydraulic Cement Concrete, in a mass ratio of 0.4:1 parts water to cement. For example, the amounts used may be 100 g of ordinary portland cement and 40 g of water. The reference suspension is used for calibration, preferably by one skilled in the art of cement testing. The test colloidal suspension may be prepared by adding 100 g of dry pozzolan to a mixing container, and adding 10 g of water. This mixture may be mixed well by hand for at least a minute, at which point the viscosity of the colloidal suspension is compared to the reference described above. If the viscosity is deemed higher than the reference solution, water may be added in 5 g increments and mixed again for one minute. This process may be repeated until the sample solution has the same viscosity as the reference solution prepared. The final water demand is determined by dividing the total amount of water added to the colloidal suspension by the starting amount of dry pozzolan used.

In various embodiments, the pozzolan may have a flow table spread of a pozzolan mortar of at least 20%, 30%, 40%, 50%, 60%, 70%, 80%, or 90% as measured using the method and apparatus described in ASTM C1437: Standard Test Method for Flow of Hydraulic Cement Mortar, using a mortar with a ratio of 1:2.75 pozzolan to Graded Test sand as defined by ASTM C109. In various embodiments, the pozzolan may have a flow table spread of a pozzolan mortar of about 20%, 30%, 40%, 50%, 60%, 70%, 80%, 90%, or 20-90% as measured using the method and apparatus described in ASTM C1437: Standard Test Method for Flow of Hydraulic Cement Mortar, using a mortar with a ratio of 1:2.75 pozzolan to Graded Test sand as defined by ASTM C109. The mortar may be prepared using a water to dry pozzolan ratio of 0.485:1 following the ratio outlined in ASTM C109, where said water is defined by ASTM C1682: Specification for Mixing Water Used in the Production of Hydraulic Cement Concrete. The mortar may be mixed in accordance with the mixing procedure included in ASTM C109: Test Method for Compressive Strength of Hydraulic Cement Mortars (using 2-in. Or [50-mm] Cube Specimens).

In various embodiments, the pozzolan may have a water demand of a pozzolan mortar less than 0.2, 0.25, 0.3, 0.35, 0.4, 0.45, 0.5, 0.55, 0.6, 0.65, 0.7, 0.75, 0.8, 0.85, 0.9 on a weight basis while obtaining a flowable colloidal suspension. The water demand of a pozzolan mortar may be determined by preparing a mortar mix consisting of dry pozzolan and Graded Test Sand as defined by ASTM C109: Test Method for Compressive Strength of Hydraulic Cement Mortars (using 2-in. Or [50-mm] Cube Specimens), in a 1:2.75 mass ratio. This mass ratio may be determined by ASTM C109, a standard ratio of cementitious material to sand. The actual amount of dry pozzolan used may be 250 g and the actual amount of sand used may be 687.5 g. Water as defined by ASTM C1682: Specification for Mixing Water Used in the Production of Hydraulic Cement Concrete, may be added initially at a weight fraction of 0.1, or 25 g, and the mixing procedure specified in ASTM C109 may be used to prepare the mortar. The mortar may be evaluated for flow using the method and apparatus found in ASTM C1437: Standard Test Method for Flow of Hydraulic Cement Mortar. If the mortar flow is less than 30%, a weight fraction of 0.05, or 12.5 g, may be added to the mortar. The mixing procedure specified in ASTM C109 may be conducted again, following which the flow determination procedure found in ASTM C1437 may be conducted. This process may be repeated until the sample suspension has a mortar flow greater than 30%. The final water demand is determined by dividing the total amount of water added to the colloidal suspension by the starting amount of dry pozzolan used. The sand is not included in the weight determination.

In various embodiments, the pozzolan may have an average roughness factor of less than 1.1, 1.2, 1.3, 1.5, 1.75, 2, 2.5, 3, 4, 5, 6, 7, 8, 9, 10, 15, 20, 25, 30, 40, 50, 60, 70, 80, 90, or 100, where roughness factor is defined as the quotient of a particle's actual surface area to volume ratio to the surface area to volume ratio expected for a sphere having the same volume as the actual particle.

In various embodiments, the pozzolan may have an average primary particle diameter of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In various embodiments, the pozzolan may have an average primary particle diameter of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In various embodiments, the pozzolan may have an average primary particle diameter of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In various embodiments, the pozzolan may have a narrow particle size distribution, as defined by having at least 50%, 60%, 70%, 80%, 90%, 95%, or 99% of all particles by count or by mass within a diameter range having a width of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In various embodiments, the pozzolan may have a wide particle size distribution, as defined by having at least 50%, 60%, 70%, 80%, 90%, 95%, or 99% of all particles by count or by mass within a diameter range having a width of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In various embodiments, the pozzolan may have a wide particle size distribution, as defined by having at least 50%, 60%, 70%, 80%, 90%, 95%, or 99% of all particles by count or by mass within a diameter range having a width of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In various embodiments, the pozzolan may have a primary crystal morphology with hexagonal cross-section, including the morphology of a hexagonal prism.

In various embodiments, the pozzolan may have a minimum aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In various embodiments, the pozzolan may have a minimum aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, 50, or 1-50.

In various embodiments, the pozzolan may have an average aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In various embodiments, the pozzolan may have an average aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, or 1-50.

In various embodiments, the pozzolan may have a minimum aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In various embodiments, the pozzolan may have an average aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In various embodiments, the pozzolan may have a specific surface area to major diameter ratio of at least 0.1 $(m^2/g)$/micron, 0.2 $(m^2/g)$/micron, 0.3 $(m^2/g)$/micron, 0.5 $(m^2/g)$/micron, 0.7 $(m^2/g)$/micron, 1 $(m^2/g)$/micron, 3 $(m^2/g)$/micron, 5 $(m^2/g)$/micron, 7 $(m^2/g)$/micron, 10 $(m^2/g)$/micron, 20 $(m^2/g)$/micron, 30 $(m^2/g)$/micron, 40 $(m^2/g)$/micron, 50 $(m^2/g)$/micron, 70 $(m^2/g)$/micron, or 100 $(m^2/g)$/micron. In various embodiments, the pozzolan may have a specific surface area to major diameter ratio of about 0.1 $(m^2/g)$/micron, 0.2 $(m^2/g)$/micron, 0.3 $(m^2/g)$/micron, 0.5 $(m^2/g)$/micron, 0.7 $(m^2/g)$/micron, 1 $(m^2/g)$/micron, 3 $(m^2/g)$/micron, 5 $(m^2/g)$/micron, 7 $(m^2/g)$/micron, 10 $(m^2/g)$/micron, 20 $(m^2/g)$/micron, 30 $(m^2/g)$/micron, 40 $(m^2/g)$/micron, 50 $(m^2/g)$/micron, 70 $(m^2/g)$/micron, 100 $(m^2/g)$/micron, or 0.1-100 $(m^2/g)$/micron.

In various embodiments, the pozzolan may have a specific surface area to major diameter ratio of less than 0.1 $(m^2/g)$/micron, 0.2 $(m^2/g)$/micron, 0.3 $(m^2/g)$/micron, 0.5 $(m^2/g)$/micron, 0.7 $(m^2/g)$/micron, 1 $(m^2/g)$/micron, 3 $(m^2/g)$/micron, 5 $(m^2/g)$/micron, 7 $(m^2/g)$/micron, 10 $(m^2/g)$/micron, 20 $(m^2/g)$/micron, 30 $(m^2/g)$/micron, 40 $(m^2/g)$/micron, 50 $(m^2/g)$/micron, 70 $(m^2/g)$/micron, or 100 $(m^2/g)$/micron.

In various embodiments, the pozzolan may have a purity of at least 80%, 82%, 84%, 86%, 88%, 90%, 92%, 94%, 95%, 96%, 97%, 98%, 99%, 99.5%, 99.9% or 99.99% by mass on the basis of silica or alumina and silica. In various embodiments, the pozzolan may have a purity of about 80%, 82%, 84%, 86%, 88%, 90%, 92%, 94%, 95%, 96%, 97%, 98%, 99%, 99.5%, 99.9%, 99.99%, or 80-99.99% by mass on the basis of silica or alumina and silica.

In various embodiments, the pozzolan may have a purity of less than 80%, 82%, 84%, 86%, 88%, 90%, 92%, 94%, 95%, 96%, 97%, 98%, 99%, 99.5%, 99.9% or 99.99% by mass on the basis of silica or alumina and silica.

In various embodiments, the pozzolan may have an amorphous content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9%, or 99.99%, by mass or volume. In various embodiments, the pozzolan may have an amorphous content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9%, 99.99%, or 0.01-99.99%, by mass or volume.

In various embodiments, the pozzolan may have an amorphous content of less than 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9% or 99.99%, by mass or volume.

In various embodiments, the pozzolan may have a silica content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a silica content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.01-50% by mass.

In various embodiments, the pozzolan may have a silica content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a calcium carbonate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a calcium carbonate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a calcium carbonate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a magnesium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a magnesium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a magnesium hydroxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a magnesium hydroxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a magnesium hydroxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a calcium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a calcium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a calcium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a chloride content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a chloride content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a chloride content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a nitrate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a nitrate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a nitrate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a nitrite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a nitrite content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a nitrite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a sulfate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a sulfate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a sulfate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a sulfite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a sulfite content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a sulfite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In various embodiments, the pozzolan may have a phosphate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In various embodiments, the pozzolan may have a phosphate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, or 0.001-50% by mass.

In various embodiments, the pozzolan may have a phosphate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

Without being limited by any particular theory, some of these properties of the pozzolan may improve its performance in cement. In particular, pozzolans with a large primary particle diameter, small specific surface area, and/or small micropore volume may correlate with low water demand. That is to say, these properties may mean less water must be added to cement containing such pozzolan or pozzolans in order to achieve sufficiently high flow, large slump, or low viscosity. This may be because particles with large primary particle diameter, small specific surface area, and/or small micropore volume adsorb or absorb smaller amounts of water, have smaller surface friction, have smaller viscous forces in suspension, or for other related reasons. Cements and/or concretes with lower water demand may perform better because they can have sufficient flow, slump, or viscosity to be cast, pumped, or poured as needed to meet the requirements of a particular application, while having less water added to the blend. Adding less water to the blend may result in higher compressive strength and/or shorter setting times. This may be because adding less water leads to lower pore volume in the hydrated, set, and/or hardened cement, mortar, or concrete, and reduced pore volume is correlated with increased compressive strength. In addition, particles with certain diameters or diameter distributions may enable higher packing efficiency or filling in of gaps or voids between particles or aggregates in cement or concrete, resulting in a denser material with higher compressive strength. Cements, mortars, or concretes made with lower water to binder ratios may also have lower permeability due to lower porosity and a less interconnected pore structure (more closed and isolated pores), and therefore may resist penetration by chlorides, sulfates, or other ionic or molecular species that could lead to degradation of building materials or structures.

In any of the preceding embodiments, the cement blend may optionally include one or more of the following additional components, such as one or more of: portland cement; set accelerating additives; gypsum; calcium carbonate; water reducing additives; flocculants; dispersants; defoamers; air entraining admixtures; alite (tricalcium silicate); and/or calcium aluminate cement, calcium sulfoaluminate cements, and/or or constituents thereof. Such additional components are discussed in more detail below.

In some embodiments, the cement comprises portland cement. Some portland cement may be used in the cement blend. This portland cement itself is hydraulic and sets and hardens over time. The portland cement may be added to the lime/pozzolan blend to serve as an alkali activator (portland cement contains some sodium oxide and potassium oxide, causing it to reach pH values of 13-13.5 when mixed with water). The portland cement may be added to speed up the setting and hardening of the cement compared to lime/pozzolan blends with no portland cement. The portland cement may be added to otherwise modify the fresh (unhardened) and/or hardened properties of the cement. Portland cement may be used in quantities of 0%-98% by mass of the blend. Most typically, the portland cement content may be between 0-40%.

In some embodiments, the cement comprises set accelerating additives. Chemical components may be added to the cement blend for the purpose of accelerating the setting time and strength development during hardening. These may include, without limitation, sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime. These additives may be used to affect the speed and extent of the pozzolanic reaction, and therefore affect the fresh and hardened properties of the cement. In some embodiments such additives may be used to shorten the setting time, or to increase the compressive strength, of the cement or concrete. These set accelerating admixtures may be added in quantities ranging from 0-25% by mass of the cement blend.

In some embodiments, the cement comprises gypsum. This mineral is primarily composed of calcium sulfate dihydrate. Gypsum is routinely mixed with clinker to make portland cement. Gypsum may slow down the hydration reactions of the aluminum- and iron-containing components of portland cement to prevent "flash setting." Gypsum may be added to the lime/pozzolan cement described here for a similar purpose. Gypsum may also be added to aid in the formation of sulfate-containing hardened phases such as ettringite, therefore contributing to the strength of hardened cement. Gypsum may be added or to otherwise modify the fresh or hardened properties of the cement. Gypsum may be added in quantities ranging from 0-25% by mass of the cement blend.

In some embodiments, the cement comprises calcium carbonate from a source such as limestone. Limestone is a mineral primarily composed of calcium carbonate. Limestone or other sources of calcium carbonate may be added to act as an inexpensive, carbon-free inert filler that saves cost without decreasing the performance of the cement. Calcium carbonate may also be added to react with the pozzolan. In some cases, the calcium carbonate may react with the aluminum-containing phases of the pozzolan to produce carboaluminate hardened phases which contribute to the strength and other performance characteristics of the hardened cement. The calcium carbonate may also be added to otherwise modify the fresh or hardened properties of the cement. In some embodiments, the calcium carbonate may be a ground or milled limestone. In some embodiments, the calcium carbonate may be a precipitated calcium carbonate. In some embodiments, precipitated calcium carbonate may be smoother, less angular, have smaller surface area/volume ratio, or have other physical or chemical differences compared to ground limestone. In some embodiments, precipitated calcium carbonate may have lower water demand (amount of water required to generate cement paste, cement mortar, concrete, or similar products with sufficient flow) compared to ground limestone. Calcium carbonate may be added in quantities ranging from 0-60% by mass of the cement blend.

In some embodiments, the calcium carbonate may have one or more of the following attributes, including combinations and variations of the following.

In some embodiments, the calcium carbonate may have a specific surface area of at least 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using a Brunauer-Emmett-Teller (BET) technique. In some embodiments, the calcium carbonate may have a specific surface area of about 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, 1000 $m^2/g$ or 0.01-1000 $m^2/g$ as measured using a Brunauer-Emmett-Teller (BET) technique.

In some embodiments, the calcium carbonate may have a specific surface area of less than 0.01 $m^2/g$, 0.05 $m^2/g$, 0.1 $m^2/g$, 0.3 $m^2/g$, 0.5 $m^2/g$, 0.7 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 12 $m^2/g$, 15 $m^2/g$, 20 $m^2/g$, 25 $m^2/g$, 30 $m^2/g$, 35 $m^2/g$, 40 $m^2/g$, 45 $m^2/g$, 50 $m^2/g$, 60 $m^2/g$, 70 $m^2/g$, 80 $m^2/g$, 90 $m^2/g$, 100 $m^2/g$, 120 $m^2/g$, 150 $m^2/g$, 200 $m^2/g$, 300 $m^2/g$, 400 $m^2/g$, 500 $m^2/g$, 700 $m^2/g$, or 1000 $m^2/g$ as measured using a Brunauer-Emmett-Teller (BET) technique.

In some embodiments, the calcium carbonate may have a micropore volume and/or a Barrett, Joyner and Halenda (BJH) pore volume of at least 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g. In some embodiments, the calcium carbonate may have a micropore volume and/or a Barrett, Joyner and Halenda (BJH) pore volume of about 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, 50 mL/g, or 0.01-50 mL/g.

In some embodiments, the calcium carbonate may have a micropore volume and/or a Barrett, Joyner and Halenda (BJH) pore volume of less than 0.01 mL/g, 0.02 mL/g, 0.03 mL/g, 0.04 mL/g, 0.05 mL/g, 0.06 mL/g, 0.07 mL/g, 0.08 mL/g, 0.09 mL/g, 0.10 mL/g, 0.11 mL/g, 0.12 mL/g, 0.13 mL/g, 0.14 mL/g, 0.15 mL/g, 0.16 mL/g, 0.17 mL/g, 0.18 mL/g, 0.19 mL/g, 0.20 mL/g, 0.25 mL/g, 0.30 mL/g, 0.40 mL/g, 0.50 mL/g, 0.60 mL/g, 0.70 mL/g, 0.80 mL/g, 0.90 mL/g, 1.00 mL/g, 1.2 mL/g, 1.4 mL/g, 1.6 mL/g, 1.8 mL/g, 2 mL/g, 3 mL/g, 4 mL/g, 5 mL/g, 6 mL/g, 7 mL/g, 8 mL/g, 9 mL/g, 10 mL/g, 20 mL/g, 30 mL/g, 40 mL/g, or 50 mL/g.

In some embodiments, the calcium carbonate may have a Blaine fineness (air-permeability specific surface area) of at least $0.01 \text{ m}^2/\text{g}$, $0.05 \text{ m}^2/\text{g}$, $0.1 \text{ m}^2/\text{g}$, $0.3 \text{ m}^2/\text{g}$, $0.5 \text{ m}^2/\text{g}$, $0.7 \text{ m}^2/\text{g}$, $1 \text{ m}^2/\text{g}$, $2 \text{ m}^2/\text{g}$, $3 \text{ m}^2/\text{g}$, $4 \text{ m}^2/\text{g}$, $5 \text{ m}^2/\text{g}$, $6 \text{ m}^2/\text{g}$, $7 \text{ m}^2/\text{g}$, $8 \text{ m}^2/\text{g}$, $9 \text{ m}^2/\text{g}$, $10 \text{ m}^2/\text{g}$, $12 \text{ m}^2/\text{g}$, $15 \text{ m}^2/\text{g}$, $20 \text{ m}^2/\text{g}$, $25 \text{ m}^2/\text{g}$, $30 \text{ m}^2/\text{g}$, $35 \text{ m}^2/\text{g}$, $40 \text{ m}^2/\text{g}$, $45 \text{ m}^2/\text{g}$, $50 \text{ m}^2/\text{g}$, $60 \text{ m}^2/\text{g}$, $70 \text{ m}^2/\text{g}$, $80 \text{ m}^2/\text{g}$, $90 \text{ m}^2/\text{g}$, $100 \text{ m}^2/\text{g}$, $120 \text{ m}^2/\text{g}$, $150 \text{ m}^2/\text{g}$, $200 \text{ m}^2/\text{g}$, $300 \text{ m}^2/\text{g}$, $400 \text{ m}^2/\text{g}$, $500 \text{ m}^2/\text{g}$, $700 \text{ m}^2/\text{g}$, or $1000 \text{ m}^2/\text{g}$ as measured using the method and apparatus described in ASTM C204: Test Methods for Fineness of Hydraulic Cement by Air-Permeability Apparatus. In some embodiments, the calcium carbonate may have a Blaine fineness (air-permeability specific surface area) of about $0.01 \text{ m}^2/\text{g}$, $0.05 \text{ m}^2/\text{g}$, $0.1 \text{ m}^2/\text{g}$, $0.3 \text{ m}^2/\text{g}$, $0.5 \text{ m}^2/\text{g}$, $0.7 \text{ m}^2/\text{g}$, $1 \text{ m}^2/\text{g}$, $2 \text{ m}^2/\text{g}$, $3 \text{ m}^2/\text{g}$, $4 \text{ m}^2/\text{g}$, $5 \text{ m}^2/\text{g}$, $6 \text{ m}^2/\text{g}$, $7 \text{ m}^2/\text{g}$, $8 \text{ m}^2/\text{g}$, $9 \text{ m}^2/\text{g}$, $10 \text{ m}^2/\text{g}$, $12 \text{ m}^2/\text{g}$, $15 \text{ m}^2/\text{g}$, $20 \text{ m}^2/\text{g}$, $25 \text{ m}^2/\text{g}$, $30 \text{ m}^2/\text{g}$, $35 \text{ m}^2/\text{g}$, $40 \text{ m}^2/\text{g}$, $45 \text{ m}^2/\text{g}$, $50 \text{ m}^2/\text{g}$, $60 \text{ m}^2/\text{g}$, $70 \text{ m}^2/\text{g}$, $80 \text{ m}^2/\text{g}$, $90 \text{ m}^2/\text{g}$, $100 \text{ m}^2/\text{g}$, $120 \text{ m}^2/\text{g}$, $150 \text{ m}^2/\text{g}$, $200 \text{ m}^2/\text{g}$, $300 \text{ m}^2/\text{g}$, $400 \text{ m}^2/\text{g}$, $500 \text{ m}^2/\text{g}$, $700 \text{ m}^2/\text{g}$, $1000 \text{ m}^2/\text{g}$, or $0.01-1000 \text{ m}^2/\text{g}$ as measured using the method and apparatus described in ASTM C204: Test Methods for Fineness of Hydraulic Cement by Air-Permeability Apparatus.

In some embodiments, the calcium carbonate may have a Blaine fineness (air-permeability specific surface area) of less than $0.01 \text{ m}^2/\text{g}$, $0.05 \text{ m}^2/\text{g}$, $0.1 \text{ m}^2/\text{g}$, $0.3 \text{ m}^2/\text{g}$, $0.5 \text{ m}^2/\text{g}$, $0.7 \text{ m}^2/\text{g}$, $1 \text{ m}^2/\text{g}$, $2 \text{ m}^2/\text{g}$, $3 \text{ m}^2/\text{g}$, $4 \text{ m}^2/\text{g}$, $5 \text{ m}^2/\text{g}$, $6 \text{ m}^2/\text{g}$, $7 \text{ m}^2/\text{g}$, $8 \text{ m}^2/\text{g}$, $9 \text{ m}^2/\text{g}$, $10 \text{ m}^2/\text{g}$, $12 \text{ m}^2/\text{g}$, $15 \text{ m}^2/\text{g}$, $20 \text{ m}^2/\text{g}$, $25 \text{ m}^2/\text{g}$, $30 \text{ m}^2/\text{g}$, $35 \text{ m}^2/\text{g}$, $40 \text{ m}^2/\text{g}$, $45 \text{ m}^2/\text{g}$, $50 \text{ m}^2/\text{g}$, $60 \text{ m}^2/\text{g}$, $70 \text{ m}^2/\text{g}$, $80 \text{ m}^2/\text{g}$, $90 \text{ m}^2/\text{g}$, $100 \text{ m}^2/\text{g}$, $120 \text{ m}^2/\text{g}$, $150 \text{ m}^2/\text{g}$, $200 \text{ m}^2/\text{g}$, $300 \text{ m}^2/\text{g}$, $400 \text{ m}^2/\text{g}$, $500 \text{ m}^2/\text{g}$, $700 \text{ m}^2/\text{g}$, or $1000 \text{ m}^2/\text{g}$ as measured using the method and apparatus described in ASTM C204: Test Methods for Fineness of Hydraulic Cement by Air-Permeability Apparatus.

In some embodiments, the calcium carbonate may have a water demand of a limestone paste less than 0.2, 0.25, 0.3, 0.35, 0.4, 0.45, 0.5, 0.55, 0.6, 0.65, 0.7, 0.75, 0.8, 0.85, 0.9 on a weight basis to obtain a sufficiently flowable colloidal suspension. The water demand is determined from the rheology of a colloidal suspension of limestone and water compared to a reference solution. According to one method, the reference solution is ordinary portland cement as defined by ASTM C150: Specification for Portland Cement, and water as defined by ASTM C1682: Specification for Mixing Water Used in the Production of Hydraulic Cement Concrete, in a mass ratio of 0.4:1 parts water to cement. For example, the amounts used may be 100 g of ordinary portland cement and 40 g of water. The reference suspension is used for calibration, preferably by one skilled in the art of cement testing. The test colloidal suspension may be prepared by adding 100 g of dry limestone to a mixing container, and adding 10 g of water. This mixture may be mixed well by hand for at least a minute, at which point the viscosity of the colloidal suspension is compared to the reference described above. If the viscosity is deemed higher than the reference solution, water may be added in 5 g increments and mixed again for one minute. This process may be repeated until the sample solution has the same viscosity as the reference solution prepared. The final water demand is determined by dividing the total amount of water added to the colloidal suspension by the starting amount of dry limestone used.

In some embodiments, the calcium carbonate may have a flow table spread of a limestone mortar of at least 20%, 30%, 40%, 50%, 60%, 70%, 80%, or 90% as measured using the method and apparatus described in ASTM C1437: Standard Test Method for Flow of Hydraulic Cement Mortar, using a mortar with a ratio of 1:2.75 limestone to Graded Test sand as defined by ASTM C109. In some embodiments, the calcium carbonate may have a flow table spread of a limestone mortar of about 20%, 30%, 40%, 50%, 60%, 70%, 80%, 90%, or 20-90% as measured using the method and apparatus described in ASTM C1437: Standard Test Method for Flow of Hydraulic Cement Mortar, using a mortar with a ratio of 1:2.75 limestone to Graded Test sand as defined by ASTM C109. The mortar may be prepared using a water to dry limestone ratio of 0.485:1 following the ratio outlined in ASTM C109, where said water is defined by ASTM C1682: Specification for Mixing Water Used in the Production of Hydraulic Cement Concrete. The mortar may be mixed in accordance with the mixing procedure included in ASTM C109: Test Method for Compressive Strength of Hydraulic Cement Mortars (using 2-in. Or [50-mm] Cube Specimens).

In some embodiments, the calcium carbonate may have a water demand of a limestone mortar less than 0.2, 0.25, 0.3, 0.35, 0.4, 0.45, 0.5, 0.55, 0.6, 0.65, 0.7, 0.75, 0.8, 0.85, 0.9 on a weight basis while obtaining a flowable colloidal suspension. The water demand of a limestone mortar may be determined by preparing a mortar mix consisting of dry limestone and Graded Test Sand as defined by ASTM C109: Test Method for Compressive Strength of Hydraulic Cement Mortars (using 2-in. Or [50-mm] Cube Specimens), in a 1:2.75 mass ratio. This mass ratio may be determined by ASTM C109, a standard ratio of cementitious material to sand. The actual amount of dry limestone used may be 250 g and the actual amount of sand used may be 687.5 g. Water as defined by ASTM C1682: Specification for Mixing Water Used in the Production of Hydraulic Cement Concrete, may be added initially at a weight fraction of 0.1, or 25 g, and the mixing procedure specified in ASTM C109 may be used to prepare the mortar. The mortar may be evaluated for flow using the method and apparatus found in ASTM C1437: Standard Test Method for Flow of Hydraulic Cement Mortar. If the mortar flow is less than 30%, a weight fraction of 0.05, or 12.5 g, may be added to the mortar. The mixing procedure specified in ASTM C109 may be conducted again, following which the flow determination procedure found in ASTM C1437 may be conducted. This process may be repeated until the sample suspension has a mortar flow greater than 30%. The final water demand is determined by dividing the total amount of water added to the colloidal suspension by the starting amount of dry limestone used. The sand is not included in the weight determination.

In some embodiments, the calcium carbonate may have an average roughness factor of less than 1.1, 1.2, 1.3, 1.5, 1.75, 2, 2.5, 3, 4, 5, 6, 7, 8, 9, 10, 15, 20, 25, 30, 40, 50, 60, 70, 80, 90, or 100, where roughness factor is defined as the quotient of a particle's actual surface area to volume ratio to the surface area to volume ratio expected for a sphere having the same volume as the actual particle.

In some embodiments, the calcium carbonate may have an average primary particle diameter of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In some embodiments, the calcium carbonate may have an average primary particle diameter of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In some embodiments, the calcium carbonate may have an average primary particle diameter of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In some embodiments, the calcium carbonate may have a narrow particle size distribution, as defined by having at least 50%, 60%, 70%, 80%, 90%, 95%, or 99% of all particles by count or by mass within a diameter range having a width of less than 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm.

In some embodiments, the calcium carbonate may have a wide particle size distribution, as defined by having at least 50%, 60%, 70%, 80%, 90%, 95%, or 99% of all particles by count or by mass within a diameter range having a width of at least 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, or 1 mm. In some embodiments, the calcium carbonate may have a wide particle size distribution, as defined by having at least 50%, 60%, 70%, 80%, 90%, 95%, or 99% of all particles by count or by mass within a diameter range having a width of about 1 nm, 2 nm, 3 nm 5 nm, 10 nm, 30 nm, 50 nm, 70 nm, 100 nm, 200 nm, 300 nm, 500 nm, 700 nm, 1 micron, 2 micron, 3 micron, 4 micron, 5 micron, 6 micron, 7 micron, 8 micron, 9 micron, 10 micron, 12 micron, 15 micron, 20 micron, 25 micron, 30 micron, 35 micron, 40 micron, 50 micron, 60 micron, 70 micron, 80 micron, 90 micron, 100 micron, 120 micron, 150 micron, 200 micron, 250 micron, 300 micron, 400 micron, 500 micron, 600 micron, 700 micron, 800 micron, 900 micron, 1 mm, or 1 nm-1 mm.

In some embodiments, the calcium carbonate may have a primary crystal morphology with hexagonal cross-section, including the morphology of a hexagonal prism.

In some embodiments, the calcium carbonate may have a minimum aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In some embodiments, the calcium carbonate may have a minimum aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, 50, or 1-50.

In some embodiments, the calcium carbonate may have an average aspect ratio of all particles, defined as the ratio of the primary particle's largest linear dimension to the primary particle's smallest dimension, of at least 1, 1.05, 1.1, 1.2, 1.3, 1.5, 1.7, 2, 2.5, 3, 4, 5, 6, 7, 8, 9, 10, 15, 20, 25, 30, 40, or 50. In some embodiments, the calcium carbonate may have an average aspect ratio of all particles, defined as the ratio of the primary particle's largest linear dimension to the primary particle's smallest dimension, of about 1, 1.05, 1.1, 1.2, 1.3, 1.5, 1.7, 2, 2.5, 3, 4, 5, 6, 7, 8, 9, 10, 15, 20, 25, 30, 40, 50, or 1-50.

In some embodiments, the calcium carbonate may have a minimum aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In some embodiments, the calcium carbonate may have an average aspect ratio of all particles, defined as the ratio of the primary particle's largest linear dimension to the primary particle's smallest dimension, of less than 1.05, 1.1, 1.2, 1.3, 1.5, 1.7, 2, 2.5, 3, 4, 5, 6, 7, 8, 9, 10, 15, 20, 25, 30, 40, or 50.

In some embodiments, the calcium carbonate may have an amorphous content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9% or 99.99%, by mass or volume. In some embodiments, the calcium carbonate may have an amorphous content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9%, 99.99%, or 0.01-99.99% by mass or volume.

In some embodiments, the calcium carbonate may have an amorphous content of less than 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 55%, 60%, 65%, 70%, 75%, 80%, 82%, 84%, 86%, 88%, 90%, 92%, 94%, 95%, 96%, 97%, 98%, 99%, 99.5%, 99.9% or 99.99%, by mass or volume.

In some embodiments, the calcium carbonate may have a specific surface area to major diameter ratio of at least 0.1 ($m^2$/g)/micron, 0.2 ($m^2$/g)/micron, 0.3 ($m^2$/g)/micron, 0.5 ($m^2$/g)/micron, 0.7 ($m^2$/g)/micron, 1 ($m^2$/g)/micron, 3 ($m^2$/g)/micron, 5 ($m^2$/g)/micron, 7 ($m^2$/g)/micron, 10 ($m^2$/g)/micron, 20 ($m^2$/g)/micron, 30 ($m^2$/g)/micron, 40 ($m^2$/g)/micron, 50 ($m^2$/g)/micron, 70 ($m^2$/g)/micron, or 100 ($m^2$/g)/micron. In some embodiments, the calcium carbonate may have a specific surface area to major diameter ratio of about 0.1 ($m^2$/g)/micron, 0.2 ($m^2$/g)/micron, 0.3 ($m^2$/g)/micron, 0.5 ($m^2$/g)/micron, 0.7 ($m^2$/g)/micron, 1 ($m^2$/g)/micron, 3 ($m^2$/g)/micron, 5 ($m^2$/g)/micron, 7 ($m^2$/g)/micron, 10 ($m^2$/g)/micron, 20 ($m^2$/g)/micron, 30 ($m^2$/g)/micron, 40 ($m^2$/g)/micron, 50 ($m^2$/g)/micron, 70 ($m^2$/g)/micron, 100 ($m^2$/g)/micron, or 0.1-100 ($m^2$/g)/micron.

In some embodiments, the calcium carbonate may have a specific surface area to major diameter ratio of less than 0.1 ($m^2$/g)/micron, 0.2 ($m^2$/g)/micron, 0.3 ($m^2$/g)/micron, 0.5 ($m^2$/g)/micron, 0.7 ($m^2$/g)/micron, 1 ($m^2$/g)/micron, 3 ($m^2$/g)/micron, 5 ($m^2$/g)/micron, 7 ($m^2$/g)/micron, 10 ($m^2$/g)/micron, 20 ($m^2$/g)/micron, 30 ($m^2$/g)/micron, 40 ($m^2$/g)/micron, 50 ($m^2$/g)/micron, 70 ($m^2$/g)/micron, or 100 ($m^2$/g)/micron.

In some embodiments, the calcium carbonate may have a purity of at least 80%, 82%, 84%, 86%, 88%, 90%, 92%, 94%, 95%, 96%, 97%, 98%, 99%, 99.5%, 99.9% or 99.99% by mass calcium carbonate. In some embodiments, the calcium carbonate may have a purity of about 80%, 82%, 84%, 86%, 88%, 90%, 92%, 94%, 95%, 96%, 97%, 98%, 99%, 99.5%, 99.9%, 99.99%, or 80-99.99% by mass calcium carbonate.

In some embodiments, the calcium carbonate may have a purity of less than 80%, 82%, 84%, 86%, 88%, 90%, 92%, 94%, 95%, 96%, 97%, 98%, 99%, 99.5%, 99.9% or 99.99% by mass calcium carbonate.

In some embodiments, the calcium carbonate may have a silica content of at least 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a silica content of about 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.01-50% by mass.

In some embodiments, the calcium carbonate may have a silica content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a calcium carbonate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a calcium carbonate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a calcium carbonate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a magnesium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a magnesium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a magnesium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a magnesium hydroxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a magnesium hydroxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a magnesium hydroxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a calcium oxide content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a calcium oxide content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a calcium oxide content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a chloride content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a chloride content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a chloride content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a nitrate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a nitrate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a nitrate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a nitrite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a nitrite content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a nitrite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a sulfate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a sulfate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a sulfate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a sulfite content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a sulfite content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a sulfite content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

In some embodiments, the calcium carbonate may have a phosphate content of at least 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass. In some embodiments, the calcium carbonate may have a phosphate content of about 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, 50%, 0.001-50% by mass.

In some embodiments, the calcium carbonate may have a phosphate content of less than 0.001%, 0.005%, 0.01%, 0.05%, 0.1%, 0.2%, 0.4%, 0.6%, 0.8%, 1%, 1.5%, 2%, 3%, 4%, 5%, 6%, 7%, 8%, 9%, 10%, 12%, 14%, 16%, 18%, 20%, 25%, 30%, 35%, 40%, 45%, or 50% by mass.

Without being limited by any particular theory, some of these properties of the limestone may improve its performance in cement. In particular, limestone with a large primary particle diameter, small specific surface area, and/or small micropore volume may correlate with low water demand. That is to say, these properties may mean less water must be added to cement containing such limestone in order to achieve sufficiently high flow, large slump, or low viscosity. This may be because particles with large primary particle diameter, small specific surface area, and/or small micropore volume adsorb or absorb smaller amounts of water, have smaller surface friction, have smaller viscous forces in suspension, or for other related reasons. Cements and/or concretes with lower water demand may perform better because they can have sufficient flow, slump, or viscosity to be cast, pumped, or poured as needed to meet the requirements of a particular application, while having less water added to the blend. Adding less water to the blend may result in higher compressive strength and/or shorter setting times. This may be because adding less water leads to lower pore volume in the hydrated, set, and/or hardened cement, mortar, or concrete, and reduced pore volume is correlated with increased compressive strength. In addition, particles with certain diameters or diameter distributions may enable higher packing efficiency or filling in of gaps or voids between particles or aggregates in cement or concrete, resulting in a denser material with higher compressive strength. Cements, mortars, or concretes made with lower water to binder ratios may also have lower permeability due to lower porosity and a less interconnected pore structure (more closed and isolated pores), and therefore may resist penetration by chlorides, sulfates, or other ionic or molecular species that could lead to degradation of building materials or structures.

In some embodiments, the cement comprises water reducing additives. Water reducing admixtures may be added to reduce the amount of water that must be mixed into the cement, mortar, or concrete of the various embodiments to achieve sufficient flow. These may include without limitation Type A, Water-reducing admixtures, Type D-water reducing and retarding admixtures, Type E-water reducing and accelerating admixtures, Type F-water-reducing, high range admixtures, Type G-water-reducing, high range, and retarding admixtures, as defined in ASTM C494, "Specification for Chemical Admixtures for Concrete." These may include superplasticizers such as polycarboxylate and/or naphthalene-based superplasticizers. These water reducing additives may be blended into the cement, mortar, or concrete as a dry powder, or they may be added to the cement, mortar, or concrete as solution in water or another solvent. These additives may be added in quantities ranging from 0-20% by mass of the cement blend on the basis of the additive solid mass. Most typically the additives will be 0-1% solids on the basis of mass of the cement blend.

In some embodiments, the cement comprises flocculants and/or dispersants. Flocculants or dispersants may be added to change the colloidal behavior of the cement, mortar, or concrete of the various embodiments to achieve certain flow characteristics. If the suspension is determined to have excessive flocculation which may cause issues with mixing, segregation of cementitious phases, or other deleterious effects, a dispersant may be added to promote the breakup of these flocs and homogenize the colloidal suspension. If instead the suspension is determined to be too dispersed, a flocculant may be added to induce formation of flocs. This can be desired to increase the volume of water in between solids, or cause settling of the suspended solids for a larger degree of compaction. These additives may be added in quantities ranging from 0-20% by mass of the cement blend on the basis of the additive solid mass. Most typically the additives will be 0-1% solids on the basis of mass of the cement blend.

In some embodiments, the cement comprises defoamers. A defoamer may be added to modify the surface tension of the cement, mortar, or concrete of the various embodiments to achieve necessary mixing characteristics. The air content of a cement, mortar, or concrete may be linked to other performance characteristics such as compressive strength, freeze-thaw resistance, and permeability. Certain other additives which may be added to the cement, mortar, or concrete of the various embodiments may reduce the surface tension of the liquid fraction of the solution which may lead to an undesirable foaming during mixing and transportation. This foaming behavior can add excessive air to the cement, mortar, or concrete which can severely limit the performance. Additionally, this foaming behavior can introduce substantial voids in the cement. The surface tension can be increased with the addition of a defoamer, restoring the necessary foaming behavior to ensure that excessive air is not entrained. These additives may be added in quantities ranging from 0-20% by mass of the cement blend on the basis of the additive solid mass. Most typically the additives will be 0-1% solids on the basis of mass of the cement blend.

In some embodiments, the cement comprises Air entraining admixtures. An air entraining admixture may be added to ensure the proper amount of air is entrained in the cement, mortar, or concrete of the various embodiments to achieve specified freeze-thaw resistance and permeability. Depending on the amount of air entrained by the mix, the air fraction may be too low to effectively resist freeze-thaw cycling common to colder climates. An air-entraining admixture, as specified in ASTM C260: Specification for Air-Entraining Admixtures for Concrete, may be added to increase the amount of air entrained to an acceptable amount. The target amount of air to entrain is believed to be 9% by volume. The air entraining admixtures have an added benefit of well dispersing the air bubbles entrained and controlling their size. These additives may be added in quantities ranging from 0-20% by mass of the cement blend on the basis of the additive solid mass. Most typically the additives will be 0-1% solids on the basis of mass of the cement blend.

In some embodiments, the cement comprises Alite (tricalcium silicate). Some alite, tricalcium silicate ($Ca_3SiO_5$ or C3S in cement chemist notation) may be used in the cement blend. Alite is a component of portland cement clinker. It may react with water to create calcium hydroxide and calcium silicate hydrate. Alite may be the most important component of portland cement that contributes most significantly to portland cement's setting time and early strength development. Therefore, adding alite may contribute to rapid setting, rapid hardening, high ultimate compressive strength, and/or other favorable properties when added to the cements of the various embodiments. Alite may be used in quantities of 0-98% by mass of the cement blend. Most typically, the alite content may be between 0-30% by mass.

In some embodiments, the cement comprises Calcium aluminate cement, calcium sulfoaluminate cements, and/or or constituents thereof. Calcium aluminate cements and/or calcium sulfoaluminate cements may be added to the cement blends. In some embodiments, these cements may exhibit very rapid setting, rapid hardening, high early strength, and high ultimate strength. In some embodiments, mixing these components into the cement blend of the various embodiments may confer these properties (rapid setting, rapid hardening, high early strength, high ultimate strength) and/or other benefits to the cement blends of the various embodiments. In some embodiments, individual constituents of these cements such as ye'elemite ($Ca_4(AlO_2)_6SO_4$, or $C_3A_4\$$ in cement chemist notation) may be added to the cement blends. In some embodiments, the ye'elemite may react with calcium hydroxide, water, gypsum, and/or other sources of sulfate to create ettringite and/or other hydrated phases. In some embodiments, the rapid kinetics of ettringite formation may cause the cement to exhibit rapid setting, rapid hardening, high early strength, high ultimate strength, and/or other favorable properties.

Various embodiments may include manufacturing methods for producing cementitious material that has low embodied carbon. Various embodiments may include manufacturing methods that produce less $CO_2$ emitted to the atmosphere while producing cementitious material than is produced during production of conventional cementitious materials, such as portland cement. The cements of the various embodiments may be manufactured using a variety of methods. Various embodiments may include methods for manufacturing said cements.

Figure 3:
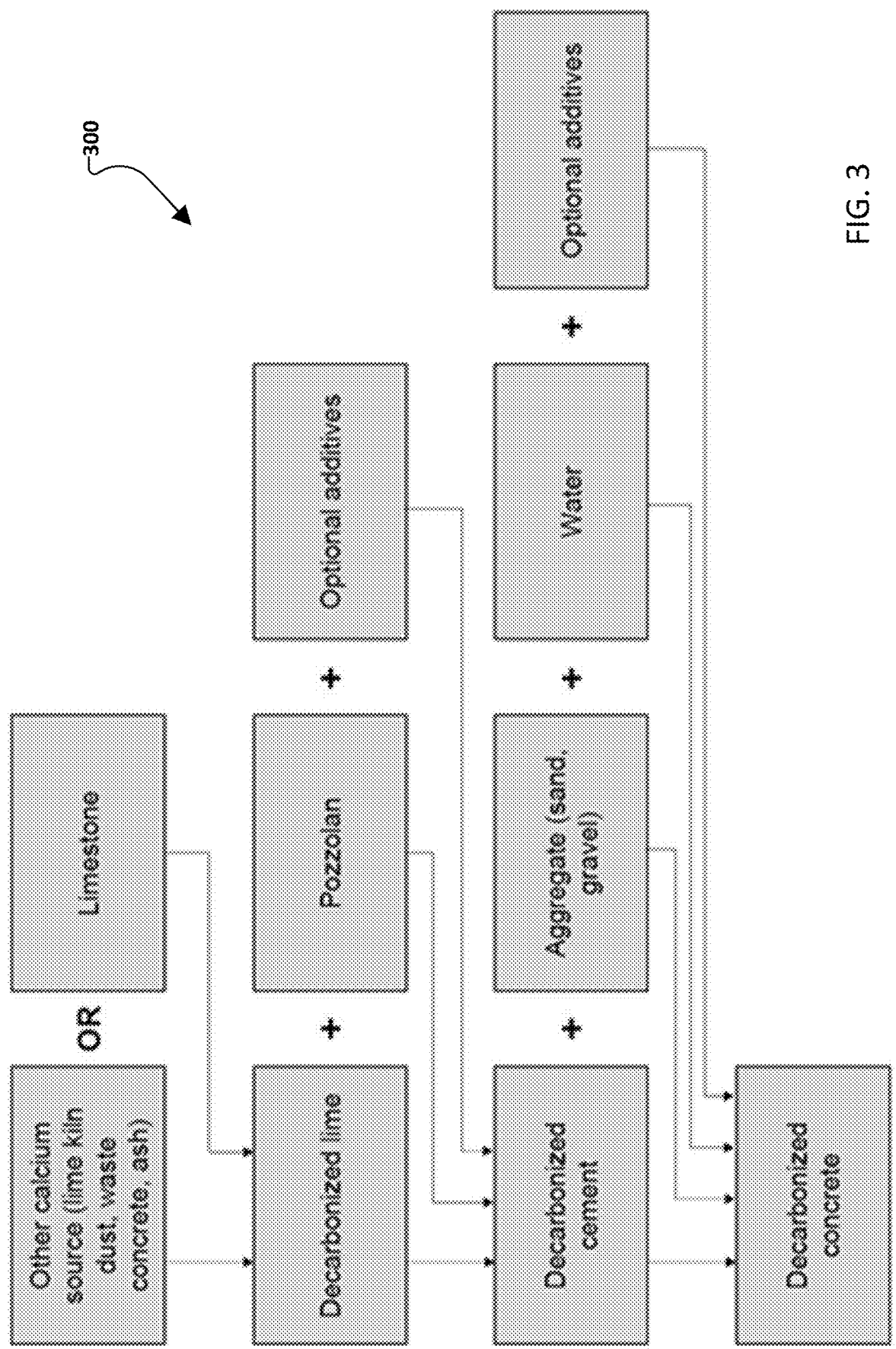
FIG. 3 illustrates methods of manufacturing decarbonized cement and/or decarbonized concrete in accordance with various embodiments.

FIG. 3 illustrates embodiment method 300 of producing decarbonized cement or decarbonized concrete according to various embodiments. As illustrated in FIG. 3, the decarbonized lime may be manufactured using a method that does not result in substantial emission of $CO_2$ to the atmosphere. It may be manufactured from a variety of starting calcium sources such as limestone, cement kiln dust, lime kiln dust, industrial ash (fly ash, bottom ash, municipal waste incinerator ash), slag, or recycled or waste concrete/cement. In some embodiments, as described above, the lime may be manufactured using an electrochemical process, an electric kiln or calciner, or a fossil fuel-powered calciner or kiln where the $CO_2$ is captured and sequestered.

The pozzolan may be a naturally occurring material. The pozzolan may be a byproduct or waste product of an industrial process, such as coal combustion (fly ash, bottom ash) or iron refining (slag). The pozzolan may be produced specifically for use in cement. The pozzolan may be produced by heating a material such as clay in an electric calciner or kiln powered by renewable sources of electricity such that the process does not result in the release of $CO_2$. The pozzolan may be produced by heating a material such as clay in a calciner or kiln that consumes fossil fuel so $CO_2$ is created, but this $CO_2$ is captured and sequestered or stored so it is not emitted to the atmosphere.

As illustrated in FIG. 3, in various embodiments, decarbonized lime, pozzolan, and/or optional additives may be combined together to form decarbonized cement.

To make decarbonized cement, in some embodiments, the lime and pozzolan may be produced separately, then physically mixed or blended together. These components may be dry powders that are stored separately, then first mixed or interground in the dry powder form, and finally mixed with water and optionally other components to activate the cementitious reaction. Alternatively, the lime and pozzolan may be stored separately as dry powders, then each individually added to water or another aqueous solution. The lime may be a slurry or suspension of solid particles in water or an aqueous solution, and said slurry may be mixed with a dry pozzolan powder or a pozzolan slurry/suspension, and optionally additional water and other components. Similarly, the pozzolan may be a slurry or suspension of solid particles in water or an aqueous solution, and said slurry may be mixed with a dry lime powder or a lime slurry/suspension, and optionally additional water and other components.

In some embodiments, the lime and pozzolan may be produced together as a mixture starting from a material that contains both calcium and silicon, resulting in a blended mixture of lime and pozzolan.

To make decarbonized concrete, in some embodiments, decarbonized cement may be combined with aggregate sand and gravel, water, and optionally additives such as set accelerating admixtures, set retarding admixtures, air entraining admixtures, water reducing admixtures such as superplasticizers, or others.

In some embodiments, the embodied carbon of the entire cement blend, such as the entire decarbonized cement produced by method 300, may be below about 0.93 kg $CO_2$ emissions per 1 kg cement, which is a typical value for portland cement. In some embodiments, the embodied carbon of the entire cement blend, such as the entire decarbonized cement produced by method 300, may be below about 0.45 kg $CO_2$ per 1 kg cement, a typical embodied carbon value reported for limestone calcined clay ("LC3") cement. In some embodiments, the embodied carbon of the entire cement blend, such as the entire decarbonized cement produced by method 300, may be below about 0.25 kg $CO_2$ per 1 kg cement, a value which may be achieved in certain "high blend" cements that contain a small fraction of portland cement and relatively large quantities of supplementary cementitious materials and/or fillers.

In various embodiments, the cement, such as the decarbonized cement produced by method 300, may be hydraulically active. It may be formulated as a dry powder, which may be subsequently mixed with water. In various embodiments, the cement, such as the decarbonized cement produced by method 300, may be formulated as a wet slurry, a suspension of solid lime particles and solid pozzolan particles in water or an aqueous solution. The water may initiate a reaction between the lime (calcium source) and pozzolan (silicon/aluminum source) which results in the formation of calcium silicate hydrate (C—S—H) and optionally calcium silicate aluminate hydrate (C-A-S—H) or other hydration products. The reaction may cause the material to set and harden over time. In various embodiments, the cement, such as the decarbonized cement produced by method 300, may develop mechanical properties such as high compressive strength that make it useful for construction applications.

In various embodiments, the cement, such as the decarbonized cement produced by method 300, may be used in concrete, cement mortar, grout, stucco, plaster, precast forms, or shotcrete/gunite. Most typically, it may be used in concrete and cement mortar. In various embodiments, the cement, such as the decarbonized cement produced by method 300, may be a full or partial replacement for portland cement, which is the most common cementitious material used for these applications. As described above, said cement blend may entirely replace portland cement, or in some embodiments the lime and pozzolan may be mixed with some portland cement, and partially replace the portland cement.

To make concrete, the cement blend, such as the decarbonized cement produced by method 300, may be mixed with water or an aqueous solution, aggregate (sand and gravel), and potentially chemical admixtures for the purpose of set acceleration, set retardation, flow enhancement (e.g. superplasticizers), air entrainment, or other purposes. The concrete may be used for construction applications like housing foundations, roads, sidewalks, high rise buildings, dams, pre-cast slabs or blocks, or other structures. This cement could potentially be used for any application where portland cement is currently used. Some cement blends meeting these specifications may be used to create concrete that meets or exceeds the performance of portland cement concrete.

Figure 4:
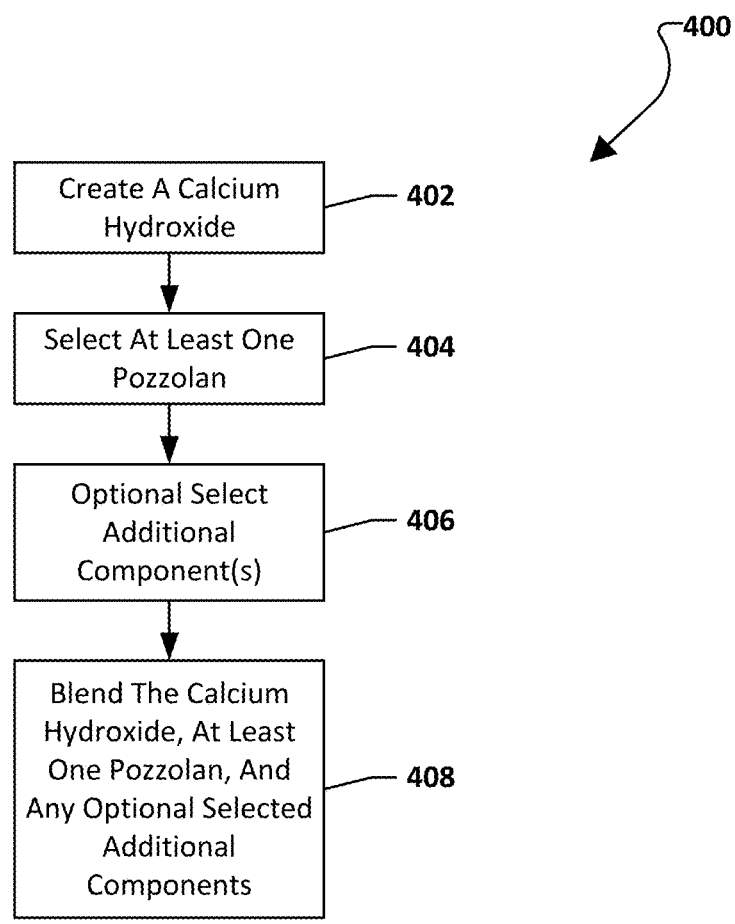
FIG. 4 illustrates a method of forming a cementitious binder in accordance with various embodiments.

FIG. 4 illustrates an embodiment method 400 for forming a cementitious binder in accordance with various embodiments. In various embodiments, the cementitious binder created according to the steps of method 400 may be used entirely or partially to form one or more cementitious materials, including concrete, mortar, grout, stucco, plaster, fillers, aggregate, whitewashes, bricks, boards, pre-cast forms, shotcrete/gunite, housing foundations, sidewalks, roads, bridges, dams, etc. As specific examples, in various embodiments the cementitious binder created according to the steps of method 400 may be used entirely or partially to form one or more cementitious materials having low embodied carbon, including concrete having low embodied carbon, mortar having low embodied carbon, grout having low embodied carbon, stucco having low embodied carbon, plaster having low embodied carbon, fillers having low embodied carbon, aggregate having low embodied carbon, whitewashes having low embodied carbon, bricks having low embodied carbon, boards having low embodied carbon, pre-cast forms having low embodied carbon, shotcrete/gunite having low embodied carbon, housing foundations having low embodied carbon, sidewalks having low embodied carbon, roads having low embodied carbon, bridges having low embodied carbon, dams having low embodied carbon, other building materials having low embodied carbon, other construction materials having low embodied carbon, other structures having low embodied carbon, etc.

In various embodiments, the method 400 may include creating a calcium hydroxide in step 402, such as through a precipitation reaction. As one example, calcium hydroxide may be created through a precipitation reaction with low levels of greenhouse gas emissions, such as resulting from production processes partially and/or entirely powered by renewable energy. As a specific example, calcium hydroxide may be created as part of a chloralkali process. As a specific example, calcium hydroxide may be created as part through a precipitation reaction occurring in a chloralkali plant/process partially and/or entirely powered by renewable energy.

In various embodiments, the calcium hydroxide may be created according to any process described herein. In various embodiments, the calcium hydroxide may be an electrochemical calcium hydroxide. In various embodiments, the calcium hydroxide may be a low-temperature calcium hydroxide. In various embodiments, the calcium hydroxide may be a decarbonized calcium hydroxide. In various embodiments, the calcium hydroxide may have a Barrett, Joyner, and Halenda pore volume of less than about 0.10 mL/g. In various embodiments, the calcium hydroxide may have a Barrett, Joyner, and Halenda pore volume of less than about 0.05 mL/g. In various embodiments, the calcium hydroxide may have a water demand of less than about 0.5 parts water per 1 part calcium hydroxide by mass. In various embodiments, the calcium hydroxide may have a water demand of less than about 0.4 parts water per 1 part calcium hydroxide by mass. In various embodiments, the calcium hydroxide may have a water demand of less than about 0.5 parts water per 1 part calcium hydroxide by mass, and a reactivity of greater than 90%. In various embodiments, the calcium hydroxide may have a water demand of less than about 0.4 parts water per 1 part calcium hydroxide by mass, and a reactivity of greater than 90%. In various embodiments, the calcium hydroxide may have an average aspect ratio of less than about 1.2.

In step 404, at least one pozzolan may be selected. In various embodiments, the pozzolan may be any pozzolan described herein. In various embodiments, the pozzolan may be a raw or calcined natural pozzolan or clay.

In optional step 406, one or more additional components may be selected. Step 406 may be optional, as additional components may not be required, or desired, in all instances for forming a cementitious binder in accordance with various embodiments. In various embodiments, additional components that may optionally be selected may include any one or more of portland cement, portland cement clinker, tricalcium silicate, ye'elemite, calcium aluminate cement, calcium sulfoaluminate cement, calcium carbonate, water reducing admixture, set accelerating admixture, defoaming admixture, air entraining admixture, and/or calcium sulfate. In various embodiments, the optional additional components may include at least 5% portland cement clinker by total cementitious binder mass. In various embodiments, the optional additional components may include at least 2% of a calcium sulfate such as gypsum or anhydrite by total cementitious binder mass. In various embodiments, the optional additional components may include a water reducing admixture in dry powder form. In various embodiments, the optional additional components may include a defoaming admixture. In various embodiments, the optional additional components may include an air entraining admixture. In various embodiments, the optional additional components may include a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime. In various embodiments, the optional additional components may include sodium hydroxide. In various embodiments, the optional additional components may include sodium sulfate. In various embodiments, the optional additional components may include a source of calcium carbonate such as limestone. In various embodiments, the optional additional components may include at least 2% by mass of a calcium sulfate such as gypsum or anhydrite, and a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime. In various embodiments, the optional additional components may include at least 2% by mass of a calcium sulfate such as gypsum or anhydrite, and a set accelerating additive selected from the group including sodium hydroxide and sodium sulfate. In various embodiments, the optional additional components may include at least 2% by mass of a calcium sulfate such as gypsum or anhydrite, a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime, and a water reducing admixture in dry powder form. In various embodiments, the optional additional components may include at least 2% of a calcium sulfate such as gypsum or anhydrite by total cementitious binder mass, a set accelerating additive selected from the group including sodium hydroxide and sodium sulfate, and a water reducing admixture in dry powder form. In various embodiments, the optional additional components may include less than about 25% portland cement clinker by total cementitious binder mass. In various embodiments, the optional additional components may include less than about 10% portland cement clinker by total cementitious binder mass. In various embodiments, the optional additional components may include no portland cement clinker. In various embodiments, the optional additional components may include less than about 25% portland cement clinker by total cementitious binder mass. In various embodiments, the optional additional components may include less than about 10% portland cement clinker by total cementitious binder mass.

In step 408, the calcium hydroxide, at least one pozzolan, and any optionally selected additional components may be blended together. In this manner, the cementitious binder may be formed as the blended mixture of the calcium hydroxide, at least one pozzolan, and any optionally selected additional components. In various embodiments, the calcium hydroxide, at least one pozzolan, and any optionally selected additional components may be blended together to create a uniform dry power mixture. In various embodiments, the cementitious binder may include less than about 50% by mass portland cement clinker. In various embodiments, the cementitious binder may have a water demand of less than about 0.6 parts water per 1 part cementitious binder by mass. In various embodiments, the cementitious binder may have a water demand of less than about 0.5 parts water per 1 part cementitious binder by mass. In various embodiments, the cementitious binder may have a 3-day compressive strength of greater than about 13 MPa in 2 inch cement mortar cube compressive strength tests. In various embodiments, the cementitious binder may have a 7-day compressive strength of greater than about 20 MPa in 2 inch cement mortar cube compressive strength tests. In various embodiments, the cementitious binder may have a 28-day compressive strength of greater than about 28 MPa in 2 inch cement mortar cube compressive strength tests. In various embodiments, the cementitious binder may have an initial setting time of less than about 2 hours. In various embodiments, the cementitious binder may have an initial setting time of less than about 3 hours.

In some embodiments, the cements of the invention may have physical properties and/or performance characteristics that meet or exceed those stated in ASTM Standard C1157, including but not limited to a compressive strength of at least 4060 pounds per square inch (PSI) after setting for 28 days as measured using the method described in ASTM Standard C109. In other embodiments, the cements of the invention may have compositions and/or performance characteristics that meet the requirements set forth in ASTM Standards C91, C141, C150, C206, C207, C595, C821, C997, C989, C1097, C1329, C1489, or C1707.

In some embodiments, the cement or concrete of this invention may have properties or performance characteristics that are different from or superior to known cements, including portland cements, blended cements, or pozzolanic cements.

In some embodiments, one or more components of the cement or concrete of this invention may have particle size, particle size distribution, reactivity, crystal structure, or impurity concentrations that are different from known cements, and therefore change or improve the properties or performance characteristics compared to known cements such as portland cements, blended cements, or pozzolanic cements.

In some embodiments, the cement or concrete of this invention may have superior sulfate attack resistance, alkali-silica reaction resistance, efflorescence resistance, permeability resistance, corrosion resistance, flow characteristics, viscosity, slump, workability, soundness, flexural strength, compressive strength, or set time compared to known cements, including portland cements, blended cements, or pozzolanic cements.

In some embodiments, the cement or concrete of the invention may have one or more of the following properties. The cement or concrete of various embodiments may have a compressive strength at 1 day greater than about 1740 psi. The cement or concrete of various embodiments may have a compressive strength at 3 days greater than about 725 psi, 1160 psi, 1450 psi, 1600 psi, 1740 psi, 1890 psi, 3480 psi, 4060 psi, 5000 psi, or 6000 psi.

In some embodiments, the cement or concrete of the invention may have compressive strength at 7 days greater than about 1600 psi, 2030 psi, 2320 psi, 2470 psi, 2610 psi, 2760 psi, 2900 psi, 4060 psi, 5000 psi, 6000 psi, 8000 psi, or 10000 psi.

In some embodiments, the cement or concrete of the invention may have compressive strength at 28 days greater than about 4060 psi, 5000 psi, 6000 psi, 8000 psi, or 10000 psi, 12000 psi, or 15000 psi.

In some embodiments, the cement or concrete of the invention may have compressive strength at 90 days greater than about 4060 psi, 5000 psi, 6000 psi, 8000 psi, or 10000 psi, 12000 psi, or 15000 psi.

In some embodiments, the cement or concrete of the invention may have flexural strength at 7 days greater than about 100 psi, 200 psi, 300 psi, 400 psi, 500 psi, 600 psi, 700 psi, 800 psi, 900 psi, 1000 psi, 1200 psi, or 1500 psi.

In some embodiments, the cement or concrete of the invention may have flexural strength at 28 days greater than about 300 psi, 400 psi, 500 psi, 600 psi, 700 psi, 800 psi, 900 psi, 1000 psi, 1200 psi, or 1500 psi.

In some embodiments, the cement or concrete of the invention may have flexural strength at 90 days greater than about 300 psi, 400 psi, 500 psi, 600 psi, 700 psi, 800 psi, 900 psi, 1000 psi, 1200 psi, or 1500 psi.

In some embodiments, the cement or concrete of the invention may have setting time less than 12 hours, 8 hours, 6 hours, 4 hours, 3 hours, 2 hours, 1 hour, 30 minutes, or 15 minutes.

In some embodiments, the cement or concrete of the invention may have setting time greater than 30 minutes, 45 minutes, 1 hour, 2 hours, 3 hours, 4 hours, 6 hours, 8 hours, 10 hours, 12 hours, 24 hours, 48 hours, 72 hours, 1 week, or 4 weeks.

In some embodiments, the cement or concrete of the invention may have heat of hydration at 7 days less than 25 cal/g, 40 cal/g, 50 cal/g, 55 cal/g, 80 cal/g, or 100 cal/g.

In some embodiments, the cement or concrete of the invention may have autoclave length change under ASTM C151 test conditions of less than 0.10%, 0.20%, 0.40%, 0.60%, 0.80%, or 1.0%.

In some embodiments, the cement or concrete of the invention may have mortar bar expansion at 14 days under ASTM C1038 test conditions of less than 0.005%, 0.010%, 0.015%, 0.020%, 0.025%, 0.030%, 0.040%, or 0.050%.

In some embodiments, the cement or concrete of the invention may have sulfate resistance indicated by sulfate expansion at 6 months under ASTM C1012 test conditions of less than 0.01%, 0.02%, 0.03%, 0.05%, 0.08%, 0.10%, 0.15%, or 0.20%.

In some embodiments, the cement or concrete of the invention may have low reactivity with alkali-silica-reactive aggregates indicated by expansion at 14 days under ASTM C227 test conditions of less than 0.005%, 0.010%, 0.015%, 0.020%, 0.025%, 0.030%, 0.040%, or 0.050%.

In some embodiments, the cement or concrete of the invention may have low reactivity with alkali-silica-reactive aggregates indicated by expansion at 56 days under ASTM C227 test conditions of less than 0.010%, 0.015%, 0.020%, 0.025%, 0.030%, 0.040%, 0.050%, 0.060%, 0.080%, or 0.100%.

In some embodiments, the cement or concrete of the invention may have mortar air content according to test method ASTM C185 of greater than 1%, 3%, 5%, 10%, 15%, 16%, 20%, or 22%.

In some embodiments, the cement or concrete of the invention may have mortar air content according to test method ASTM C185 of lower than 1%, 3%, 5%, 10%, 15%, 16%, 20%, 22%, 25%, or 30%.

In some embodiments, the cement or concrete of the invention may have slump measured using ASTM C143 slump test method of less than 0.5 inch, 1 inch, 2 inch, 3 inch, 4 inch, 5 inch, 6 inch, 7 inch, 8 inch, 9 inch, or 10 inch.

In some embodiments, the cement or concrete of the invention may have slump measured using ASTM C143 slump test method of greater than 0.5 inch, 1 inch, 2 inch, 3 inch, 4 inch, 5 inch, 6 inch, 7 inch, 8 inch, 9 inch, or 10 inch.

In some embodiments, the cement or concrete of the invention may have yield stress in fresh (unhardened) state greater than 200 Pa, 400 Pa, 600 Pa, 800 Pa, 1000 Pa, 1200 Pa, 1400 Pa, 1600 Pa, 1800 Pa, or 2000 Pa.

In some embodiments, the cement or concrete of the invention may have yield stress in fresh (unhardened) state less than 200 Pa, 400 Pa, 600 Pa, 800 Pa, 1000 Pa, 1200 Pa, 1400 Pa, 1600 Pa, 1800 Pa, or 2000 Pa.

In some embodiments, the cement or concrete of the invention may have plastic viscosity greater than 25 Pa·s, 50 Pa·s, 75 Pa·s, 100 Pa·s, 150 Pa·s, 200 Pa·s, 250 Pa·s, 300 Pa·s, 400 Pa·s, 500 Pa·s, 600 Pa·s, 800 Pa·s, or 1000 Pa·s.

In some embodiments, the cement or concrete of the invention may have plastic viscosity less than 25 Pa·s, 50 Pa·s, 75 Pa·s, 100 Pa·s, 150 Pa·s, 200 Pa·s, 250 Pa·s, 300 Pa·s, 400 Pa·s, 500 Pa·s, 600 Pa·s, 800 Pa·s, or 1000 Pa·s.

In some embodiments, the cement or concrete of the invention may have rapid chloride permeability measured according to the procedure defined in ASTM C1202 of less than 100 coulomb, 200 coulomb, 400 coulomb, 600 coulomb, 800 coulomb, 1000 coulomb, 1500 coulomb, 2000 coulomb, 3000 coulomb, 4000 coulomb, 5000 coulomb, or 6000 coulomb.

In some embodiments, the cement or concrete of the invention may have pore solution pH less than 8.0, 9.0, 10.0, 11.0, 12.0, 12.5, 13.0, 13.5, or 14.0.

In some embodiments, the cement or concrete of the invention may have pore solution pH greater than 8.0, 9.0, 10.0, 11.0, 12.0, 12.5, 13.0, 13.5, or 14.0.

In some embodiments, the cement or concrete of the invention may have density greater than 1000 kg/m$^3$, 1200 kg/m$^3$, 1400 kg/m$^3$, 1600 kg/m$^3$, 1800 kg/m$^3$, 2000 kg/m$^3$, 2200 kg/m$^3$, 2400 kg/m$^3$, 2600 kg/m$^3$, 2800 kg/m$^3$, 3000 kg/m$^3$.

In some embodiments, the cement or concrete of the invention may have density less than 1000 kg/m$^3$, 1200 kg/m$^3$, 1400 kg/m$^3$, 1600 kg/m$^3$, 1800 kg/m$^3$, 2000 kg/m$^3$, 2200 kg/m$^3$, 2400 kg/m$^3$, 2600 kg/m$^3$, 2800 kg/m$^3$, 3000 kg/m$^3$.

In some embodiments, the cement or concrete of the invention may have whiteness measured by on reflectance value or "L value" of greater than about 50%, 55%, 60%, 65%, 70%, 75%, 80%, 85%, 90%, or 95%.

In some embodiments, the cement or concrete of the invention may have cement mortar flow greater than 0%, 5%, 10%, 15%, 20%, 25%, 30%, 35%, 40%, 45%, 50%, 55%, 60%, 65%, 70%, 75%, 80%, 85%, 90%, 95%, 100%, 105%, 110%, 120%, 130%, 140%, 150%, 160%, 170%, 180%, 190%, or 200% as measured using the flow table apparatus and procedure described in ASTM C230, "Specification for Flow Table for Use in Tests of Hydraulic Cement"

In some embodiments, the cement or concrete of the invention may have water/cementitious solids (also called water/binder) mass ratio of less than 0.2, 0.25, 0.3, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, or 0.70 while achieving cement mortar flow greater than 0%, 5%, 10%, 15%, 20%, 25%, 30%, 35%, 40%, 45%, 50%, 55%, 60%, 65%, 70%, 75%, 80%, 85%, 90%, 95%, 100%, 105%, 110%, 120%, 130%, 140%, 150%, 160%, 170%, 180%, 190%, or 200% as measured using the flow table apparatus and procedure described in ASTM C230, "Specification for Flow Table for Use in Tests of Hydraulic Cement"

In some embodiments, the cement or concrete of the invention may meet one or more of the performance criteria listed in Table 1 below. In some embodiments, the cement may simultaneously meet all the performance criteria in Table 1 below. In some embodiments, the cement may simultaneously meet the compressive strength, flow table spread, and initial time of setting performance requirements specified in Table 1 below. In some embodiments, the cement may simultaneously meet the compressive strength, flow table spread, initial time of setting, ASR aggregate expansion, autoclave length change, and mortar bar expansion performance requirements specified in Table 1 below. In some embodiments, the cement may meet other combinations or variations of these performance requirements listed in Table 1 below.

TABLE 1

| PARAMETER | TEST METHOD/ REFERENCE | ASTM C1157 TARGET | OTHER TARGET |
|---|---|---|---|
| Compressive strength, 03 days | ASTM C109 | ≥13 MPa | |
| Compressive strength, 07 days | ASTM C109 | ≥20 MPa | |
| Compressive strength, 28 days | ASTM C109 | ≥28 MPa | |
| Flow table spread (workability) | ASTM C1437 | | ≥30% |
| Time of setting, initial (max) | ASTM C191, C807 | ≤7 hr | ≤2 hr |
| Time of setting, initial (min) | ASTM C191, C807 | ≥45 min | |
| ASR aggregate expansion, 14 days | ASTM C1260 | | ≤0.10% |
| Autoclave length change (CaO/MgO) | ASTM C151 | ≤0.80% | |
| Mortar bar expansion, 14 days (sulfates) | ASTM C1038 | ≤0.020% | |
| Air content of mortar by density | ASTM C185 | ≤12% | <4% |
| Chloride concentration, water soluble | ASTM C1218 | | ≤0.3% wt |
| Chloride permeability/diffusivity | C1202 | | ≤2000 C |
| Heat of hydration | C1702 | | ≤335 kJ/kg @ 3 days |
| Pore solution pH | | | ≥13 |
| Sulfate expansion, 06 months | ASTM C1012 | ≤0.05% | |
| Sulfate expansion, 12 months | ASTM C1012 | ≤0.10% | |
| Water/binder ratio for normal flow | ASTM C1437 | | ≤0.45 |
| Chloride concentration, acid soluble | ASTM C1152 | | ≤0.4% wt |
| ASR aggregate expansion, 14 days | ASTM C227 (Withdrawn) | ≤0.020% | |
| ASR aggregate expansion, 56 days | ASTM C227 (Withdrawn) | ≤0.060% | |
| Flow table spread (workability) | ASTM C1437 | | ±5% of the control mixture |
| Mortar compressive strength, 03 days | ASTM C109 | ≥13 MPa | |

TABLE 1-continued

| PARAMETER | TEST METHOD/ REFERENCE | ASTM C1157 TARGET | OTHER TARGET |
|---|---|---|---|
| Mortar compressive strength, 07 days | ASTM C109 | ≥20 MPa | |
| Mortar compressive strength, 28 days | ASTM C109 | ≥28 MPa | |
| Time of setting (vicat needle) | ASTM C191, C807 | Between 45 min and 7 hr | ≤4 hr |
| Initial time of setting, (penetration resistance) | ASTM C403 | | ≥2 hr |
| Final time of setting, (penetration resistance) | ASTM C403 | | ≤10 hr |
| Water/binder ratio for normal flow | ASTM C1437 | | ≤0.45 |
| Air content of mortar by density | ASTM C185 | ≤12% | <4% |
| ASR mortar bar expansion, 14 days | ASTM C1260, C1567 | | ≤0.10% |
| Soundness (autoclave expansion due to hydration of free CaO/MgO) | ASTM C151 | ≤0.80% and ≥ −0.80% | |
| Mortar bar expansion under water, 14 days (sulfates) | ASTM C1038 | ≤0.020% | |
| ASR concrete prism (1 year) | ASTM C1293 | | ≤0.04% |
| Chloride concentration, water soluble | ASTM C1218 | | ≤0.3% wt ACI 318 Table 19.3.2.1 (exposed to water) or ≤0.06% wt Pre-stresssed |
| Particle size sieve method (45 um) | ASTM C430 | 34% | |
| Sulfate expansion, 06 months | ASTM C1012 | ≤0.05% | |
| Sulfate expansion, 12 months | ASTM C1012 | ≤0.10% | |
| Chloride concentration, acid soluble | ASTM C1152 | | ≤0.4% wt |
| Heat of hydration | C1702 | | ≤335 kJ/kg @ 3 days |

In some embodiments, the cement or concrete of the invention may have one or more of the following combinations of properties.

In some embodiments, the cement or concrete of the invention may have a setting time less than 8 hours, less than 6 hours, less than 4 hours, less than 3 hours, less than 2 hours, less than 1 hour, less than 30 minutes, or less than 15 minutes, while reaching 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the cement or concrete of the invention may have a heat of hydration at 7 days less than 25 cal/g, 40 cal/g, 50 cal/g, 55 cal/g, 80 cal/g, or 100 cal/g, while reaching 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the cement or concrete of the invention may have a pore solution pH greater than 8.0, 9.0, 10.0, 11.0, 12.0, 12.5, 13.0, 13.5, or 14.0, while reaching 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the cement or concrete of the invention may have a rapid chloride permeability measured according to the procedure defined in ASTM C1202 of less than 100 coulomb, 200 coulomb, 400 coulomb, 600 coulomb, 800 coulomb, 1000 coulomb, 1500 coulomb, 2000 coulomb, 3000 coulomb, 4000 coulomb, 5000 coulomb, or 6000 coulomb, while reaching 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the cement or concrete of the invention may have a whiteness measured by on reflectance value or "L value" of greater than about 50%, 55%, 60%, 65%, 70%, 75%, 80%, 85%, 90%, or 95%, while reaching 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the cement or concrete of the invention may have a water/cementitious solids (also called water/binder) mass ratio of less than 0.2, 0.25, 0.3, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, or 0.70 required to achieve cement mortar flow greater than 0%, 5%, 10%, 15%, 20%, 25%, 30%, 35%, 40%, 45%, 50%, 55%, 60%, 65%, 70%, 75%, 80%, 85%, 90%, 95%, 100%, 105%, 110%, 120%, 130%, 140%, 150%, 160%, 170%, 180%, 190%, or 200% as measured using the flow table apparatus and procedure described in ASTM C230, "Specification for Flow Table for Use in Tests of Hydraulic Cement"; setting time less than 8 hours, less than 6 hours, less than 4 hours, less than 3 hours, less than 2 hours, less than 1 hour, less than 30 minutes, or less than 15 minutes, and 28 day compressive strength greater than about 4060 psi, greater than about 5000 psi, greater than about 6000 psi, greater than about 8000 psi, greater than about 10000 psi, greater than about 12000 psi, or greater than about 15000 psi.

In some embodiments, the low-carbon cements of the invention, which include the compositions of the cement component of concrete formulations using said cement, have compositions in which Ca, Si, and Al are the cations or metals present in highest concentration.

Figure 5:
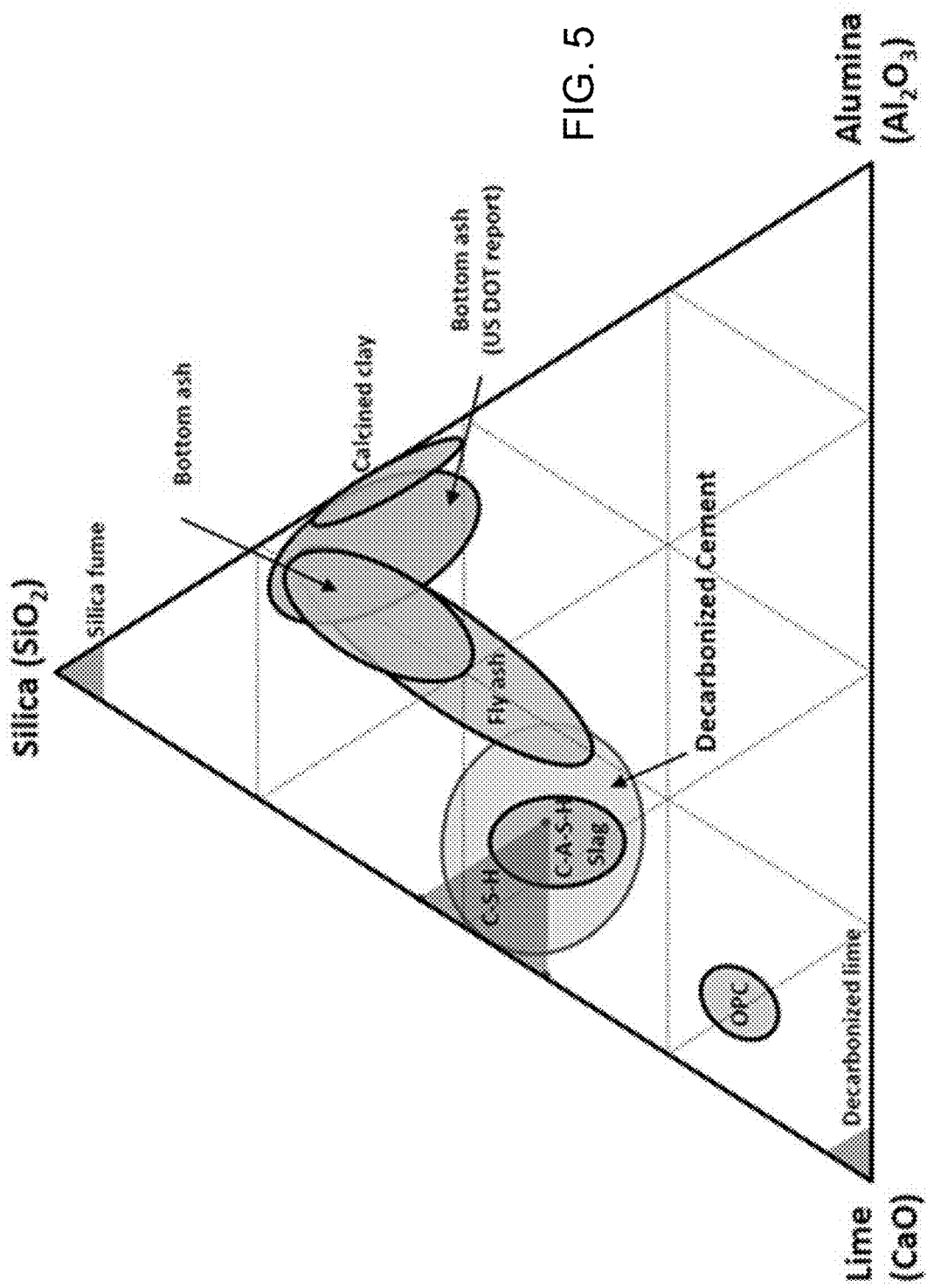
FIG. 5 is a ternary phase diagram illustrating mass composition of decarbonized cement, lime, pozzolans, and other materials.

In some embodiments, the relative amounts of Ca, Si and Al are similar to their proportions present in ordinary portland cement (OPC), as illustrated in FIG. 5. FIG. 5 is a ternary phase diagram illustrating mass composition of decarbonized cement, lime, pozzolans, and other materials. In some embodiments, the relative concentrations in weight percentage of the Ca, Si and Al oxide constituents are 60-75% CaO, 15-25% $SiO_2$, and 0-10% $Al_2O_3$, respectively. In some embodiments, the percentages of CaO, $SiO_2$, and $Al_2O_3$ are together at least 75% by weight of the total oxide composition of the cement.

In other embodiments, the relative amounts of Ca, Si and Al in the low-carbon cements of the invention are similar to their proportions present in C—S—H and C-A-S—H, as illustrated in FIG. 5. In some embodiments, the relative concentrations in weight percentage of the Ca, Si and Al oxide constituents are 45-60% CaO, 40-55% $SiO_2$, and 0-15% $Al_2O_3$, respectively. In some embodiments, the percentages of CaO, $SiO_2$, and $Al_2O_3$ are together at least 75% by weight of the total oxide composition of the cement.

In other embodiments, the relative amounts of Ca, Si and Al in the low-carbon cements of the invention have proportions similar to those indicated by the region labeled "Decarbonized Cement" in FIG. 5. In some embodiments, the relative concentrations in weight percentage of the Ca, Si and Al oxide constituents are 30-60% CaO, 30-60% $SiO_2$, and 0-25% $Al_2O_3$, respectively. In some embodiments, the percentages of CaO, $SiO_2$, and $Al_2O_3$ are together at least 75% by weight of the total oxide composition of the cement.

In some embodiments, the relative amounts of Ca, Si and Al in the low-carbon cements of the invention lie within a range of compositions bounded by mixtures of the compositions stated in the preceding three paragraphs, wherein the amount of each composition is a positive value.

In some embodiments, cement of any of the preceding compositions comprises at least a mixture of the decarbonized lime of the invention and a pozzolan.

Various specific example cement preparation methods and cements in accordance with the various embodiments, such as the methods 300 and 400 described above and other methods discussed herein are discussed below.

Example: Fly Ash/Quicklime Cement

For 1 kg of cement, mix: 0.40 kg quicklime produced using an electric kiln and 0.60 kg fly ash. The cement components above are used to make a cement mortar in the following manner. The dry powders are mixed for at least 30 s to ensure even distribution. The mixer is turned off; 0.40 kg of tap water is added to the bowl of the stand mixer containing the 1 kg blended dry cement powder. The mixer is turned on for 30 s at 140 rpm; 2.75 kg of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar was measured using a flow table apparatus in accordance with ASTM C230: Specification for Flow Table for Use in Tests of Hydraulic Cement is prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this method, the cement of this example had a flow of 43%.

Example: Calcined Clay/Hydrated Lime/Additive Cement.

For 1 kg cement, mix 0.55 kg calcined clay, 0.30 kg hydrated lime produced using room temperature aqueous electrochemical process from waste concrete feedstock, 0.10 kg portland cement, 0.03 kg gypsum powder, and 0.02 kg sodium hydroxide.

The cement components above are used to make a cement mortar in the following manner. The dry powders are mixed for at least 30 s to ensure even distribution. The mixer is turned off. 0.40 kg of tap water is added to the bowl of the stand mixer containing the 1 kg blended dry cement powder. The mixer is turned on for 30 s at 140 rpm. 2.75 kg of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar was measured as follows: A flow table apparatus in accordance with ASTM C230: Specification for Flow Table for Use in Tests of Hydraulic Cement was prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this method, the cement of this example had a flow of 43%.

Example: Natural Pozzolan/Ground Glass/Lime Kiln Dust/Additive Cement.

For 1 kg cement, mix 0.20 kg volcanic tuff natural pozzolan, 0.35 kg ground glass, 0.25 kg lime kiln dust, 0.15 kg portland cement, 0.03 kg gypsum powder, 0.02 kg calcium chloride.

The cement components above are used to make a cement mortar in the following manner. The dry powders are mixed for at least 30 s to ensure even distribution. The mixer is turned off. 0.40 kg of tap water is added to the bowl of the stand mixer containing the 1 kg blended dry cement powder. The mixer is turned on for 30 s at 140 rpm. 2.75 kg of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar was measured as follows. A flow table apparatus in accordance with ASTM C230: Specification for Flow Table for Use in Tests of Hydraulic Cement was prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this method, the cement of this example had a flow of 43%.

Example: Concrete. For 1 cubic meter of concrete, mix 365 kg cement from any of the examples above (e.g., the example Fly Ash/Quicklime Cement, the example Calcined Clay/Hydrated Lime/Additive Cement, the example Natural Pozzolan/Ground Glass/Lime Kiln Dust/Additive Cement, etc.), or other composition meeting requirements specified here, with 730 kg sand, 1250 kg aggregate, and 155 kg water.

Example: Metakaolin/Hydrated Lime/Additive Cement. For each 1 kg cement, mix, 0.63 kg metakaolin with specific surface area of at least 15 $m^2/g$ as measured by BET, 0.19 kg hydrated lime with average particle diameter of at least 4 micron and BJH pore volume less than 0.10 mL/g, 0.10 kg portland cement, 0.05 kg gypsum, and 0.02 kg dry sodium hydroxide beads with a diameter between 1 mm and 2 mm This combination of dry powders is added to the bowl of a benchtop stand mixer and mixed together using a flat beater paddle for at least one minute at 140RPM. This ensures the powders are well distributed. After this initial mixing period, the mixer is turned off, and the mixture is hydrated with 0.6 kg of water poured directly on top of the mixed dry powder. The stand mixer is turned on at 140RPM to incorporate the water into the mix. This mixture of cement powder and water is referred to as a cement paste. To prepare a cement mortar, as is more commonly tested for compressive strength, 2.75 kg of sand is added to the paste mixture. The sand is incorporated slowly over a 30-second period while the mixer is turned on to 140RPM. After the sand has been added, the mortar is mixed for 30 seconds at 285RPM. The mixer is then turned off for a 90 second period, during which time the operator scrapes down the sides of the mixing bowl. After this pause, the mixing continues at 285RPM for an additional 60 seconds. After this mixing process, the mortar is ready for subsequent casting and testing.

After the mortar is mixed, the mortar fresh properties may be evaluated. Amongst important fresh properties are the workability of the mortar and the time that it may remain workable. The time that it remains workable is known as the set time. Workability may be evaluated using the method and apparatus described in ASTM C1437: Standard Test Method for Flow of Hydraulic Cement Mortar. The fresh mortar is packed into the conical mold of the flow table in two layers using a 1"×0.5"×6" hard rubber tamping rod. The tamping is done by pressing the tamping rod into the fresh mortar at least 20 times all across the layer. After the second layer is added and tamped, the excess cement is removed from the top of the conical mold by using a hand trowel in a sawing motion over the surface. The conical mold is then removed, leaving behind just the mortar. The flow table is then actuated 25 times over a 15 second period, where each actuation raises and drops the table at least 1", impacting the mortar against the table and thus flattening it. The resulting spread of the mortar is measured for its diameter across four equally spaced diagonals using a 12" set of digital calipers against the edge of the mortar. The flow of the mortar is determined by the difference between the initial diameter of the conical mold, 100 mm, and the average of the diagonal measurements. In the case of this recipe, the flow was determined to be 37% from an average diagonal diameter of 136.8 mm. The set time is determined using the method and apparatus described in ASTM C807: Test Method for Time of Setting of Hydraulic Cement Mortar by Modified Vicat Needle. The mortar is packed into a cylindrical mold with a diameter of 76 mm in two layers, where both layers are tamped. The excess cement mortar is removed using a trowel. The cement is stored in a moist cabinet with 100% humidity to prevent drying. The saturation humidity prevents a change in the water to cement ratio of the mix due to evaporation. Every 15 minutes, the 2 mm Vicat needle with a 300 g mass attached is allowed to sink into the mortar mixture. The depth of penetration is related to the degree of curing. Full needle penetration occurs when there has been no setting. When the needle cannot penetrate further than 10 mm below the surface, the mortar is considered to have set. Each needle penetration is no less than 10 mm away from previous needle drops. For this particular mixture, the time of setting was 95 minutes after the water was added to the cement powder.

After the flow and setting time tests have started, the mortar is poured into molds to achieve the shape needed for future compression tests. The testing geometry is 2"×2"×2" cubes, formed by cubic molds consisting of two sidewalls and one bottom piece. All of the joints are sealed using a liberal coating of petroleum jelly such as vaseline, and then a vegetable oil based mold release is applied to the faces of the mold. The molds are then filled with mortar in two layers, with each layer tamped 32 times, by utilizing a perpendicular sweeping pattern over the layer of the cube. The excess mortar is removed with a trowel in a sawing motion. The molds are then stored in a humid container to prevent drying. The cubes remain in their molds for at least 24 hours, by which point they have set and cured enough to have the strength to resist the demolding process. The demolding process consists of disassembling the molds and removing the cubes carefully. The cubes are then placed in storage in a moist cabinet, an environment with 100% humidity. Saturation humidity is required for curing to prevent the cubes from drying out, as the water is believed to be a critical reactant for the hydration of the cement.

The cubes are evaluated for their compressive strength at different points of the curing process, which may take more than 180 days to complete. The cubes are commonly tested at 3, 7, 28, and 90 days, but may also be tested at 1, 14, 180, and 365 days or other intervals. For each testing day, three cement mortar cubes are tested for their ultimate compressive strength using a uniaxial compression test, where two opposing platens crush against the cube. The force applied by the platens is monitored until ultimate failure of the cube, and the peak force applied to the cube is recorded. This applied force is then divided by the cross-sectional area of the cube, 4 $in^2$, and the pressure at peak force is recorded as the failure strength. The strength of the three cubes is averaged to determine the strength of the cement mortar at the given day of the test. This strength is reported in units of MPa or psi. This mix recipe resulted in failure strengths of 10.14 MPa at 3 days, 15.41 MPa at 7 days, 20.17 MPa at 29 days, and 26.73 MPa at 90 days.

Example: Cement made from Natural Pozzolan, Hydrated Lime, Portland Cement, and Additives.

For each 1 kg cement, mix 0.1 kg portland cement meeting the specifications of ASTM C150 Type I/II cement, manufactured by LafargeHolcim, with 0.2 kg hydrated lime. This hydrated lime is manufactured by Carmeuse, a lime and limestone company, via limestone calcination and slaking. This lime has a paste water demand of 1.1 g water/g lime to produce a paste with viscosity approximately equal to a 0.4 g water/1.0 g portland cement paste. Additionally, mix, with the portland cement and the hydrated lime, 0.68 kg natural pozzolan sold by CR Minerals as Tephra NP and 0.02 kg gypsum powder.

The cement components above are used to make a cement mortar in the following manner. The dry powders are mixed for at least 30 s to ensure even distribution. The mixer is turned off. 620 g of 1.5 M NaOH (technical grade) in tap water solution is added to the bowl of the stand mixer containing the 1060 g blended dry cement powder. 10.6 g of Chryso Optima 258 EMX polycarboxylate superplasticizer solution is added to the mixer bowl. The mixer is turned on for 30 s at 140 rpm. 2915 g of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar was measured as follows. A flow table apparatus in accordance with ASTM C230: Specification for Flow Table for Use in Tests of Hydraulic Cement was prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this method, the cement of this example had a flow of 43%.

The compressive strength of this cement mortar was tested following the procedure described in ASTM C109: Test Method for Compressive Strength of Hydraulic Cement Mortars. The procedure entails the following steps. Fill a 50 mm cube mold approximately halfway with cement mortar. Use a tamping rod to tamp the mortar into the cube mold, tamping 32 times over a 10 s period back and forth along opposing sides of the mold. Fill the 50 mm cube mold with additional cement mortar until the mortar slightly overflows from the mold. Use a tamping rod to tamp the mortar into the cube mold, tamping 32 times over a 10 s period back and forth along opposing sides of the mold. Scrape off excess mortar using a trowel. Draw the edge of a trowel over the surface of the mold a second time, using a sawing motion to create a smooth, clean surface. Place the molded cement mortar cube (or cubes) into a container saturated with water vapor. The relative humidity inside the curing chamber should be at least 98% relative humidity. The curing temperature should be between 20 degrees C. and 25 degrees C. Place a moist towel over the top of the cubes to ensure that they are kept sufficiently humidified. Allow the cube(s) to cure inside the mold(s) for at least 24 hr. When the cube(s) are sufficiently cured, remove them from the molds and place them back into the humidity chamber. Remove three cubes at each time point, 3 days, 7 days, 28 days, and 90 days. Use a hydraulic compression tester to compress each cube until it fractures. Record the compressive strength at fracture. The compressive strength of the cement mortar prepared in this manner was 450 psi at 3 days and 798 psi at 7 days.

Example: Cement made from electrochemical precipitated decarbonized hydrated lime, metakaolin, limestone, and additives For each 1 kg cement, mix 0.147 kg electrochemical precipitated decarbonized hydrated lime. To synthesize the calcium hydroxide in this example, an electrochemical reactor powered by solar electricity is used to produce a strong acid and a strong base, which are then used to manufacture the calcium hydroxide. Therefore, this calcium hydroxide is an electrochemical calcium hydroxide. The acid from the electrochemical reactor is used to dissolve calcium from a calcium silicate material and create a solution containing calcium ions. The resulting solution of calcium ions is reacted with the strong base to precipitate calcium hydroxide. Therefore, this calcium hydroxide is a precipitated calcium hydroxide. This calcium hydroxide is produced with no fossil fuel combustion $CO_2$ emissions and no limestone decomposition $CO_2$ emissions, so it is also a decarbonized calcium hydroxide. This hydrated lime has a BET specific surface area of 1.63 $m^2/g$, a BJH pore volume of 0.011 mL/g, and a paste consistency water demand of 0.35 g water/1 g calcium hydroxide. Herein, this example hydrated lime may be referred to as "Sublime Systems precipitated calcium hydroxide A".

Additionally, mix 0.160 kg high calcium limestone powder, 0.643 kg high reactivity metakaolin pozzolan, and 0.050 kg gypsum powder.

The cement components above were used to make a cement mortar in the following manner. The dry powders are mixed for at least 30 s to ensure even distribution. The mixer is turned off. 689 g of 1.5 M NaOH (technical grade) in tap water solution is added to the bowl of the stand mixer containing 1060 g blended dry cement powder. 10.6 g of Chryso Optima 258 EMX polycarboxylate superplasticizer solution is added to the mixer bowl. The mixer is turned on for 30 s at 140 rpm. 2915 g of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar of this example was measured as follows. A flow table apparatus in accordance with ASTM C230: Specification for Flow Table for Use in Tests of Hydraulic Cement was prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this method, the cement of this example was measured to have a flow of 48%.

The compressive strength of this cement mortar of this example was tested following the procedure described in ASTM C109: Test Method for Compressive Strength of Hydraulic Cement Mortars. The procedure entails the following steps. Fill a 50 mm cube mold approximately halfway with cement mortar. Use a tamping rod to tamp the mortar into the cube mold, tamping 32 times over a 10 s period back and forth along opposing sides of the mold. Fill the 50 mm cube mold with additional cement mortar until the mortar slightly overflows from the mold. Use a tamping rod to tamp the mortar into the cube mold, tamping 32 times over a 10 s period back and forth along opposing sides of the mold. Scrape off excess mortar using a trowel. Draw the edge of a trowel over the surface of the mold a second time, using a sawing motion to create a smooth, clean surface. Place the molded cement mortar cube (or cubes) into a container saturated with water vapor. The relative humidity inside the curing chamber should be at least 98% relative humidity. The curing temperature should be between 20 degrees C. and 25 degrees C. Place a moist towel over the top of the cubes to ensure that they are kept sufficiently humidified. Allow the cube(s) to cure inside the mold(s) for at least 24 hr. When the cube(s) are sufficiently cured, remove them from the molds and place them back into the humidity chamber. Remove three cubes at each time point, 3 days, 7 days, 28 days, and 90 days. Use a hydraulic compression tester to compress each cube until it fractures. Record the compressive strength at fracture. The compressive strength of the cement mortar prepared in accordance with this example was tested and shown to be 8.3 MPa at 3 days, 10.8 MPa at 7 days, and 14 MPa at 28 days.

Example: Cement made from metakaolin, hydrated lime, portland cement, limestone, and additives.

For each 1 kg cement, mix 0.380 kg ASTM C150-19 Common Reference Type I/II Portland Cement from the Cement and Concrete Reference Laboratory and 0.050 kg hydrated lime. This hydrated lime is manufactured by Carmeuse, a lime and limestone company, via limestone calcination and slaking. This lime has a paste water demand of 1.1 g water/g lime to produce a paste with viscosity approximately equal to a 0.4 g water/1.0 g portland cement paste. Additionally, mix 0.416 kg high reactivity metakaolin pozzolan, 0.104 kg high calcium limestone powder, 0.015 kg gypsum powder, and 0.035 kg sodium sulfate.

The cement components above are used to make a cement mortar in the following manner. The dry powders are mixed for at least 30 s to ensure even distribution. The mixer is turned off. 530 g of tap water is added to the bowl of the stand mixer containing 1060 g blended dry cement powder. 10.6 g of Chryso Optima 258 EMX polycarboxylate superplasticizer solution is added to the mixer bowl. The mixer is turned on for 30 s at 140 rpm. 2915 g of Ottawa sand is poured into the stand mixer while it is running at 140 rpm over a 30 s period. The mixer speed is changed to 285 rpm and the mortar is mixed for an additional 30 s. The mixer is stopped for 90 s. During the first 15 s of this interval, a spatula is used to scrape down the sides of the mixer bowl. The mixer is turned on again for 60 s at 285 rpm. This concludes the mortar preparation procedure. The mortar is now ready for property measurements and casting.

The flow of the cement mortar was measured as follows. A flow table apparatus in accordance with ASTM C230: Specification for Flow Table for Use in Tests of Hydraulic Cement was prepared. A conical mold with 100 mm major diameter is placed on the center of the flow table platform and filled with cement mortar. The conical mold is removed, leaving the cement mortar behind. The flow table platform is dropped 25 times in a period of 15 s. Digital calipers are used to measure the diameter of the spread out cement mortar four times. The four measured diameter lines are spread at 45 degree angles, so they uniformly cover the spread out cement mortar. The flow percent is calculated by averaging the four final diameter measurements, dividing by the initial 100 mm diameter, and subtracting 100%. Following this flow testing method, the cement of this example had a flow of 30%.

The compressive strength of this cement mortar was tested following the procedure described in ASTM C109: Test Method for Compressive Strength of Hydraulic Cement Mortars. The procedure entails the following steps. Fill a 50 mm cube mold approximately halfway with cement mortar. Use a tamping rod to tamp the mortar into the cube mold, tamping 32 times over a 10 s period back and forth along opposing sides of the mold. Fill the 50 mm cube mold with additional cement mortar until the mortar slightly overflows from the mold. Use a tamping rod to tamp the mortar into the cube mold, tamping 32 times over a 10 s period back and forth along opposing sides of the mold. Scrape off excess mortar using a trowel. Draw the edge of a trowel over the surface of the mold a second time, using a sawing motion to create a smooth, clean surface. Place the molded cement mortar cube (or cubes) into a container saturated with water vapor. The relative humidity inside the curing chamber should be at least 98% relative humidity. The curing temperature should be between 20 degrees C. and 25 degrees C. Place a moist towel over the top of the cubes to ensure that they are kept sufficiently humidified. Allow the cube(s) to cure inside the mold(s) for at least 24 hr. When the cube(s) are sufficiently cured, remove them from the molds and place them back into the humidity chamber. Remove three cubes at each time point, 3 days, 7 days, 28 days, and 90 days. Use a hydraulic compression tester to compress each cube until it fractures. Record the compressive strength at fracture. The compressive strength of the cement mortar of this example prepared in this manner was found to be 19.5 MPa at 3 days, 24.7 MPa at 7 days, and 33.8 MPa at 28 days.

The following Table 2 illustrates example relationships between BET SSA, BJH pore volume, and water demand for example calcium hydroxide powder in accordance with various embodiments (such as Sublime Systems precipitated calcium hydroxide A and Sublime Systems precipitated calcium hydroxide B) and commercial slaked calcium hydroxide (such as Commercial slaked calcium hydroxide A which was Chemstar Type S Hydrated Lime and Commerical slaked calcium hydroxide B which was Mississippi Lime Standard Hydrated Lime Lot #SH091420). Sublime Systems precipitated calcium hydroxide A and Sublime Systems precipitated calcium hydroxide B may both be examples of calcium hydroxide in accordance with various embodiments and both may be electrochemical precipitated decarbonized hydrated lime. Sublime Systems precipitated calcium hydroxide A is discussed above. Sublime Systems precipitated calcium hydroxide B may be calcium hydroxide synthesized at least in part using an electrochemical reactor and a precipitation reaction, therefore the Sublime Systems precipitated calcium hydroxide B may be electrochemical calcium hydroxide and a precipitated calcium hydroxide. Sublime Systems precipitated calcium hydroxide B may be calcium hydroxide produced with no fossil fuel combustion $CO_2$ emissions and no limestone decomposition $CO_2$ emissions, so it is also a decarbonized calcium hydroxide. Sublime Systems precipitated calcium hydroxide B may be calcium hydroxide a BET specific surface area of 2.38 $m^2/g$, a BJH pore volume of 0.015 mL/g, and a paste consistency water demand of 0.45 g water/1 g calcium hydroxide.

The comparison of calcium hydroxide powder in accordance with various embodiments as compared to commercial slaked calcium hydroxide in Table 2 shows that low BET specific surface area and/or low BJH pore volume may contribute to low water demand in some dry powder solid materials such as calcium hydroxide powder.

TABLE 2

| Material Description | BET SSA ($m^2/g$) | BHJ Pore Volume (mL/g) | Paste Consistency Water Demand |
|---|---|---|---|
| Sublime Systems precipitated calcium hydroxide A | 1.63 | 0.011 | 0.35 |
| Sublime Systems precipitated calcium hydroxide B | 2.38 | 0.015 | 0.45 |
| Commercial slaked calcium hydroxide A (Chemstar Type S Hydrated Lime) | 22.1 | 0.135 | 1.15 |
| Commercial slaked calcium hydroxide B (Mississippi Lime Standard Hydrated Lime Lot #SH091420) | 17.5 | 0.101 | 0.95 |

Reducing the amount of water added to a cement paste, mortar, concrete, or related material may increase the compressive strength of the material once it has set and hardened. For example, FIG. 3.1 from Practical Concrete Mix Design by Avijit Chaubey, 2020, DOI: 10.1201/9780429285196, page 72, shows that compressive strength of concrete tends to increase as the water to cement ratio decreases. Cements and/or blended cement component materials with low water demand may be advantageous because their low water demand enables the creation of cement paste, mortar, concrete, or other related materials with sufficient flow but low water addition, which contributes to higher compressive strength once the material has set and hardened A key benefit of various embodiments may be the use of lime which is produced without $CO_2$ emissions to the atmosphere resulting from the combustion of fossil fuels.

A major advantage of the various embodiments may be a decrease in $CO_2$ emissions. Currently, portland cement is one of the most widely used manmade materials in the world. Manufacturing portland cement accounts for around 8% of all global $CO_2$ emissions, approximately half of which arise from fossil fuel combustion and half of which arise from "chemical" emissions from limestone decomposition. These $CO_2$ emissions are harmful because they contribute to global climate change. Human civilization requires the use of cement, but $CO_2$ emissions must be drastically reduced.

The decarbonized cement described of the various embodiments may be used to substitute or fully replace portland cement for many construction applications. The embodied $CO_2$ emissions of these cement blends may be significantly lower than portland cement. If widely adopted as a replacement for portland cement, this decarbonized pozzolanic cement in accordance with various embodiments could significantly reduce global $CO_2$ emissions.

In some embodiments, the cement described herein may have superior shelf stability or shelf life compared to other types of cement such as portland cement. In some cases, cement may decrease in performance over time as it is stored in dry powder form. This may be manifested in decreased compressive strength, increased setting time, or other deleterious changes to performance. In some cases, this decrease in performance may be related to absorption of water by a dry, hygroscopic, and/or deliquescent cement or concrete material, or a component thereof.

In some cases, cement may absorb water, and some fraction of the material may undergo hydration reactions, such as the reaction of alite to create calcium silicate hydrate. This may decrease the reactivity of this material. For this reason, cement materials may need to be stored under special conditions to prevent the ingress of moisture as liquid water or as water vapor, such as humidity in the atmosphere. In some cases, cement may require storage in air-tight containers such as impermeable plastic bags, or in dehumidified storage silos, or other similar special conditions. In some embodiments, the cement of the various embodiments described herein will show less degradation in performance compared to other cements such as portland cement, when stored under the same conditions for the same amount of time. For example, in some embodiments, the cement of the various embodiments described herein will have less than 0.01%, 0.05%, 0.1%, 0.5%, 1%, 2%, 3%, 4%, 5%, 6%, 7%, 8%, 9%, 10%, 12%, 15%, 20%, 25%, 30%, 35%, 40%, 45%, or 50% decrease in compressive strength at 1, 3, 7, 28, 56, 90, 180, or 365 days when stored in air with at least 1%, 2%, 3%, 5%, 7%, 10%, 15%, 20%, 25%, 30%, 35%, 40%, 45%, 50%, 55%, 60%, 65%, 70%, 75%, 80%, 85%, 90%, 95%, 98%, or 99% relative humidity. In some embodiments, this approach may extend the shelf life by 1%, 5%, 10%, 20%, 30%, 40%, 50%, 75%, 100%, 150%, 200%, 300%, 500%, 1000%, 2000%, 5000%, or 10000% to achieve minimal degradation in performance when stored under the same conditions as a reference or control cement material. In some embodiments, this approach may extend the shelf life by 1 h, 2 h, 4 h, 8 h, 12 h, 1 day, 2 days, 3 days, 5 days, 7 days, 10 days, 15 days, 20 days, 30 days, 40 days, 50 days, 75 days, 100 days, 150 days, 200 days, 300 days, 365 days, 500 days, 1000 days, 2000 days, or 5000 days to achieve minimal degradation in performance when stored under the same conditions as a reference or control cement material. In some embodiments, the materials may absorb less than 0.01%, 0.05%, 0.1%, 0.5%, 1%, 2%, 3%, 4%, 5%, 6%, 7%, 8%, 9%, 10%, 12%, 15%, 20%, 25%, 30%, 35%, 40%, 45%, or 50% water on a mass basis of the hygroscopic material, after storage for 1 h, 2 h, 4 h, 8 h, 12 h, 1 day, 2 days, 3 days, 5 days, 7 days, 10 days, 15 days, 20 days, 30 days, 40 days, 50 days, 75 days, 100 days, 150 days, 200 days, 300 days, 365 days, 500 days, 1000 days, 2000 days, or 5000 days under 1%, 2%, 3%, 5%, 7%, 10%, 15%, 20%, 25%, 30%, 35%, 40%, 45%, 50%, 55%, 60%, 65%, 70%, 75%, 80%, 85%, 90%, 95%, 98%, or 99% relative humidity.

Various embodiments may include a desiccant that becomes a component of the final product. Various embodiments may include an alkaline solid absorbent used as a way to extend the shelf life of a hygroscopic solid. In some embodiments, this hygroscopic powder may comprise lime, pozzolan, limestone, or cement. In some embodiments, the alkaline solid may be potassium hydroxide, sodium hydroxide, or another alkali or alkali earth hydroxide. In some embodiments, the alkaline solid may be in the form of pellets, flakes, beads, pearls, or powder. In some embodiments, the alkaline solid may have particles with diameters of at least 1 micron, 3 microns, 5 microns, 10 microns, 20 microns, 30 microns, 50 microns, 70 microns, 100 microns, 200 microns, 300 microns, 500 microns, 700 microns, 1 mm, 1.5 mm, 2 mm, 3 mm, 4 mm, 5 mm, 6 mm, 7 mm, 8 mm, 9 mm, 10 mm, 15 mm, 20 mm, 30 mm, 40 mm, 50 mm, 70 mm, 100 mm, 200 mm, 300 mm, 500 mm, 700 mm, or 1000 mm. In some embodiments, the alkaline solid may have particles with diameters of less than 1 micron, 3 microns, 5 microns, 10 microns, 20 microns, 30 microns, 50 microns, 70 microns, 100 microns, 200 microns, 300 microns, 500 microns, 700 microns, 1 mm, 1.5 mm, 2 mm, 3 mm, 4 mm, 5 mm, 6 mm, 7 mm, 8 mm, 9 mm, 10 mm, 15 mm, 20 mm, 30 mm, 40 mm, 50 mm, 70 mm, 100 mm, 200 mm, 300 mm, 500 mm, 700 mm, or 1000 mm. In some embodiments, the alkaline solid may have particles with diameters of about 1 micron, 3 microns, 5 microns, 10 microns, 20 microns, 30 microns, 50 microns, 70 microns, 100 microns, 200 microns, 300 microns, 500 microns, 700 microns, 1 mm, 1.5 mm, 2 mm, 3 mm, 4 mm, 5 mm, 6 mm, 7 mm, 8 mm, 9 mm, 10 mm, 15 mm, 20 mm, 30 mm, 40 mm, 50 mm, 70 mm, 100 mm, 200 mm, 300 mm, 500 mm, 700 mm, 1000 mm, or 1 micron-1000 mm.

Various embodiments may include sodium hydroxide or potassium hydroxide mixed with a hygroscopic powder. In some embodiments, the hygroscopic powder may be a cement powder such as portland cement, a lime-pozzolan cement, a geopolymer cement, an alkali-activated cement, a blended hydraulic cement, or another type of cement, including such cement as described in this invention. In some embodiments, solid NaOH or KOH may be blended into a cement powder to act as an internal desiccant, extending its shelf life and/or enabling storage in conditions with higher ambient humidity without significant degradation to the performance of the cement. In some embodiments, the NaOH or KOH may dissolve in the mixing water used to make the dry cement powder into a cement mortar, grout, concrete, or other building material. In some embodiments, the NaOH or KOH may also act as a set-accelerator or strength accelerating additive. Without being limited by any particular theory, in some embodiments, the KOH or NaOH may activate the pozzolanic reaction by increasing the solubility of silica, as described above. In some embodiments, the absorbent solid such as KOH or NaOH may be stored within the same sealed container as the hygroscopic powder, but not mixed together. In some embodiments, the NaOH or KOH may be mixed into the hygroscopic powder such as cement powder.

Various embodiments may include a combination of materials stored in two or more separate containers to limit undesired cementitious reactions from occurring while the materials are in storage. In some embodiments, a pozzolan may be stored in a first container, and all other cement components including but not limited to calcium hydroxide, portland cement, gypsum, limestone, and/or admixtures may be stored in a second container. In some embodiments, portland cement and lime may be stored together in a first container, and all other cement components including but not limited to pozzolan, limestone, gypsum, and/or admixtures may be stored together in a second container. Various embodiments may include separate cement component materials that may react with one another in the presence of water to make calcium silicate hydrate and/or other hydrated phases. Various embodiments may include a method of storing said materials in the minimum number of containers possible to prevent premature reaction and/or degradation of one or more performance characteristics of a cementitious mixture. Various embodiments may include the material compositions stored within each container. Various embodiments may include a method for storing materials to prevent degradation. Various embodiments may include a method for determining combinations of materials that can safely be stored together to avoid degradation of cement performance. Various embodiments may include a mode of storage that may prevent the cement from clumping, and/or it may preserve or enhance bulk solid flow properties to enable the cement to be transported or dispensed more easily.

Various examples of aspects of the various embodiments are described in the following paragraphs.

Example A. Cementitious material or materials with low embodied carbon.

Example B. Materials produced from the cementitious material or materials of example A. Example C. A method comprising making the cementitious material or materials of example A and/or making the materials of example B.

Example D. The cementitious material or materials of any of examples A-C, wherein the cementitious material or materials comprises a pozzolanic cement blend composition comprising decarbonized lime, at least one pozzolan, and optionally additional components.

Example E. The cementitious material or materials of example D, wherein the decarbonized lime is produced using a process wherein the combined $CO_2$ emissions to the atmosphere from chemically bound sources in the raw material and from the combustion of fuels is less than 1 kg $CO_2$ per kg lime.

Example F. The cementitious material or materials of example D, wherein the decarbonized lime comprises quicklime (calcium oxide, CaO), hydrated lime (calcium hydroxide, $Ca(OH)_2$), or a mixture of the two.

Example G. The cementitious material or materials of any of examples A-F, used as a component of concrete, mortar, and/or other similar building materials.

Example H. Decarbonized cement and methods for making decarbonized cement.

Example I. Decarbonized cement having embodied $CO_2$ emissions lower than portland cement and methods for making the same Example J. Methods for producing cementitious compositions and cementitious compositions.

Example K. Methods for using lime produced without $CO_2$ emissions to the atmosphere resulting from the combustion of fossil fuels.

Example 1. A cementitious binder comprising precipitated lime and at least one pozzolan.

Example 2. The cementitious binder of example 1, wherein the lime comprises at least 90% calcium hydroxide by mass.

Example 3. The cementitious binder of example 2, wherein the cementitious binder comprises less than about 50% by mass portland cement clinker.

Example 4. The cementitious binder of example 3, wherein the calcium hydroxide is an electrochemical calcium hydroxide.

Example 5. The cementitious binder of example 3, wherein the calcium hydroxide is a low-temperature calcium hydroxide.

Example 6. The cementitious binder of example 3, wherein the calcium hydroxide is a decarbonized calcium hydroxide.

Example 7. The cementitious binder of example 3, wherein the calcium hydroxide has a Barrett, Joyner, and Halenda pore volume of less than about 0.10 mL/g.

Example 8. The cementitious binder of example 3, wherein the calcium hydroxide has a Barrett, Joyner, and Halenda pore volume of less than about 0.05 mL/g.

Example 9. The cementitious binder of example 3, wherein the calcium hydroxide has a Brunauer, Emmett, Teller specific surface area of less than about 4 m2/g.

Example 10. The cementitious binder of example 3, wherein the calcium hydroxide has a Brunauer, Emmett, Teller specific surface area of less than about 2 m2/g.

Example 11. The cementitious binder of example 3, wherein the calcium hydroxide has a paste consistency water demand of less than about 0.5 parts water per 1 part calcium hydroxide by mass.

Example 12. The cementitious binder of example 3, wherein the calcium hydroxide has a paste consistency water demand of less than about 0.4 parts water per 1 part calcium hydroxide by mass.

Example 13. The cementitious binder of example 3, wherein the calcium hydroxide has a paste consistency water demand of less than about 0.5 parts water per 1 part calcium hydroxide by mass, and a calcium hydroxide reactivity of greater than 90%.

Example 14. The cementitious binder of example 3, wherein the calcium hydroxide has a paste consistency water demand of less than about 0.4 parts water per 1 part calcium hydroxide by mass, and a reactivity of greater than 90%.

Example 15. The cementitious binder of example 3, wherein the calcium hydroxide has a mini-slump cone water demand of less than about 0.5 parts water per 1 part calcium hydroxide by mass.

Example 16. The cementitious binder of example 3, wherein the calcium hydroxide has a mini-slump cone water demand of less than about 0.4 parts water per 1 part calcium hydroxide by mass.

Example 17. The cementitious binder of example 3, wherein the calcium hydroxide has a mini-slump cone water demand of less than about 0.5 parts water per 1 part calcium hydroxide by mass, and a calcium hydroxide reactivity of greater than 90%.

Example 18. The cementitious binder of example 3, wherein the calcium hydroxide has a mini-slump cone water demand of less than about 0.4 parts water per 1 part calcium hydroxide by mass, and a reactivity of greater than 90%.

Example 19. The cementitious binder of example 3, wherein the calcium hydroxide particles have an average aspect ratio of less than about 1.2.

Example 20. The cementitious binder of example 3, wherein the cementitious binder has a paste consistency water demand of less than about 0.6 parts water per 1 part cementitious binder by mass.

Example 21. The cementitious binder of example 3, wherein the cementitious binder has a paste consistency water demand of less than about 0.5 parts water per 1 part cementitious binder by mass.

Example 22. The cementitious binder of example 3, wherein the cementitious binder has a mini-slump cone water demand of less than about 0.6 parts water per 1 part cementitious binder by mass.

Example 23. The cementitious binder of example 3, wherein the cementitious binder has a mini-slump cone water demand of less than about 0.5 parts water per 1 part cementitious binder by mass.

Example 24. The cementitious binder of example 3, wherein the pozzolan is a raw or calcined natural pozzolan or clay.

Example 25. The cementitious binder of example 4, wherein the pozzolan is a raw or calcined natural pozzolan or clay.

Example 26. The cementitious binder of example 5, wherein the pozzolan is a raw or calcined natural pozzolan or clay.

Example 27. The cementitious binder of example 6, wherein the pozzolan is a raw or calcined natural pozzolan or clay.

Example 28. The cementitious binder of example 7, wherein the pozzolan is a raw or calcined natural pozzolan or clay.

Example 29. The cementitious binder of example 8, wherein the pozzolan is a raw or calcined natural pozzolan or clay.

Example 30. The cementitious binder of example 11, wherein the pozzolan is a raw or calcined natural pozzolan or clay.

Example 31. The cementitious binder of example 12, wherein the pozzolan is a raw or calcined natural pozzolan or clay.

Example 32. The cementitious binder of example 13, wherein the pozzolan is a raw or calcined natural pozzolan or clay.

Example 33. The cementitious binder of example 14, wherein the pozzolan is a raw or calcined natural pozzolan or clay.

Example 34. The cementitious binder of example 19, wherein the pozzolan is a raw or calcined natural pozzolan or clay.

Example 35. The cementitious binder of example 3, wherein the cementitious binder has a 3-day compressive strength of greater than about 13 MPa in 2 inch cement mortar cube compressive strength tests.

Example 36. The cementitious binder of example 3, wherein the cementitious binder has a 7-day compressive strength of greater than about 20 MPa in 2 inch cement mortar cube compressive strength tests.

Example 37. The cementitious binder of example 3, wherein the cementitious binder has a 28-day compressive strength of greater than about 28 MPa in 2 inch cement mortar cube compressive strength tests.

Example 38. The cementitious binder of example 3, wherein the cementitious binder has an initial setting time of less than about 2 hours.

Example 39. The cementitious binder of example 3, wherein the cementitious binder has an initial setting time of less than about 3 hours.

Example 40. The cementitious binder of example 11, wherein the cementitious binder has a 3-day compressive strength of greater than about 13 MPa in 2 inch cement mortar cube compressive strength tests.

Example 41. The cementitious binder of example 11, wherein the cementitious binder has a 7-day compressive strength of greater than about 20 MPa in 2 inch cement mortar cube compressive strength tests.

Example 42. The cementitious binder of example 11, wherein the cementitious binder has a 28-day compressive strength of greater than about 28 MPa in 2 inch cement mortar cube compressive strength tests.

Example 43. The cementitious binder of example 11, wherein the cementitious binder has an initial setting time of less than about 2 hours.

Example 44. The cementitious binder of example 11, wherein the cementitious binder has an initial setting time of less than about 3 hours.

Example 45. The cementitious binder of example 24, wherein the cementitious binder has a 3-day compressive strength of greater than about 13 MPa in 2 inch cement mortar cube compressive strength tests.

Example 46. The cementitious binder of example 24, wherein the cementitious binder has a 7-day compressive strength of greater than about 20 MPa in 2 inch cement mortar cube compressive strength tests.

Example 47. The cementitious binder of example 24, wherein the cementitious binder has a 28-day compressive strength of greater than about 28 MPa in 2 inch cement mortar cube compressive strength tests.

Example 48. The cementitious binder of example 24, wherein the cementitious binder has an initial setting time of less than about 2 hours.

Example 49. The cementitious binder of example 24, wherein the cementitious binder has an initial setting time of less than about 3 hours.

Example 50. The cementitious binder of example 28, wherein the cementitious binder has a 3-day compressive strength of greater than about 13 MPa in 2 inch cement mortar cube compressive strength tests.

Example 51. The cementitious binder of example 28, wherein the cementitious binder has a 7-day compressive strength of greater than about 20 MPa in 2 inch cement mortar cube compressive strength tests.

Example 52. The cementitious binder of example 28, wherein the cementitious binder has a 28-day compressive strength of greater than about 28 MPa in 2 inch cement mortar cube compressive strength tests.

Example 53. The cementitious binder of example 28, wherein the cementitious binder has an initial setting time of less than about 2 hours.

Example 54. The cementitious binder of example 28, wherein the cementitious binder has an initial setting time of less than about 3 hours.

Example 55. The cementitious binder of example 30, wherein the cementitious binder has a 3-day compressive strength of greater than about 13 MPa in 2 inch cement mortar cube compressive strength tests.

Example 56. The cementitious binder of example 30, wherein the cementitious binder has a 7-day compressive strength of greater than about 20 MPa in 2 inch cement mortar cube compressive strength tests.

Example 57. The cementitious binder of example 30, wherein the cementitious binder has a 28-day compressive strength of greater than about 28 MPa in 2 inch cement mortar cube compressive strength tests.

Example 58. The cementitious binder of example 30, wherein the cementitious binder has an initial setting time of less than about 2 hours.

Example 59. The cementitious binder of example 30, wherein the cementitious binder has an initial setting time of less than about 3 hours.

Example 60. The cementitious binder of example 3, wherein the cementitious binder additionally comprises at least 5% portland cement clinker by mass.

Example 61. The cementitious binder of example 3, wherein the cementitious binder additionally comprises at least 2% by mass of a calcium sulfate such as gypsum or anhydrite.

Example 62. The cementitious binder of example 3, wherein the cementitious binder additionally comprises a water reducing admixture in dry powder form.

Example 63. The cementitious binder of example 3, wherein the cementitious binder additionally comprises a defoaming admixture.

Example 64. The cementitious binder of example 3, wherein the cementitious binder additionally comprises an air entraining admixture.

Example 65. The cementitious binder of example 3, wherein the cementitious binder additionally comprises a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 66. The cementitious binder of example 3, wherein the cementitious binder additionally comprises sodium hydroxide.

Example 67. The cementitious binder of example 3, wherein the cementitious binder additionally comprises sodium sulfate.

Example 68. The cementitious binder of example 3, wherein the cementitious binder additional comprises a source of calcium carbonate such as limestone.

Example 69. The cementitious binder of example 3, wherein the cementitious binder additionally comprises at least 2% by mass of a calcium sulfate such as gypsum or anhydrite, and a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 70. The cementitious binder of example 3, wherein the cementitious binder additionally comprises at least 2% by mass of a calcium sulfate such as gypsum or anhydrite, and a set accelerating additive selected from the group including sodium hydroxide and sodium sulfate.

Example 71. The cementitious binder of example 3, wherein the cementitious binder additionally comprises at least 2% by mass of a calcium sulfate such as gypsum or anhydrite, a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime, and a water reducing admixture in dry powder form.

Example 72. The cementitious binder of example 3, wherein the cementitious binder additionally comprises at least 2% by mass of a calcium sulfate such as gypsum or anhydrite, a set accelerating additive selected from the group including sodium hydroxide and sodium sulfate, and a water reducing admixture in dry powder form.

Example 73. The cementitious binder of example 3, wherein the cementitious binder contains less than about 25% by mass portland cement clinker.

Example 74. The cementitious binder of example 3, wherein the cementitious binder contains less than about 10% by mass portland cement clinker.

Example 75. The cementitious binder of example 3, wherein the cementitious binder contains no portland cement clinker.

Example 76. The cementitious binder of example 7, wherein the cementitious binder contains less than about 25% by mass portland cement clinker.

Example 77. The cementitious binder of example 7, wherein the cementitious binder contains less than about 10% by mass portland cement clinker.

Example 78. The cementitious binder of example 7, wherein the cementitious binder contains no portland cement clinker.

Example 79. The cementitious binder of example 11, wherein the cementitious binder contains less than about 25% by mass portland cement clinker.

Example 80. The cementitious binder of example 11, wherein the cementitious binder contains less than about 10% by mass portland cement clinker.

Example 81. The cementitious binder of example 11, wherein the cementitious binder contains no portland cement clinker.

Example 82. A cementitious binder comprising lime and at least one pozzolan.

Example 83. The cementitious binder of example 82, wherein the lime comprises at least 90% calcium hydroxide by mass.

Example 84. The cementitious binder of example 83, wherein the lime has a Barrett, Joyner, and Halenda pore volume of less than about 0.10 mL/g.

Example 85. The cementitious binder of example 83, wherein the lime has a Barrett, Joyner, and Halenda pore volume of less than about 0.05 mL/g.

Example 86. The cementitious binder of example 83, wherein the lime has a Brunauer, Emmett, Teller specific surface area of less than about 4 m2/g.

Example 87. The cementitious binder of example 83, wherein the lime has a Brunauer, Emmett, Teller specific surface area of less than about 2 m2/g.

Example 88. The cementitious binder of example 83, wherein the lime has a paste consistency water demand of less than about 0.5 parts water per 1 part calcium hydroxide by mass.

Example 89. The cementitious binder of example 83, wherein the lime has a paste consistency water demand of less than about 0.4 parts water per 1 part calcium hydroxide by mass.

Example 90. The cementitious binder of example 83, wherein the lime has a paste consistency water demand of less than about 0.5 parts water per 1 part calcium hydroxide by mass, and a reactivity of greater than 90%.

Example 91. The cementitious binder of example 83, wherein the lime has a paste consistency water demand of less than about 0.4 parts water per 1 part calcium hydroxide by mass, and a reactivity of greater than 90%.

Example 92. The cementitious binder of example 83, wherein the lime has a mini-slump cone water demand of less than about 0.5 parts water per 1 part calcium hydroxide by mass.

Example 93. The cementitious binder of example 83, wherein the lime has a mini-slump cone water demand of less than about 0.4 parts water per 1 part calcium hydroxide by mass.

Example 94. The cementitious binder of example 83, wherein the lime has a mini-slump cone water demand of less than about 0.5 parts water per 1 part calcium hydroxide by mass, and a reactivity of greater than 90%.

Example 95. The cementitious binder of example 83, wherein the lime has a mini-slump cone water demand of less than about 0.4 parts water per 1 part calcium hydroxide by mass, and a reactivity of greater than 90%.

Example 96. The cementitious binder of example 83, wherein the lime particles have an average aspect ratio of less than about 1.2.

Example 97. The cementitious binder of example 83, wherein the cementitious binder has a paste consistency water demand of less than about 0.6 parts water per 1 part cementitious binder by mass.

Example 98. The cementitious binder of example 83, wherein the cementitious binder has a paste consistency water demand of less than about 0.5 parts water per 1 part cementitious binder by mass.

Example 99. The cementitious binder of example 83, wherein the cementitious binder has a mini-slump cone water demand of less than about 0.6 parts water per 1 part cementitious binder by mass.

Example 100. The cementitious binder of example 83, wherein the cementitious binder has a mini-slump cone water demand of less than about 0.5 parts water per 1 part cementitious binder by mass.

Example 101. The cementitious binder of example 83, wherein the pozzolan is a raw or calcined natural pozzolan or clay.

Example 102. The cementitious binder of example 84, wherein the pozzolan is a raw or calcined natural pozzolan or clay.

Example 103. The cementitious binder of example 85, wherein the pozzolan is a raw or calcined natural pozzolan or clay.

Example 104. The cementitious binder of example 88, wherein the pozzolan is a raw or calcined natural pozzolan or clay.

Example 105. The cementitious binder of example 89, wherein the pozzolan is a raw or calcined natural pozzolan or clay.

Example 106. The cementitious binder of example 90, wherein the pozzolan is a raw or calcined natural pozzolan or clay.

Example 107. The cementitious binder of example 91, wherein the pozzolan is a raw or calcined natural pozzolan or clay.

Example 108. The cementitious binder of example 96, wherein the pozzolan is a raw or calcined natural pozzolan or clay.

Example 109. The cementitious binder of example 97, wherein the pozzolan is a raw or calcined natural pozzolan or clay.

Example 110. The cementitious binder of example 98, wherein the pozzolan is a raw or calcined natural pozzolan or clay.

Example 111. The cementitious binder of example 83, wherein the cementitious binder has a 3-day compressive strength of greater than about 13 MPa in 2 inch cement mortar cube compressive strength tests.

Example 112. The cementitious binder of example 83, wherein the cementitious binder has a 7-day compressive strength of greater than about 20 MPa in 2 inch cement mortar cube compressive strength tests.

Example 113. The cementitious binder of example 83, wherein the cementitious binder has a 28-day compressive strength of greater than about 28 MPa in 2 inch cement mortar cube compressive strength tests.

Example 114. The cementitious binder of example 83, wherein the cementitious binder has an initial setting time of less than about 2 hours.

Example 115. The cementitious binder of example 83, wherein the cementitious binder has an initial setting time of less than about 3 hours.

Example 116. The cementitious binder of example 91, wherein the cementitious binder has a 3-day compressive strength of greater than about 13 MPa in 2 inch cement mortar cube compressive strength tests.

Example 117. The cementitious binder of example 91, wherein the cementitious binder has a 7-day compressive strength of greater than about 20 MPa in 2 inch cement mortar cube compressive strength tests.

Example 118. The cementitious binder of example 91, wherein the cementitious binder has a 28-day compressive strength of greater than about 28 MPa in 2 inch cement mortar cube compressive strength tests.

Example 119. The cementitious binder of example 91, wherein the cementitious binder has an initial setting time of less than about 2 hours.

Example 120. The cementitious binder of example 91, wherein the cementitious binder has an initial setting time of less than about 3 hours.

Example 121. The cementitious binder of example 97, wherein the cementitious binder has a 3-day compressive strength of greater than about 13 MPa in 2 inch cement mortar cube compressive strength tests.

Example 122. The cementitious binder of example 97, wherein the cementitious binder has a 7-day compressive strength of greater than about 20 MPa in 2 inch cement mortar cube compressive strength tests.

Example 123. The cementitious binder of example 97, wherein the cementitious binder has a 28-day compressive strength of greater than about 28 MPa in 2 inch cement mortar cube compressive strength tests.

Example 124. The cementitious binder of example 97, wherein the cementitious binder has an initial setting time of less than about 2 hours.

Example 125. The cementitious binder of example 97, wherein the cementitious binder has an initial setting time of less than about 3 hours.

Example 126. The cementitious binder of example 102, wherein the cementitious binder has a 3-day compressive strength of greater than about 13 MPa in 2 inch cement mortar cube compressive strength tests.

Example 127. The cementitious binder of example 102, wherein the cementitious binder has a 7-day compressive strength of greater than about 20 MPa in 2 inch cement mortar cube compressive strength tests.

Example 128. The cementitious binder of example 102, wherein the cementitious binder has a 28-day compressive strength of greater than about 28 MPa in 2 inch cement mortar cube compressive strength tests.

Example 129. The cementitious binder of example 102, wherein the cementitious binder has an initial setting time of less than about 2 hours.

Example 130. The cementitious binder of example 102, wherein the cementitious binder has an initial setting time of less than about 3 hours.

Example 131. The cementitious binder of example 104, wherein the cementitious binder has a 3-day compressive strength of greater than about 13 MPa in 2 inch cement mortar cube compressive strength tests.

Example 132. The cementitious binder of example 104, wherein the cementitious binder has a 7-day compressive strength of greater than about 20 MPa in 2 inch cement mortar cube compressive strength tests.

Example 133. The cementitious binder of example 104, wherein the cementitious binder has a 28-day compressive strength of greater than about 28 MPa in 2 inch cement mortar cube compressive strength tests.

Example 134. The cementitious binder of example 104, wherein the cementitious binder has an initial setting time of less than about 2 hours.

Example 135. The cementitious binder of example 104, wherein the cementitious binder has an initial setting time of less than about 3 hours.

Example 136. The cementitious binder of example 83, wherein the cementitious binder additionally comprises at least 5% portland cement clinker by mass.

Example 137. The cementitious binder of example 83, wherein the cementitious binder additionally comprises at least 2% by mass of a calcium sulfate such as gypsum or anhydrite.

Example 138. The cementitious binder of example 83, wherein the cementitious binder additionally comprises a water reducing admixture in dry powder form.

Example 139. The cementitious binder of example 83, wherein the cementitious binder additionally comprises a defoaming admixture.

Example 140. The cementitious binder of example 83, wherein the cementitious binder additionally comprises an air entraining admixture.

Example 141. The cementitious binder of example 83, wherein the cementitious binder additionally comprises a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 142. The cementitious binder of example 83, wherein the cementitious binder additionally comprises sodium hydroxide.

Example 143. The cementitious binder of example 83, wherein the cementitious binder additionally comprises sodium sulfate.

Example 144. The cementitious binder of example 83, wherein the cementitious binder additional comprises a source of calcium carbonate such as limestone.

Example 145. The cementitious binder of example 83, wherein the cementitious binder additionally comprises at least 2% by mass of a calcium sulfate such as gypsum or anhydrite, and a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 146. The cementitious binder of example 83, wherein the cementitious binder additionally comprises at least 2% by mass of a calcium sulfate such as gypsum or anhydrite, and a set accelerating additive selected from the group including sodium hydroxide and sodium sulfate.

Example 147. The cementitious binder of example 83, wherein the cementitious binder additionally comprises at least 2% by mass of a calcium sulfate such as gypsum or anhydrite, a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime, and a water reducing admixture in dry powder form.

Example 148. The cementitious binder of example 83, wherein the cementitious binder additionally comprises at least 2% by mass of a calcium sulfate such as gypsum or anhydrite, a set accelerating additive selected from the group including sodium hydroxide and sodium sulfate, and a water reducing admixture in dry powder form.

Example 149. The cementitious binder of example 83, wherein the cementitious binder contains less than about 25% by mass portland cement clinker.

Example 150. The cementitious binder of example 83, wherein the cementitious binder contains less than about 10% by mass portland cement clinker.

Example 151. The cementitious binder of example 83, wherein the cementitious binder contains no portland cement clinker.

Example 152. The cementitious binder of example 89, wherein the cementitious binder contains less than about 25% by mass portland cement clinker.

Example 153. The cementitious binder of example 89, wherein the cementitious binder contains less than about 10% by mass portland cement clinker.

Example 154. The cementitious binder of example 89, wherein the cementitious binder contains no portland cement clinker.

Example 155. The cementitious binder of example 91, wherein the cementitious binder contains less than about 25% by mass portland cement clinker.

Example 156. The cementitious binder of example 91, wherein the cementitious binder contains less than about 10% by mass portland cement clinker.

Example 157. The cementitious binder of example 91, wherein the cementitious binder contains no portland cement clinker.

Example 158. A cementitious binder comprising lime, at least one pozzolan, and at least one additional material selected from the group including tricalcium silicate, calcium aluminate cement, calcium sulfoaluminate cement, and ye'elemite.

Example 159. The cementitious binder of example 158 wherein the additional material comprises tricalcium silicate.

Example 160. The cementitious binder of example 158 wherein the additional material comprises calcium aluminate cement.

Example 161. The cementitious binder of example 158 wherein the additional material comprises calcium sulfoaluminate cement.

Example 162. The cementitious binder of example 158 wherein the additional material comprises ye'elemite.

Example 163. The cementitious binder of example 158, wherein the cementitious binder contains less than about 25% by mass portland cement clinker.

Example 164. The cementitious binder of example 158, wherein the cementitious binder contains less than about 10% by mass portland cement clinker.

Example 165. The cementitious binder of example 158, wherein the cementitious binder contains no portland cement clinker.

Example 166. The cementitious binder of example 158, wherein the lime is a precipitated lime.

Example 167. The cementitious binder of example 158, wherein the lime comprises at least 90% calcium hydroxide on a mass basis.

Example 168. The cementitious binder of example 167, wherein the lime is a precipitated calcium hydroxide.

Example 169. The cementitious binder of example 168 wherein the additional material comprises tricalcium silicate.

Example 170. The cementitious binder of example 168 wherein the additional material comprises calcium aluminate cement.

Example 171. The cementitious binder of example 168 wherein the additional material comprises calcium sulfoaluminate cement.

Example 172. The cementitious binder of example 168 wherein the additional material comprises ye'elemite.

Example 173. The cementitious binder of example 168, wherein the cementitious binder contains less than about 25% by mass portland cement clinker.

Example 174. The cementitious binder of example 168157, wherein the cementitious binder contains less than about 10% by mass portland cement clinker.

Example 175. The cementitious binder of example 168, wherein the cementitious binder contains no portland cement clinker.

Example 176. A method of forming a cementitious binder, comprising: creating a calcium hydroxide through a precipitation reaction; selecting at least one pozzolan; optionally, selecting additional components from the group including portland cement, portland cement clinker, tricalcium silicate, ye'elemite, calcium aluminate cement, calcium sulfoaluminate cement, calcium carbonate, water reducing admixture, set accelerating admixture, defoaming admixture, air entraining admixture, and/or calcium sulfate; and blending the calcium hydroxide, the selected at least one pozzolan, and any selected components to create a mixture.

Example 177. The method of example 176, wherein the cementitious binder comprises less than about 50% by mass portland cement clinker.

Example 178. The method of example 177, wherein the calcium hydroxide is an electrochemical calcium hydroxide.

Example 179. The method of example 177, wherein the calcium hydroxide is a low-temperature calcium hydroxide.

Example 180. The method of example 177, wherein the calcium hydroxide is a decarbonized calcium hydroxide.

Example 181. The method of example 177, wherein the calcium hydroxide has a Barrett, Joyner, and Halenda pore volume of less than about 0.10 mL/g.

Example 182. The method of example 177, wherein the calcium hydroxide has a Barrett, Joyner, and Halenda pore volume of less than about 0.05 mL/g.

Example 183. The method of example 177, wherein the calcium hydroxide has a Brunauer, Emmett, Teller specific surface area of less than about 4 m2/g.

Example 184. The method of example 177, wherein the calcium hydroxide has a Brunauer, Emmett, Teller specific surface area of less than about 2 m2/g.

Example 185. The method of example 177, wherein the calcium hydroxide has a paste consistency water demand of less than about 0.5 parts water per 1 part calcium hydroxide by mass.

Example 186. The method of example 177, wherein the calcium hydroxide has a paste consistency water demand of less than about 0.4 parts water per 1 part calcium hydroxide by mass.

Example 187. The method of example 177, wherein the calcium hydroxide has a paste consistency water demand of less than about 0.5 parts water per 1 part calcium hydroxide by mass, and a reactivity of greater than 90%.

Example 188. The method of example 177, wherein the calcium hydroxide has a paste consistency water demand of less than about 0.4 parts water per 1 part calcium hydroxide by mass, and a reactivity of greater than 90%.

Example 189. The method of example 177, wherein the calcium hydroxide has a mini-slump cone water demand of less than about 0.5 parts water per 1 part calcium hydroxide by mass.

Example 190. The method of example 177, wherein the calcium hydroxide has a mini-slump cone water demand of less than about 0.4 parts water per 1 part calcium hydroxide by mass.

Example 191. The method of example 177, wherein the calcium hydroxide has a mini-slump cone water demand of less than about 0.5 parts water per 1 part calcium hydroxide by mass, and a reactivity of greater than 90%.

Example 192. The method of example 177, wherein the calcium hydroxide has a mini-slump cone water demand of less than about 0.4 parts water per 1 part calcium hydroxide by mass, and a reactivity of greater than 90%.

Example 193. The method of example 177, wherein the calcium hydroxide particles have an average aspect ratio of less than about 1.2.

Example 194. The method of example 177, wherein the cementitious binder has a paste consistency water demand of less than about 0.6 parts water per 1 part cementitious binder by mass.

Example 195. The method of example 177, wherein the cementitious binder has a paste consistency water demand of less than about 0.5 parts water per 1 part cementitious binder by mass.

Example 196. The method of example 177, wherein the cementitious binder has a mini-slump water demand of less than about 0.6 parts water per 1 part cementitious binder by mass.

Example 197. The method of example 177, wherein the cementitious binder has a mini-slump water demand of less than about 0.5 parts water per 1 part cementitious binder by mass.

Example 198. The method of example 177, wherein the pozzolan is a raw or calcined natural pozzolan or clay.

Example 199. The method of example 178, wherein the pozzolan is a raw or calcined natural pozzolan or clay.

Example 200. The method of example 179, wherein the pozzolan is a raw or calcined natural pozzolan or clay.

Example 201. The method of example 180, wherein the pozzolan is a raw or calcined natural pozzolan or clay.

Example 202. The method of example 181, wherein the pozzolan is a raw or calcined natural pozzolan or clay.

Example 203. The method of example 182, wherein the pozzolan is a raw or calcined natural pozzolan or clay.

Example 204. The method of example 185, wherein the pozzolan is a raw or calcined natural pozzolan or clay.

Example 205. The method of example 186, wherein the pozzolan is a raw or calcined natural pozzolan or clay.

Example 206. The method of example 187, wherein the pozzolan is a raw or calcined natural pozzolan or clay.

Example 207. The method of example 188, wherein the pozzolan is a raw or calcined natural pozzolan or clay.

Example 208. The method of example 193, wherein the pozzolan is a raw or calcined natural pozzolan or clay.

Example 209. The method of example 177, wherein the cementitious binder has a 3-day compressive strength of greater than about 13 MPa in 2 inch cement mortar cube compressive strength tests.

Example 210. The method of example 177, wherein the cementitious binder has a 7-day compressive strength of greater than about 20 MPa in 2 inch cement mortar cube compressive strength tests.

Example 211. The method of example 177, wherein the cementitious binder has a 28-day compressive strength of greater than about 28 MPa in 2 inch cement mortar cube compressive strength tests.

Example 212. The method of example 177, wherein the cementitious binder has an initial setting time of less than about 2 hours.

Example 213. The method of example 177, wherein the cementitious binder has an initial setting time of less than about 3 hours.

Example 214. The method of example 185, wherein the cementitious binder has a 3-day compressive strength of greater than about 13 MPa in 2 inch cement mortar cube compressive strength tests.

Example 215. The method of example 185, wherein the cementitious binder has a 7-day compressive strength of greater than about 20 MPa in 2 inch cement mortar cube compressive strength tests.

Example 216. The method of example 185, wherein the cementitious binder has a 28-day compressive strength of greater than about 28 MPa in 2 inch cement mortar cube compressive strength tests.

Example 217. The method of example 185, wherein the cementitious binder has an initial setting time of less than about 2 hours.

Example 218. The method of example 185, wherein the cementitious binder has an initial setting time of less than about 3 hours.

Example 219. The method of example 198, wherein the cementitious binder has a 3-day compressive strength of greater than about 13 MPa in 2 inch cement mortar cube compressive strength tests.

Example 220. The method of example 198, wherein the cementitious binder has a 7-day compressive strength of greater than about 20 MPa in 2 inch cement mortar cube compressive strength tests.

Example 221. The method of example 198, wherein the cementitious binder has a 28-day compressive strength of greater than about 28 MPa in 2 inch cement mortar cube compressive strength tests.

Example 222. The method of example 198, wherein the cementitious binder has an initial setting time of less than about 2 hours.

Example 223. The method of example 198, wherein the cementitious binder has an initial setting time of less than about 3 hours.

Example 224. The method of example 202, wherein the cementitious binder has a 3-day compressive strength of greater than about 13 MPa in 2 inch cement mortar cube compressive strength tests.

Example 225. The method of example 202, wherein the cementitious binder has a 7-day compressive strength of greater than about 20 MPa in 2 inch cement mortar cube compressive strength tests.

Example 226. The method of example 202, wherein the cementitious binder has a 28-day compressive strength of greater than about 28 MPa in 2 inch cement mortar cube compressive strength tests.

Example 227. The method of example 202, wherein the cementitious binder has an initial setting time of less than about 2 hours.

Example 228. The method of example 202, wherein the cementitious binder has an initial setting time of less than about 3 hours.

Example 229. The method of example 204, wherein the cementitious binder has a 3-day compressive strength of greater than about 13 MPa in 2 inch cement mortar cube compressive strength tests.

Example 230. The method of example 204, wherein the cementitious binder has a 7-day compressive strength of greater than about 20 MPa in 2 inch cement mortar cube compressive strength tests.

Example 231. The method of example 204, wherein the cementitious binder has a 28-day compressive strength of greater than about 28 MPa in 2 inch cement mortar cube compressive strength tests.

Example 232. The method of example 204, wherein the cementitious binder has an initial setting time of less than about 2 hours.

Example 233. The method of example 204, wherein the cementitious binder has an initial setting time of less than about 3 hours.

Example 234. The method of example 177, wherein the optional additional components include at least 5% portland cement clinker by total cementitious binder mass.

Example 235. The method of example 177, wherein the optional additional components include at least 2% of a calcium sulfate such as gypsum or anhydrite by total cementitious binder mass.

Example 236. The method of example 177, wherein the optional additional components include a water reducing admixture in dry powder form.

Example 237. The method of example 177, wherein the optional additional components include a defoaming admixture.

Example 238. The method of example 177, wherein the optional additional components include an air entraining admixture.

Example 239. The method of example 177, wherein the optional additional components include a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 240. The method of example 177, wherein the optional additional components include sodium hydroxide.

Example 241. The method of example 177, wherein the optional additional components include sodium sulfate.

Example 242. The method of example 177, wherein the optional additional components include a source of calcium carbonate such as limestone.

Example 243. The method of example 177, wherein the optional additional components include at least 2% by mass of a calcium sulfate such as gypsum or anhydrite, and a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime.

Example 244. The method of example 177, wherein the optional additional components include at least 2% by mass of a calcium sulfate such as gypsum or anhydrite, and a set accelerating additive selected from the group including sodium hydroxide and sodium sulfate.

Example 245. The method of example 177, wherein the optional additional components include at least 2% by mass of a calcium sulfate such as gypsum or anhydrite, a set accelerating additive selected from the group including sodium hydroxide, calcium chloride, sodium sulfate, sodium nitrate, calcium nitrite, calcium nitrate, sodium silicate, sodium thiocyante, sodium lactate, triethanolamine, diethanolamine, triisopropanolamine, N,N,N',N'-Tetrakis(2-hydroxyethyl)ethylenediamine, nanoparticulate portland cement, nanoparticulate calcium silicate hydrate, nanoparticulate limestone, or nanoparticulate lime, and a water reducing admixture in dry powder form.

Example 246. The method of example 177, wherein the optional additional components include at least 2% of a calcium sulfate such as gypsum or anhydrite by total cementitious binder mass, a set accelerating additive selected from the group including sodium hydroxide and sodium sulfate, and a water reducing admixture in dry powder form.

Example 247. The method of example 177, wherein the optional additional components include less than about 25% portland cement clinker by total cementitious binder mass.

Example 248. The method of example 177, wherein the optional additional components include less than about 10% portland cement clinker by total cementitious binder mass.

Example 249. The method of example 177, wherein the optional additional components include no portland cement clinker.

Example 250. The method of example 181, wherein the optional additional components include less than about 25% portland cement clinker by total cementitious binder mass.

Example 251. The method of example 181, wherein the optional additional components include less than about 10% portland cement clinker by total cementitious binder mass.

Example 252. The method of example 181, wherein the optional additional components include no portland cement clinker.

Example 253. The method of example 185, wherein the optional additional components include less than about 25% portland cement clinker by total cementitious binder mass.

Example 254. The method of example 185, wherein the optional additional components include less than about 10% portland cement clinker by total cementitious binder mass.

Example 255. The method of example 185, wherein the optional additional components include no portland cement clinker.

Example 256. The cementitious binder of any of examples 1-175 wherein at least the lime is produced using a process wherein the combined $CO_2$ emissions to the atmosphere from chemically bound sources in the raw material and from the combustion of fuels is less than 1 kg $CO_2$ per kg lime.

Example 257. The method of any of examples 176-255, wherein the calcium hydroxide is produced using a process wherein the combined $CO_2$ emissions to the atmosphere from chemically bound sources in the raw material and from the combustion of fuels is less than 1 kg $CO_2$ per kg calcium hydroxide.

Example 258. The method of any of examples 176-257, wherein the mixture is a powder mixture.

Example 259. The method of example 258, wherein the powder mixture is a dry powder mixture.

Example 260. The method of any of examples 176-257, wherein the mixture is a uniform mixture.

Example 261. The method of example 260, wherein the uniform mixture is a uniform dry powder mixture.

Various ASTMs are discussed herein and all such discussed ASTMs are fully incorporated herein as part of this disclosure for all purposes. Such ASTMs filed incorporated fully by reference for all purposes include ASTM C91, C109, C114, C141, C143, C150, C151, C185, C191, C204, C206, C207, C227, C230, C260, C266, C267, C430, C451, C494, C595, C596, C807, C821, C989, C1012, C1038, C1090, C1097, C1152, C1157, C1202, C1218, C1260, C1329, C1437, C1489, C1567, C1698, C1702, C1707, C157, C403, C642, C1293, and G109.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step of any embodiment described herein can be used in any other embodiment.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

The invention claimed is:

1. A cementitious binder comprising:
   at least 10% lime by mass, wherein the lime has a Brunauer-Emmett-Teller (BET) specific surface area of less than 6 $m^2/g$ and the lime comprises at least 90% calcium hydroxide by mass;
   at least 20% of a pozzolan by mass; and
   at least 2% calcium sulfate by mass.

2. The cementitious binder of claim 1, wherein the lime has a Barrett, Joyner, and Halenda (BJH) pore volume of less than 0.04 mL/g.

3. The cementitious binder of claim 1, wherein the cementitious binder comprises less than 50% mass portland cement clinker.

4. The cementitious binder of claim 3, wherein the cementitious binder contains no portland cement clinker.

5. The cementitious binder of claim 1, further comprising at least 0.25% sodium hydroxide by mass.

6. The cementitious binder of claim 5, wherein the pozzolan is a synthetic pozzolan.

7. The cementitious binder of claim 6, wherein the cementitious binder has:
   at least one of an autoclave length change of less than 0.80% as measured according to ASTM C151,
   an initial setting time greater than 45 minutes and less than 8 hours as measured according to ASTM C191,
   a mortar air content less than 12% as measured according to ASTM C185, or
   a mortar bar expansion at 14 days less than 0.020% as measured according to ASTM C1038,
   or any combination thereof.

8. The cementitious binder of claim 7, wherein the cementitious binder has:
   at least one of a 3-day compressive strength greater than 13.0 MPa as measured according to ASTM C109,
   a 7-day compressive strength greater than 20.0 MPa as measured according to ASTM C109, or
   a 28-day compressive strength greater than 28.0 MPa as measured according to ASTM C109,
   or any combination thereof.

9. The cementitious binder of claim 2, further comprising:
   at least 5% by mass a material comprising calcium aluminate cement, calcium sulfoaluminate cement, and/or ye'elemite.

10. The cementitious binder of claim 9, wherein the material comprises calcium sulfoaluminate cement.

11. The cementitious binder of claim 10, wherein the cementitious binder contains no portland cement clinker.

12. The cementitious binder of claim 9, wherein the cementitious binder further comprises at least 0.25% sodium hydroxide by mass.

13. The cementitious binder of claim 9, wherein the mass percentage of the material is at least 10% and not more than 30%.

14. The cementitious binder of claim 9, wherein the material comprises calcium sulfoaluminate cement and the cementitious binder contains no portland cement clinker.

15. The cementitious binder of claim 9, wherein the lime comprises at least 90% calcium hydroxide by mass.

16. The cementitious binder of claim 14, wherein the cementitious binder comprises less than 50% mass portland cement clinker.

17. The cementitious binder of claim 15, wherein the pozzolan is a synthetic pozzolan.

18. The cementitious binder of claim 16, wherein the cementitious binder has:
   at least one of an autoclave length change of less than 0.80% as measured according to ASTM C151,
   an initial setting time greater than 45 minutes and less than 8 hours as measured according to ASTM C191,
   a mortar air content less than 12% as measured according to ASTM C185,
   a mortar bar expansion at 14 days less than 0.020% as measured according to ASTM C1038,
   a 3-day compressive strength greater than 13.0 MPa as measured according to ASTM C109,
   a 7-day compressive strength greater than 20.0 MPa as measured according to ASTM C109, or
   a 28-day compressive strength greater than 28.0 MPa as measured according to ASTM C109,
   or any combination thereof.

\* \* \* \* \*